(12) United States Patent
Kendall et al.

(10) Patent No.: US 7,424,701 B2
(45) Date of Patent: Sep. 9, 2008

(54) METHOD AND APPARATUS FOR FRAME-BASED KNOWLEDGE REPRESENTATION IN THE UNIFIED MODELING LANGUAGE (UML)

(75) Inventors: Elisa Finnie Kendall, Los Altos, CA (US); Mark Eric Dutra, San Jose, CA (US)

(73) Assignee: Sandpiper Software, Inc., Los Altos, CA (US)

( * ) Notice: Subject to any disclaimer, the term of this patent is extended or adjusted under 35 U.S.C. 154(b) by 581 days.

(21) Appl. No.: 10/499,961

(22) PCT Filed: Feb. 12, 2003

(86) PCT No.: PCT/US03/04229

§ 371 (c)(1),
(2), (4) Date: Jun. 21, 2004

(87) PCT Pub. No.: WO03/069442

PCT Pub. Date: Aug. 21, 2003

(65) Prior Publication Data

US 2005/0034107 A1 Feb. 10, 2005

Related U.S. Application Data

(60) Provisional application No. 60/356,611, filed on Feb. 12, 2002.

(51) Int. Cl.
G06F 9/44 (2006.01)
G06N 5/00 (2006.01)
(52) U.S. Cl. .............. 717/105; 717/109; 717/113; 706/46; 706/59

(58) Field of Classification Search ............ None
See application file for complete search history.

(56) References Cited

U.S. PATENT DOCUMENTS

| 5,265,206 | A | 11/1993 | Shackelford et al. |
| 5,291,593 | A | 3/1994 | Abraham et al. |
| 5,644,764 | A | 7/1997 | Johnson et al. |
| 5,813,014 | A | 9/1998 | Gustman |
| 5,974,407 | A | 10/1999 | Sacks |
| 6,018,627 | A | 1/2000 | Iyengar et al. |
| 6,061,675 | A | 5/2000 | Wical |

(Continued)

OTHER PUBLICATIONS

Cranefield, Stephen, "Networked Knowledge Representation and Exchange Using UML and RDF," Journal of Digital Information, vol. 1 No. 8, Feb. 2001, 28 pages. Accessed from <http://journals.tdl.org/jodi/article/view/jodi-34/31>.*

(Continued)

Primary Examiner—Tuan Q. Dam
Assistant Examiner—Michael J Yigdall
(74) Attorney, Agent, or Firm—Schwegman, Lundberg & Woessner, P.A.

(57) ABSTRACT

According to an embodiment of the present invention, there is provided a method and system for emulating a knowledge representation in a Unified Modeling Language (UML) environment. A Meta-Object Facility metamodel and UML profile are grounded in a foundation ontology. The elements representing the knowledge representation ontology are mapped to elements of UML, based on the grounded Meta-Object Facility metamodel and UML profile, thereby emulating the knowledge representation in a UML environment.

24 Claims, 36 Drawing Sheets

U.S. PATENT DOCUMENTS

| | | | |
|---|---|---|---|
| 6,199,195 | B1 | 3/2001 | Goodwin et al. |
| 6,442,566 | B1 | 8/2002 | Atman et al. |
| 6,611,837 | B2 | 8/2003 | Schreiber |
| 6,745,189 | B2 | 6/2004 | Schreiber |
| 6,823,328 | B2 | 11/2004 | Schreiber |
| 6,836,776 | B2 | 12/2004 | Schreiber |
| 6,931,393 | B1 | 8/2005 | Schreiber |
| 6,963,876 | B2 | 11/2005 | Schreiber |
| 7,010,606 | B1 | 3/2006 | Schreiber |
| 7,016,917 | B2 | 3/2006 | Schreiber |
| 7,065,522 | B2 | 6/2006 | Taylor |
| 7,099,885 | B2 * | 8/2006 | Hellman et al. ......... 707/103 R |
| 7,136,821 | B1 | 11/2006 | Kohavi et al. |
| 7,162,469 | B2 | 1/2007 | Anonsen et al. |
| 7,231,384 | B2 | 6/2007 | Wu et al. |

OTHER PUBLICATIONS

Baclawski, Kenneth et al., "Extending UML to Support Ontology Engineering for the Semantic Web," Proceedings of the 4th International Conference on the Unified Modeling Language, Springer-Verlag: Oct. 2001, pp. 342-360.*

Hewett, Micheal S., "Access Paths", [Online]. [Archived Oct. 22, 2006]. Retrieved from the internet: <URL: http://www.cs.utexas.edu/users/qr/algy/algy-expsys/node6.html#SECTION00024000000000000000>,(Oct. 22, 2006),1 pg.

Hewett, Micheal S., "Frames", [Online]. [Archived Jul. 30, 2003]. Retrieved from the internet: <URL: http://www.cs.utexas.edu/users/qr/algy/algy-expsys/node3.html>,(Jul. 30, 2003),1 pg.

Hewett, Michael S., "Frames and Predicate Calculus", [Online]. [Archived Sep. 4, 2004]. Retrieved from the internet: <URL:http://www.cs.utexas.edu/users/qr/algy.algy-expsys/node5.html™SECTION00023000000000000000>,(Sep. 4, 2003),1 pg.

Hewett, Micheal S., "Frames and Their Names", [Online]. [Archived Sep. 4, 2003]. Retrieved from the Internet: <URL: http://www.cs.utexas.edu/users/qr/algy/algy-expsys/node4.html#SECTION00022000000000000000>,(Sep. 4, 2003),1 pg.

Hewette, Micheal S., "Inference in Algernon", [Online]. [Archived Oct. 13, 2003]. Retrieved from the internet: <URL:http://www.cs.utexas.edu/users/qr/algy/algy-expsys/node8.html#SECTION00026000000000000000>,(Oct. 13, 2003),2 pgs.

Hewett, Micheal S., "Introduction to Frame Based Knowledge Representation", [Online]. [Archived Jul. 30, 2003]. Retrieved from the internet: <URL:http://www.cs.utexas.edu/users/qr/algy/algy-expsys/node2.html>,(Jul. 30, 2003),1 pg.

Hewett, Micheal S., "Rules Are Implications", [Online]. [Archived Sep. 4, 2003]. Retrieved from the internet: <http://www.cs.utexas.edu/users/qr/algy/algy-expsys/node7.html#SECTION00025000000000000000>,(Sep. 4, 2003),1 pg.

Wikipedia, "Dam + Oil", [Online]. Retrieved from the internet: <URL:http://en.wikipedia.org/wiki/DAML%BOIL>,(Oct. 1, 2007),1 pg.

Wikipedia, "DARPA Agent Markup Language", [Online]. Retrieved from the internet: <URL: http://en.wikipedia.org/wiki/DARPA_Agent_Markup_Language>,(Oct. 1, 2007),2 pgs.

Wikipedia, "Meta Object Facility", [Online]. Retrieved from the internet: <URL:http://en.wikipedia.org/wiki/Meta-Object_Facility>,(Oct. 1, 2007),3 pgs.

Wikipedia, "Ontology Interference Layer", [Online]. Retrieved from the internet: <URL: http://en.wikipedia.org/wiki/Ontology_Interference_Layer>,(Oct. 1, 2007),1 pg.

Wikipedia, "Open Knowlege Base Connectivity", [Online]. Retrieved from the internet: <URL:http://en.wikipedia.org/wiki/OKBC >,(Oct. 1, 2007),1 pg.

Wikipedia, "Web Ontology Language", [Online]. Retrieved from the internet: <URL:http://en.wikipedia.org/wiki/Web_Ontology_Language >,(Oct. 1, 2007),4 pgs.

"DARPA Agent Markup Language (DAML) and Ontology Interference Layer (OIL)", *As defined by the Joint US/EU ad hoc Agent Markup Language Committe* (see http://www/daml.org), Mar. 2001.

"Information Integration for Concurrent Engineering (IICE): IDEF5 Ontology Capture Method Report", *Knowledge Based Systems, Inc.,* College Station, Texas., (Sep. 21, 1994),188 pgs.

"Knowledge Interchange Format", *Draft Proposed American National Standard* (dpANS), NCITS.T2/98.004, 26 pgs.

"OMG Unified Modeling Language Specification", *Version 1.3, First Edition: Mar. 2000, Object Management Group, Inc.,* Needham, MA, (Mar. 2000),1034 pgs.

"On-Line Help, Rational Rose Extensibility Interface", *Rational Rose 2000e, Rose Enterprise Edition, Release Version 200.02.10, Rational Software Corporation,* Cupertino, CA, (2000), 156 pgs.

"XOL: An XML-Based Ontology Exchange Language", *Pangea Systems, Inc. and Artificial Intelligence Center, SRI international,* Menlo Park, CA, (Aug. 31, 1999),30 pgs.

Booch, et al., *The Unified Modeling Language User Guide,* Addison Wesley Longman, Inc., Reading, MA.,(2000),391.

Chaudhri, V K., et al., "Open Knowledge Based Connectivity 2.0.3", *Artificial Intelligence at SRI International and Knowledge Systems Laboratory,* Stanford University., (Apr. 9, 1998), 108 pgs.

Farquhar, A , et al., "Collaborative Ontology Construction for Information Integration", *KSL Report KSL-95-63, Knowledge Systems Laboratory, Stanford University,* Aug. 1995,33 pgs.

Farquhar, A , et al., "Integrating Information Sources Using Context Logic", *KSL Report KSL-95-12, Knowledge Systems Laboratory, Stanford University,* Jan. 1995,5 pgs.

Farquhar, A. , et al., "The Ontolingua Server: A Tool for Collaborative Ontology Construction", *KSL Report KSL-96-26, Knowledge Systems Laboratory, Stanford University,* (Sep. 1996),19 pgs.

Fikes, R. , et al., "Tools for Assembling Modular Ontologies in Ontolingua", *KSL Report KSL-97-07, Knowledge Systems Laboratory, Stanford University,* (Apr. 1997),6 pgs.

Genesereth, M.R., et al., "Knowledge Interchange Format, Version 3.0 Reference Manual", *KSL Report KSL-92-86, Knowledge Systems Laboratory, Stanford University,* (Jun. 1992),68 pgs.

Gruber, T R., et al., "A Translation Approach to Portable Ontology Specifications", *KSL Report KSL-92-71, Knowledge Systems Laboratory, Stanford University,* (1993),24 pgs.

Hendler, J , et al., "The DARPA Agent Markup Language", *IEEE Intelligent Systems* vol. 15 No. 6, (Nov./Dec. 2000),6 pgs.

McEntire, Robin , et al., "An Evaluation of Ontology Exchange Languages for Bioinformatics", (Aug. 1, 1999).

Sowa, John F., et al., *Knowledge Representation: Logical, Philisophical, and Computational Foundations,* Brook/Cole A Division of Thompson Learning, Pacific Grove, CA.,(1-205),594 pgs.

* cited by examiner

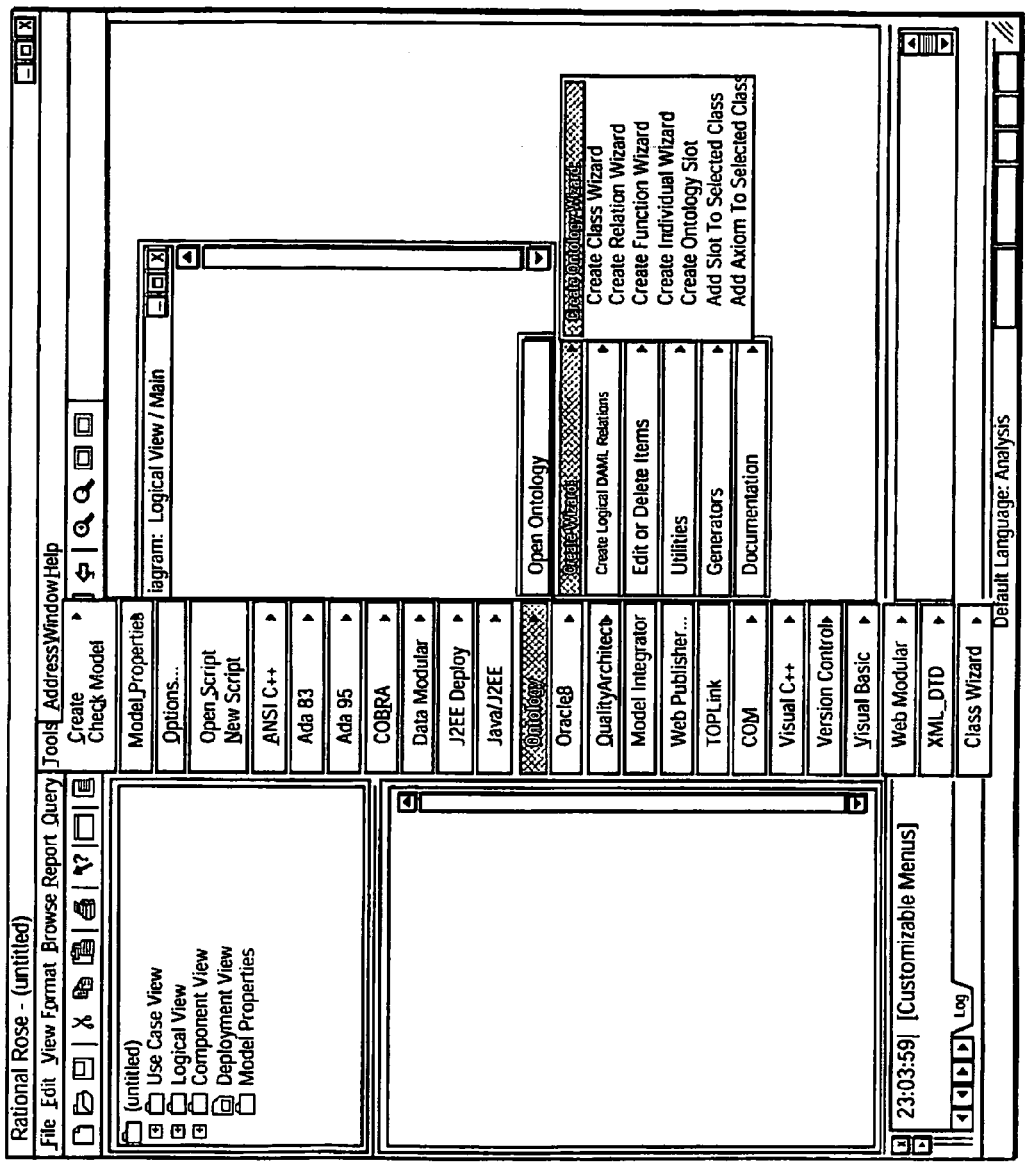
FIG. 8    Invoke the VOM's Create Ontology Wizard

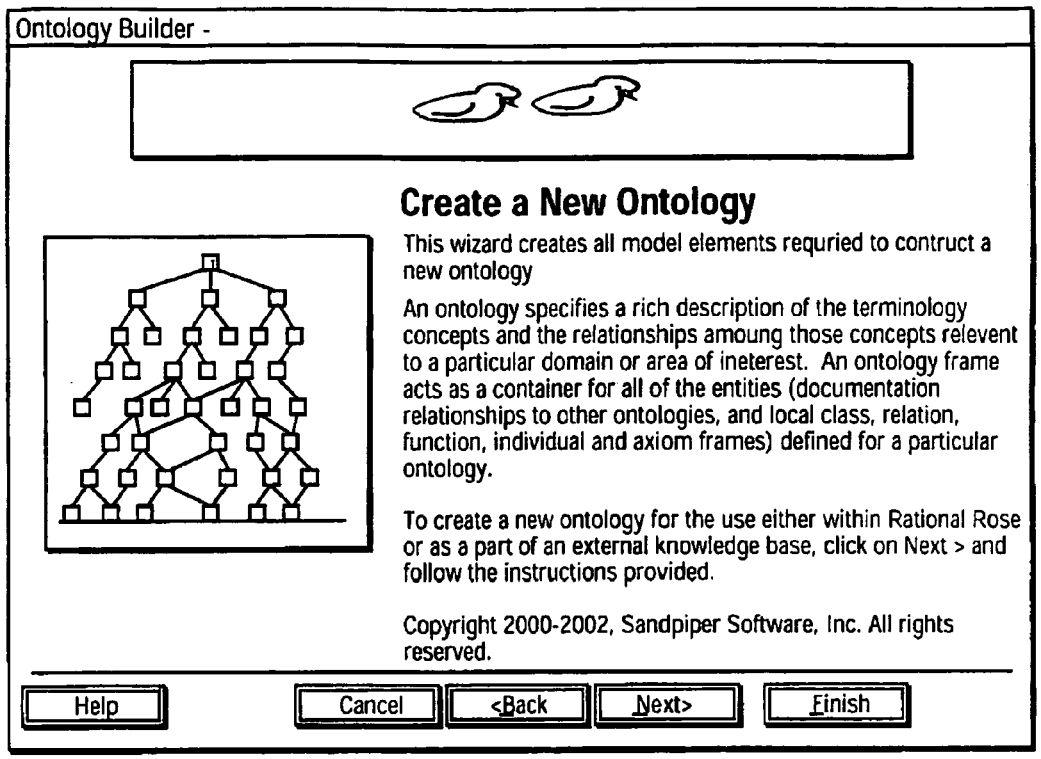
FIG. 9. Create Ontology Wizard Welcome/Splash Screen
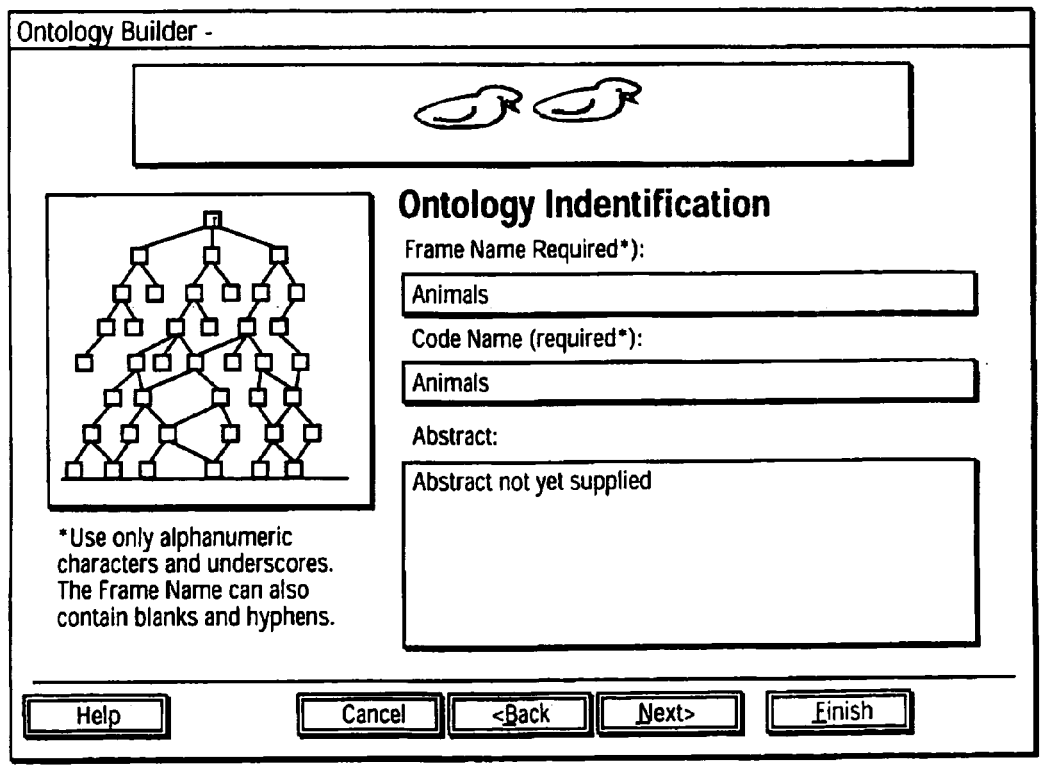
FIG. 10 Entering the ontology's identifying characteristics screen

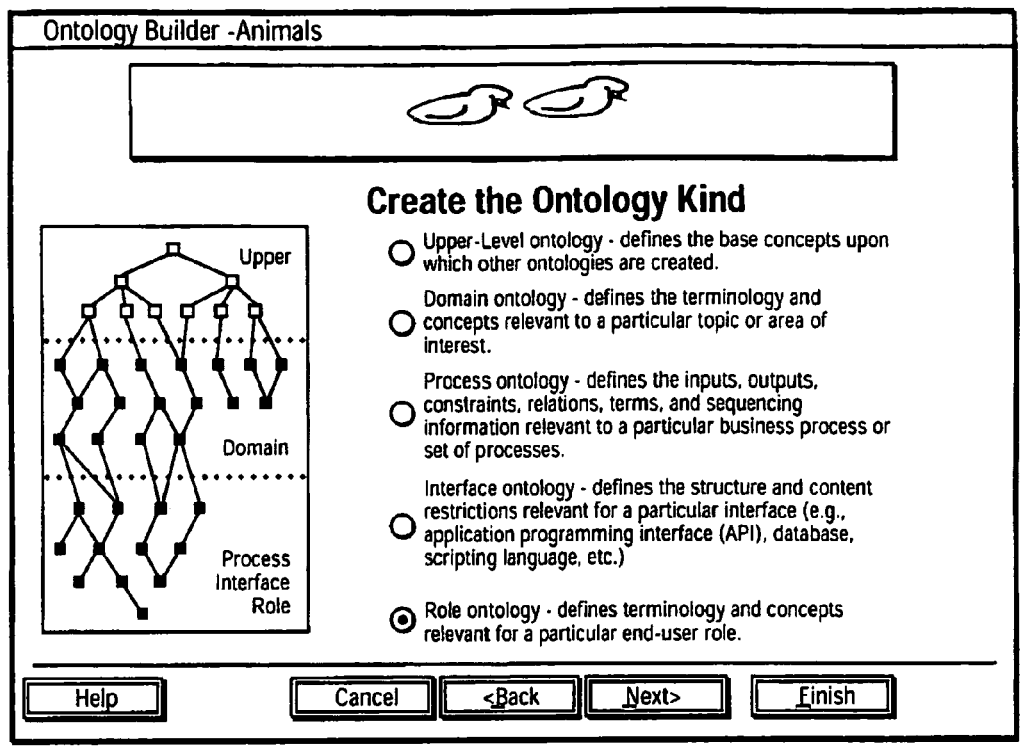
FIG. 11. Select the Ontology Kind Screen
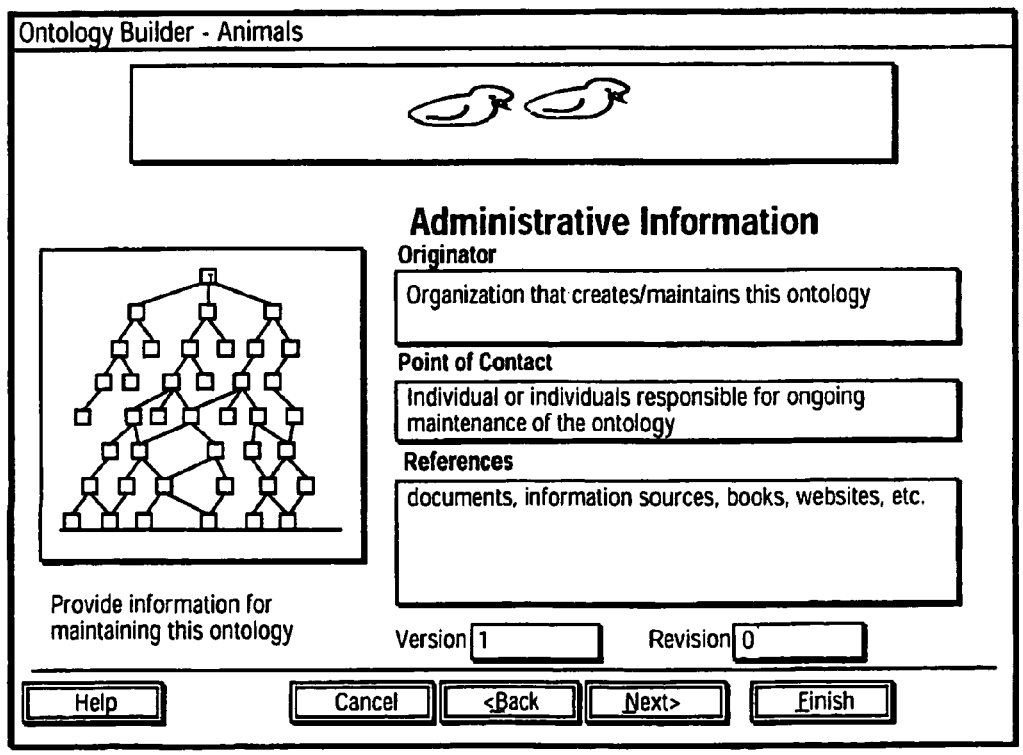
FIG. 12. Enter information for supporting contacts and reference material.

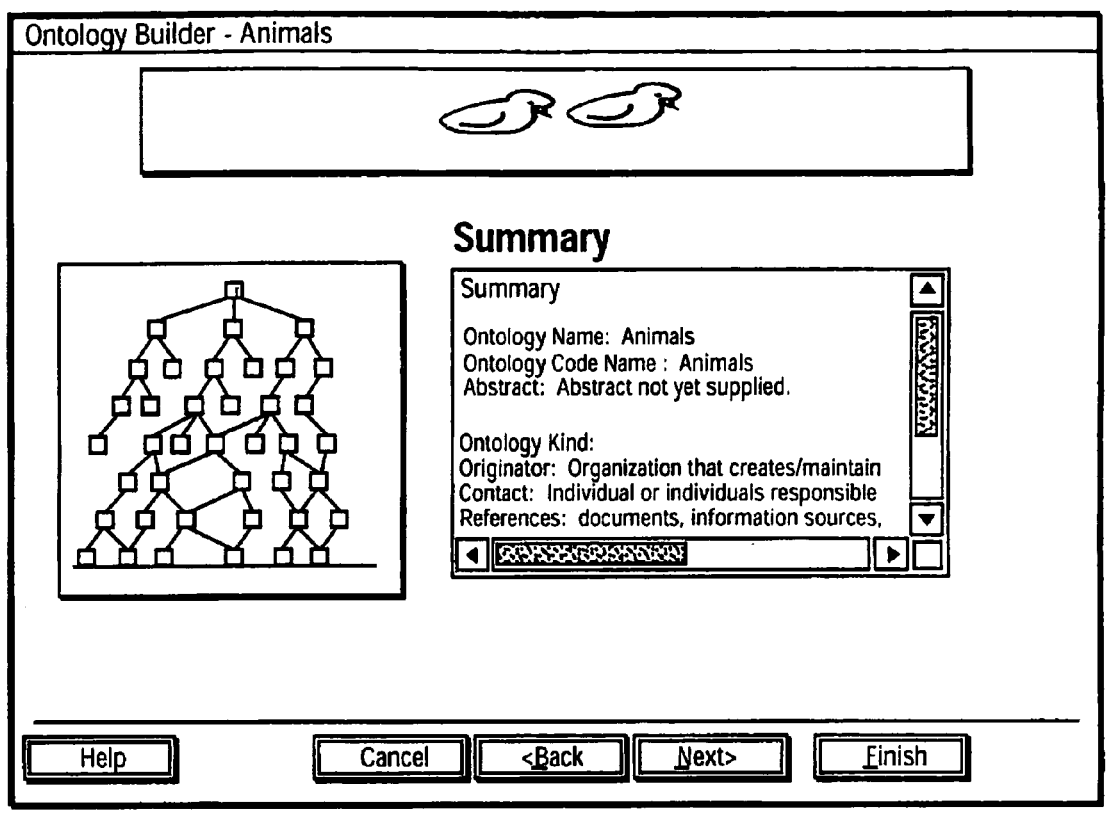
FIG. 13. A summary screen detailing what the user entered.

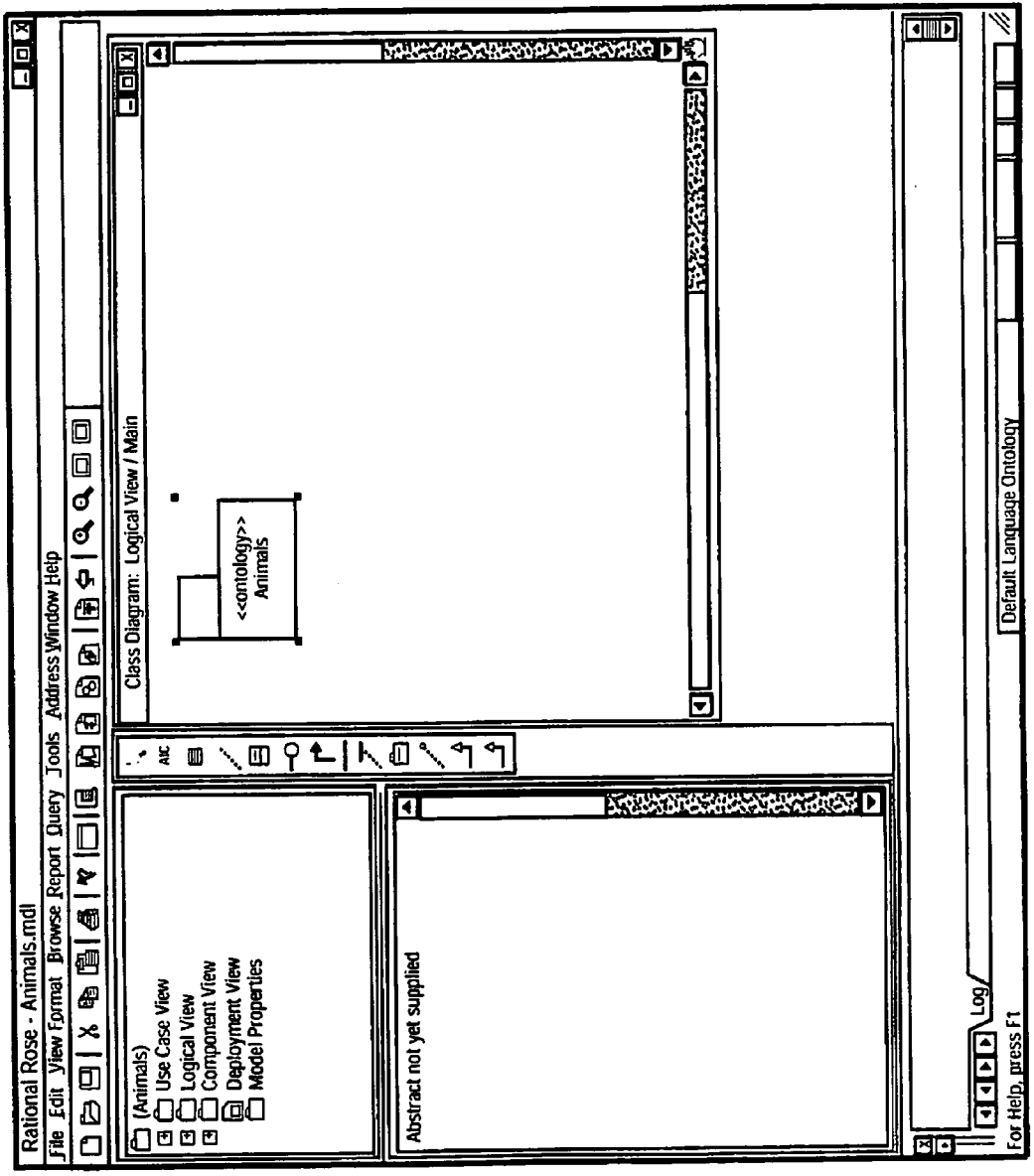
FIG. 14. The resultant empty ontology created in Rational Rose.

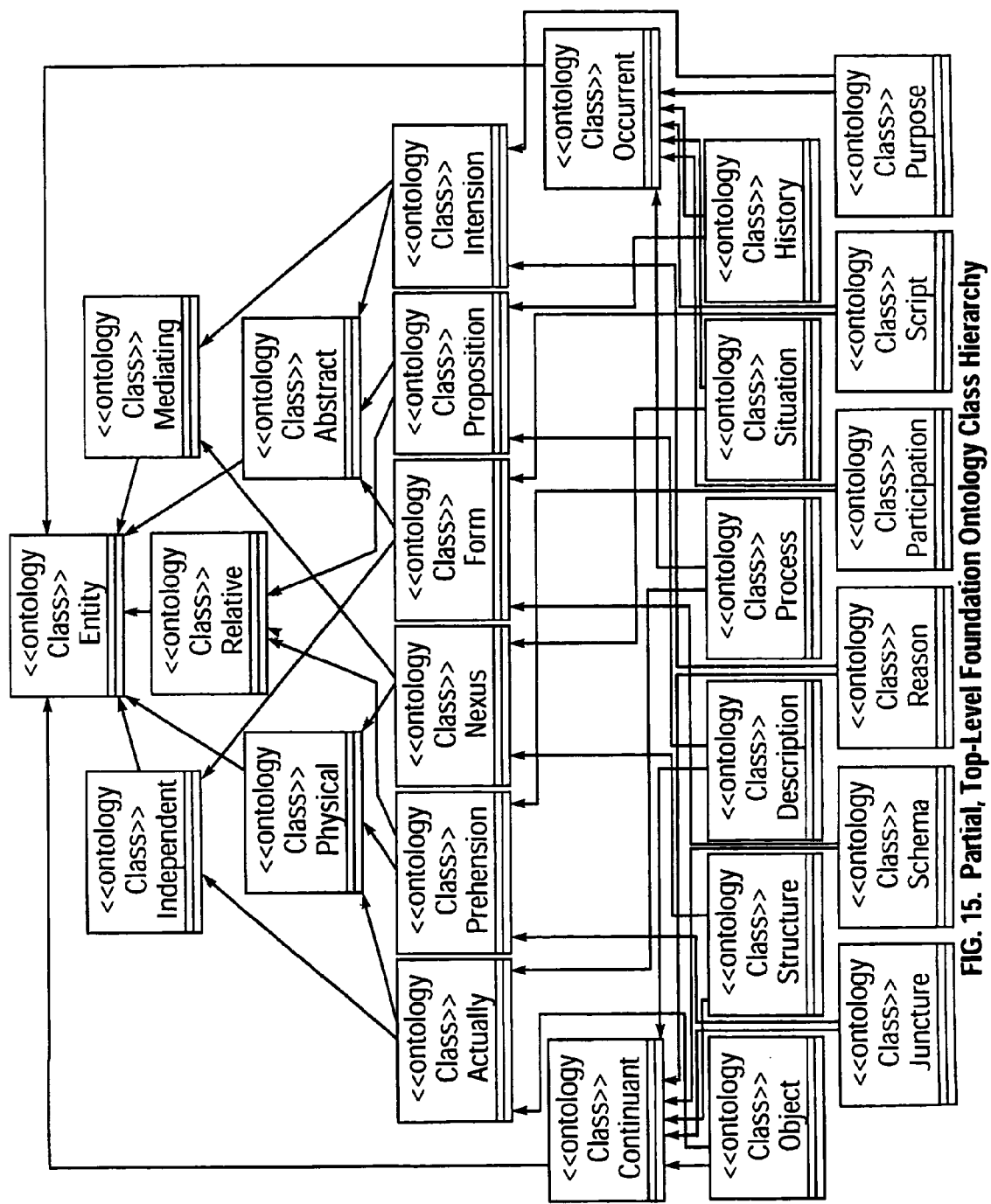
FIG. 15. Partial, Top-Level Foundation Ontology Class Hierarchy

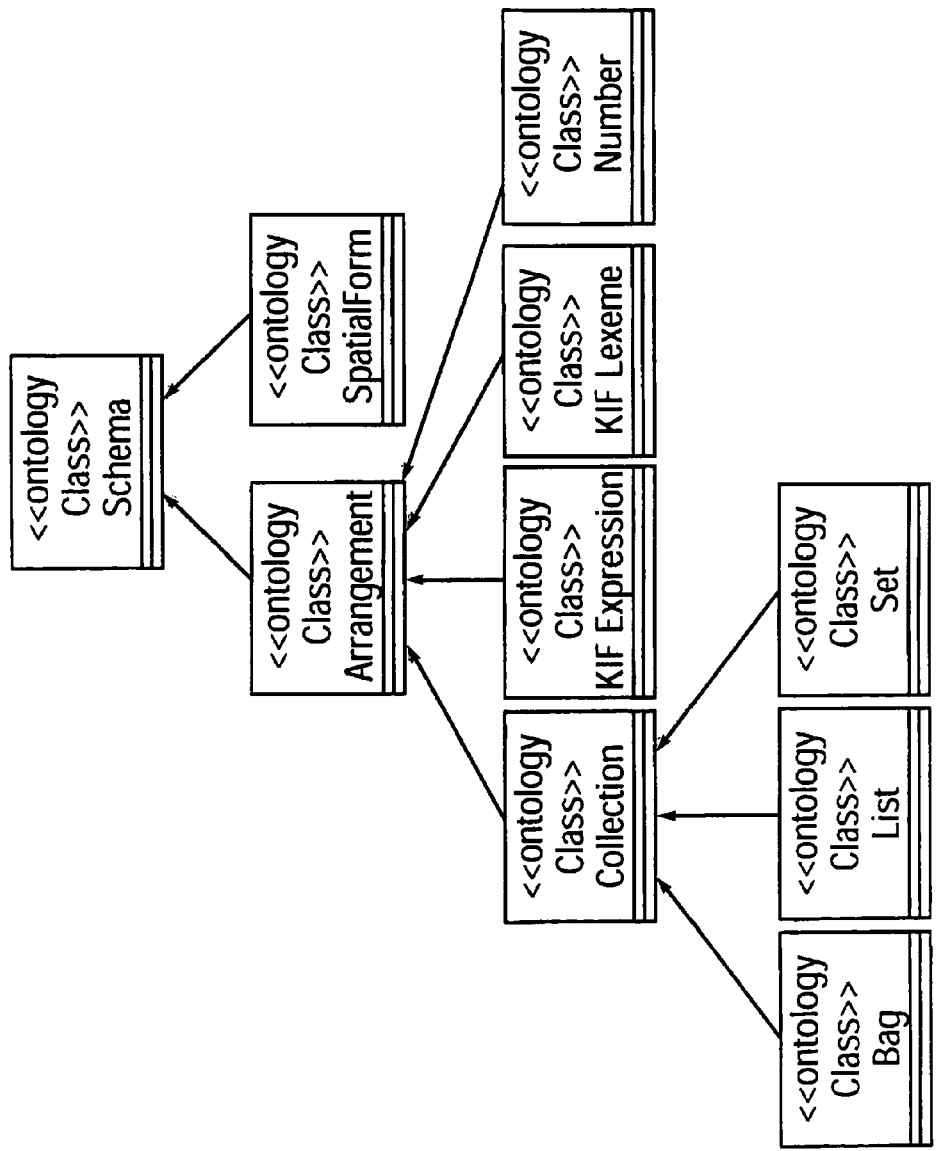
FIG. 16. Schema, Arrangement, and Collection class hierarchy.

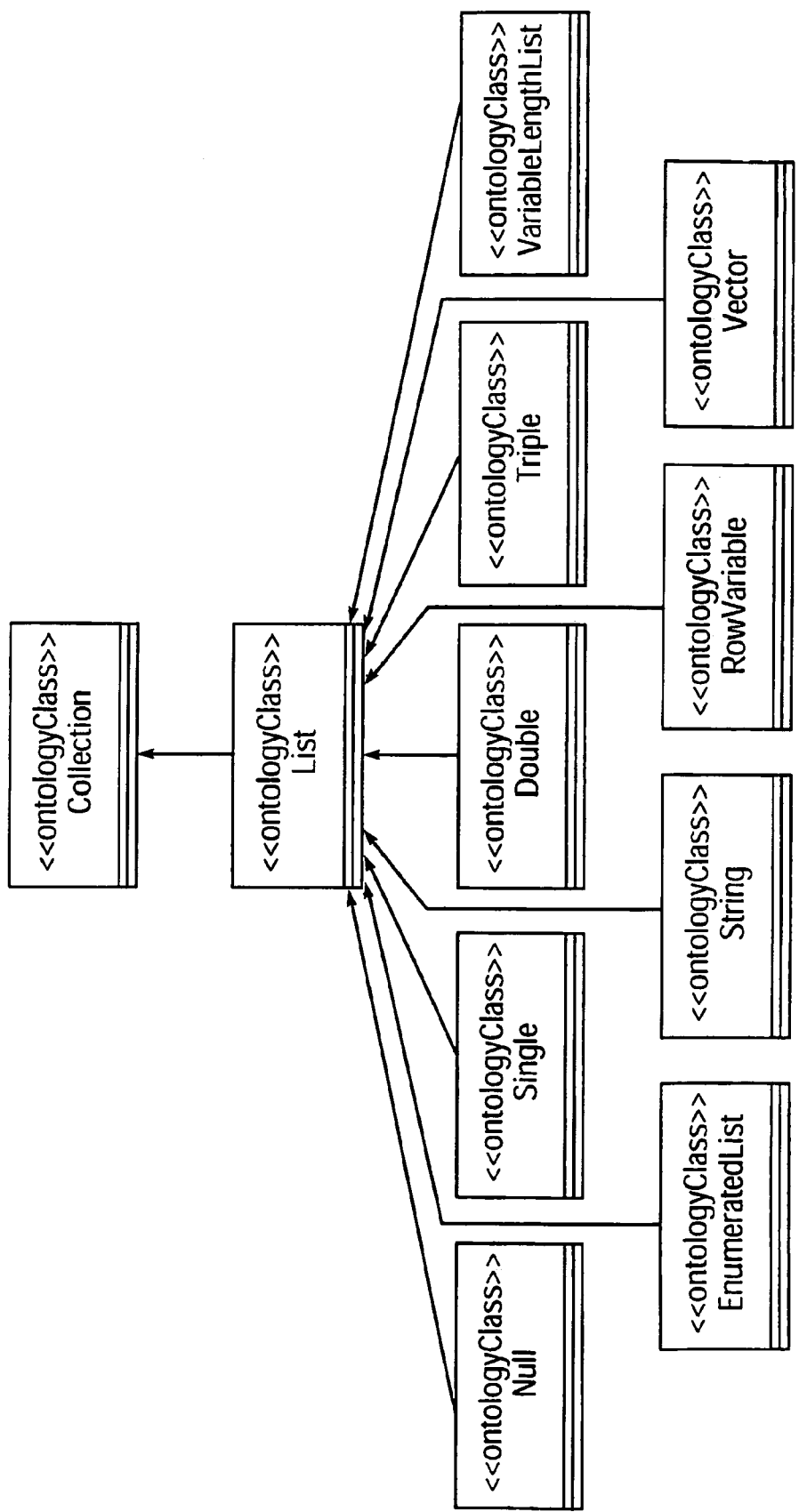
FIG. 17. List class hierarchy

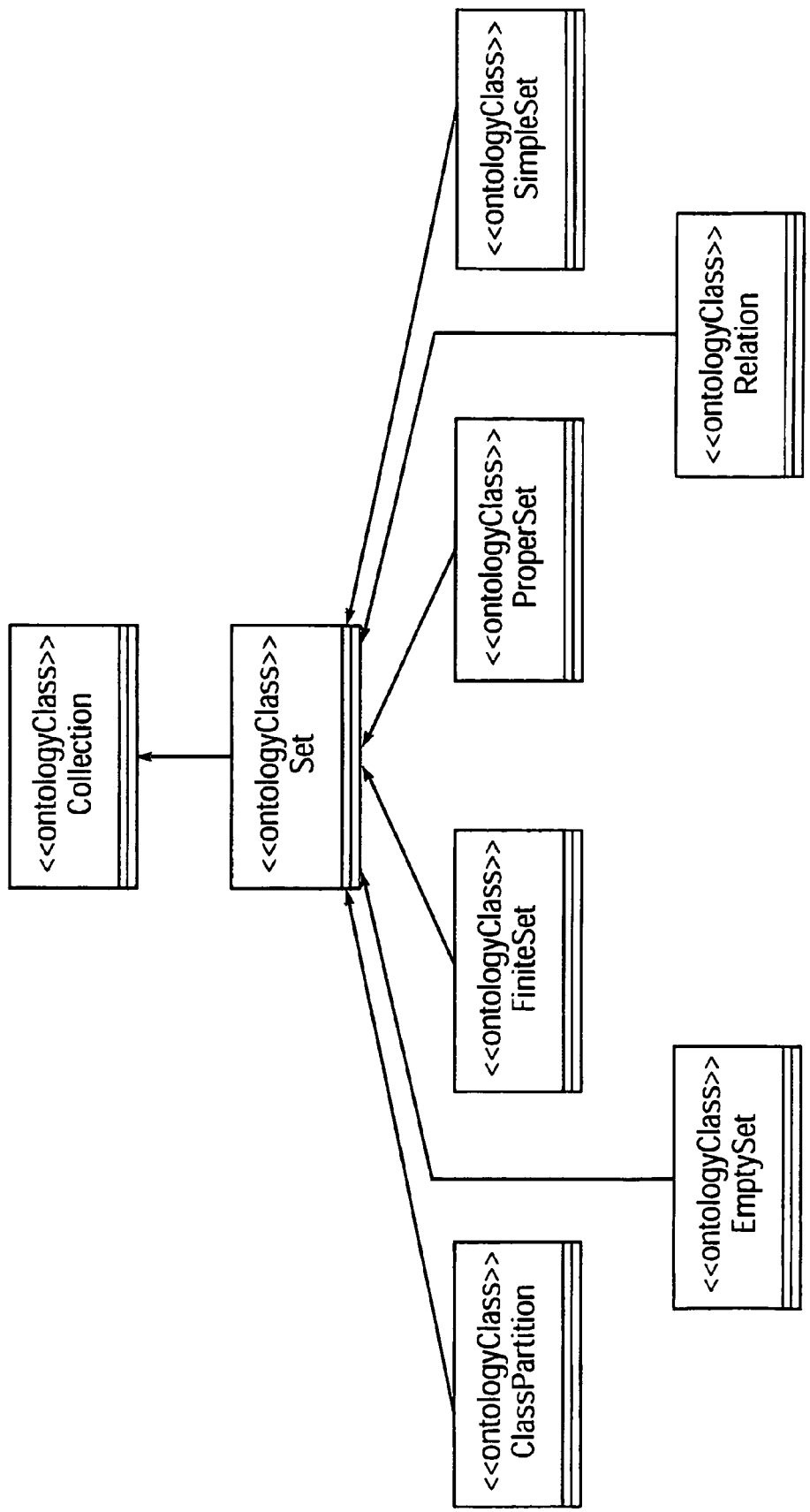
FIG. 18. Set class hierarchy

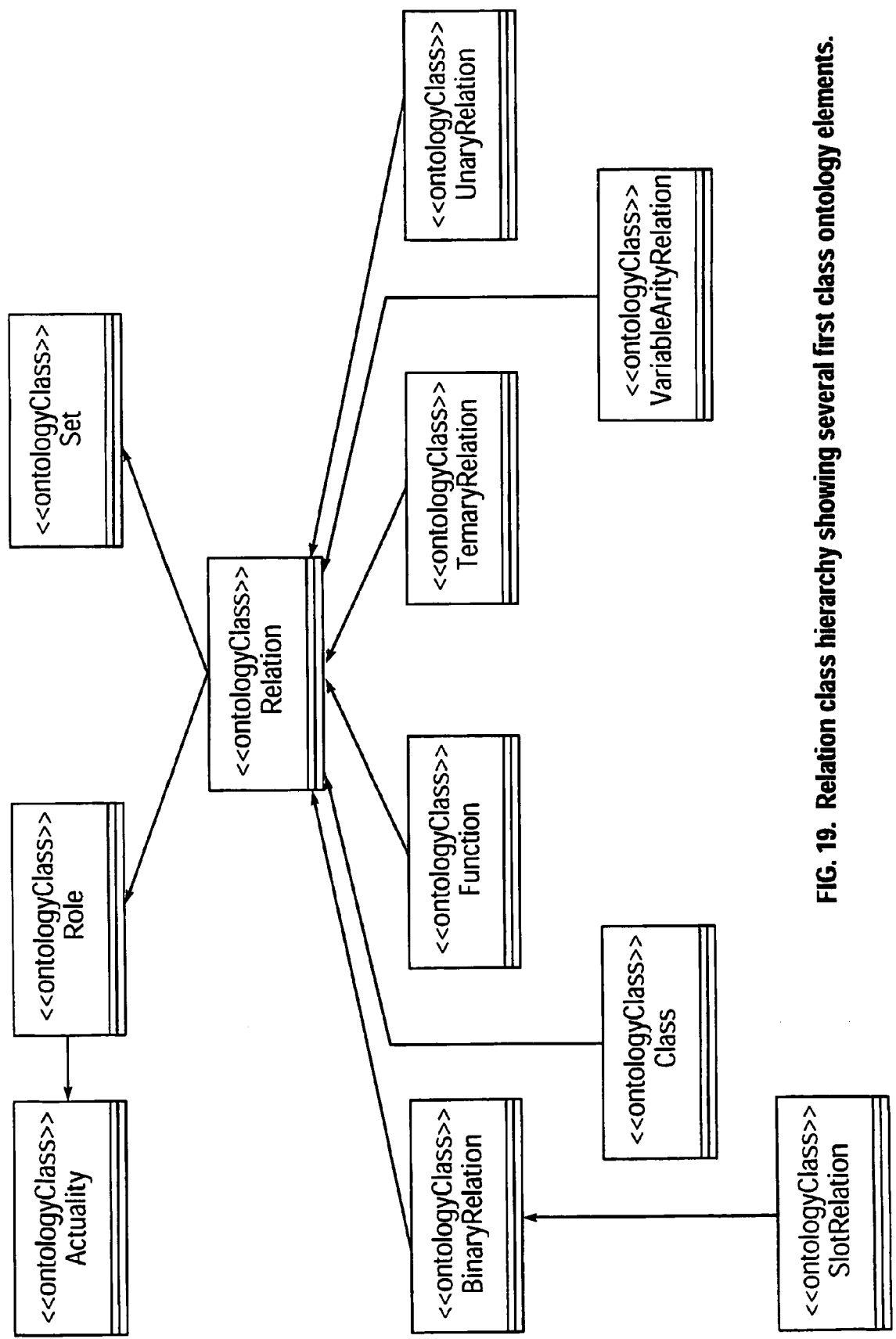
FIG. 19. Relation class hierarchy showing several first class ontology elements.

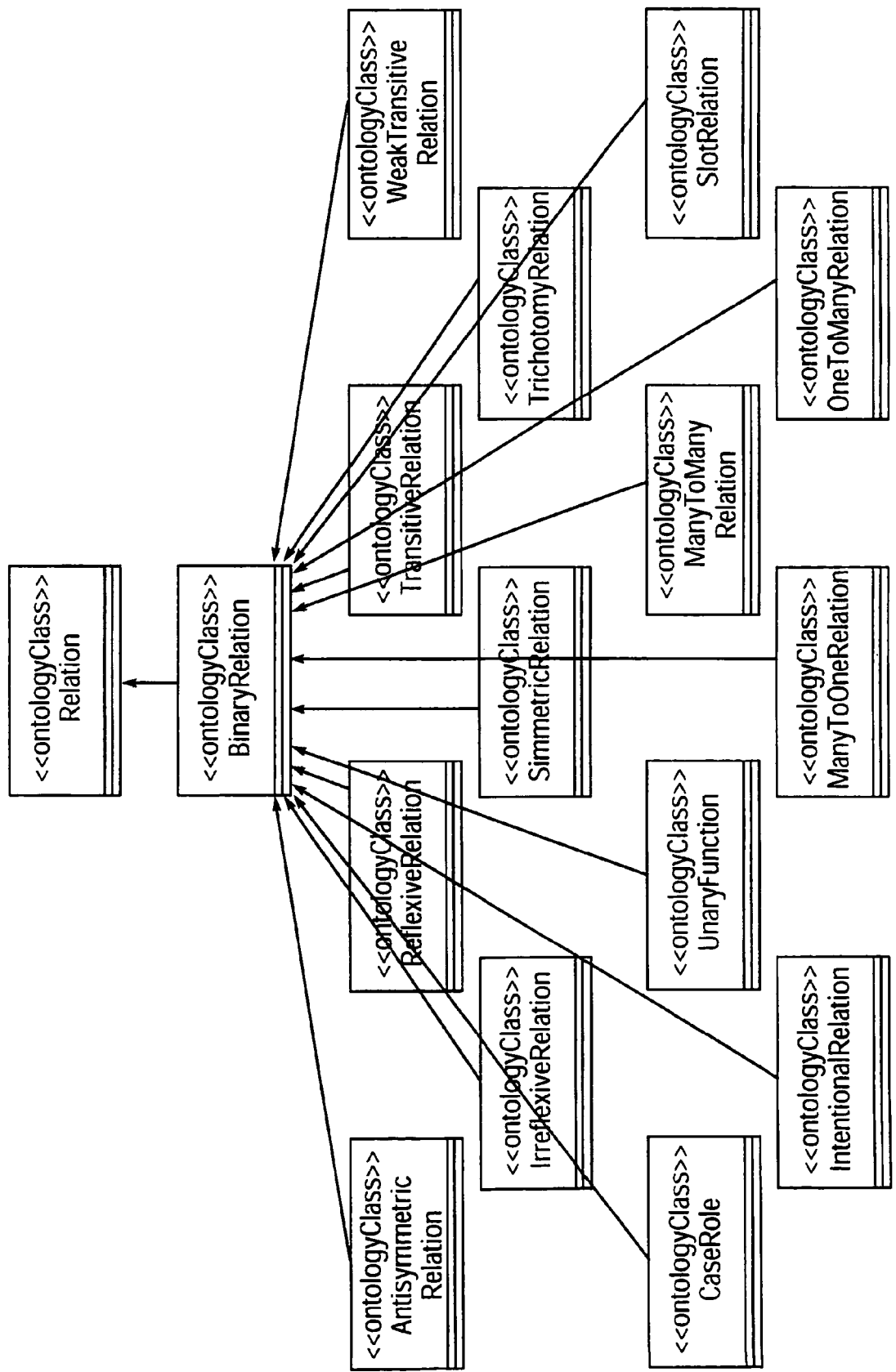
FIG. 20. Binary relation class hierarchy showing some of the relation types utilized by the builder.

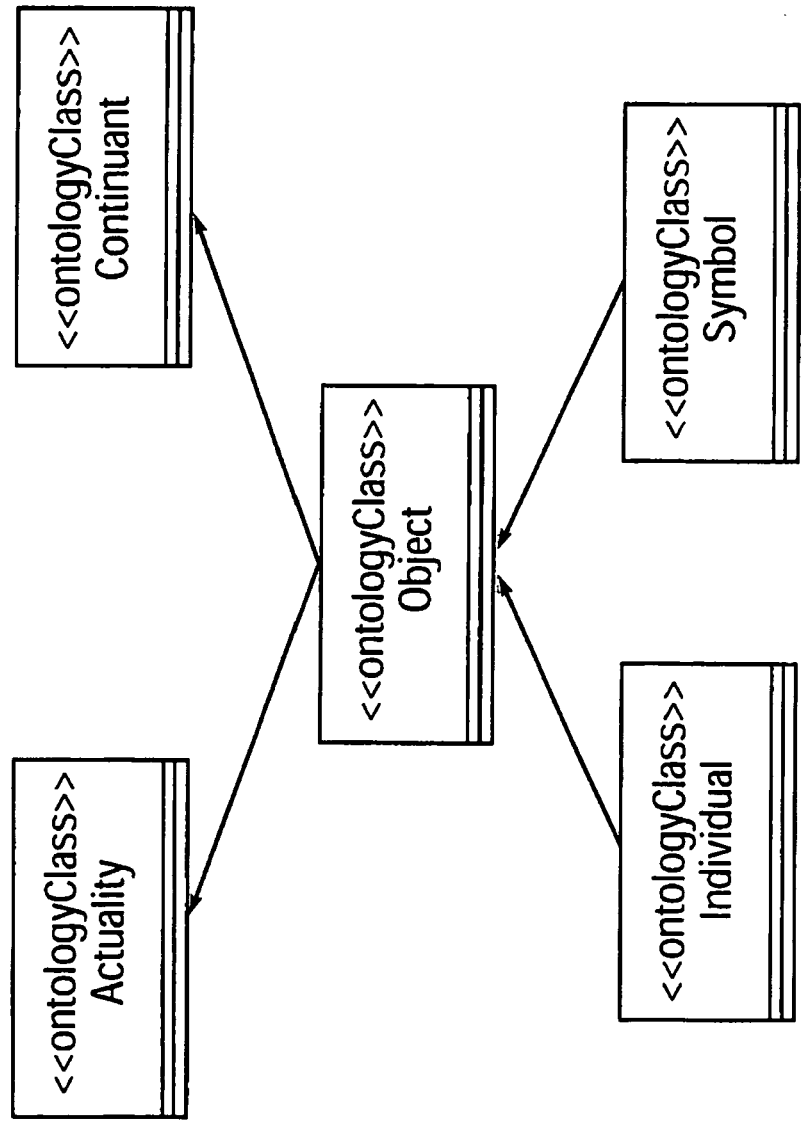
FIG. 21. Object class hierarchy showing the class lineage for individual.

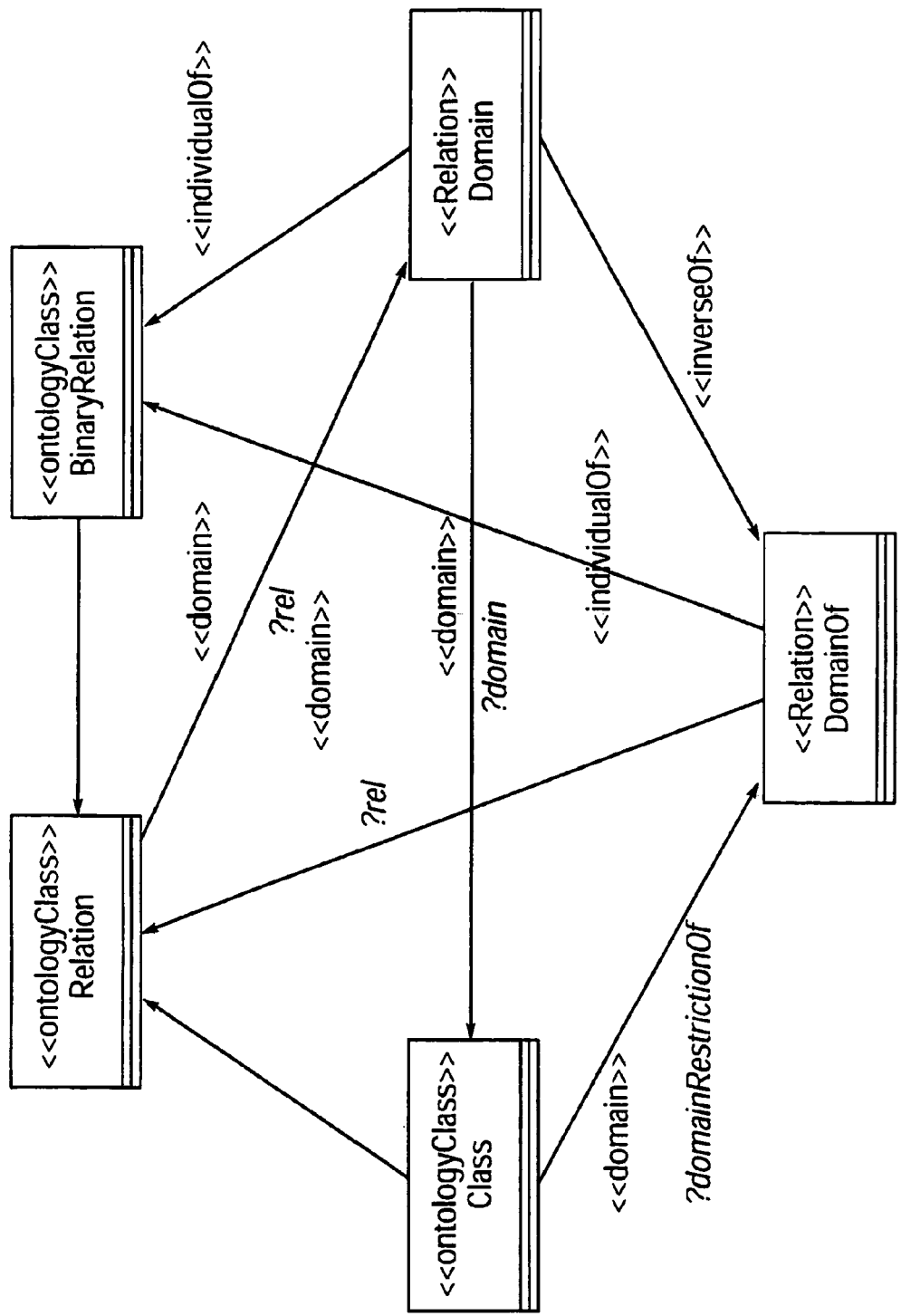
FIG. 22. Example call diagram for binary relations, such as domain and domainOf.

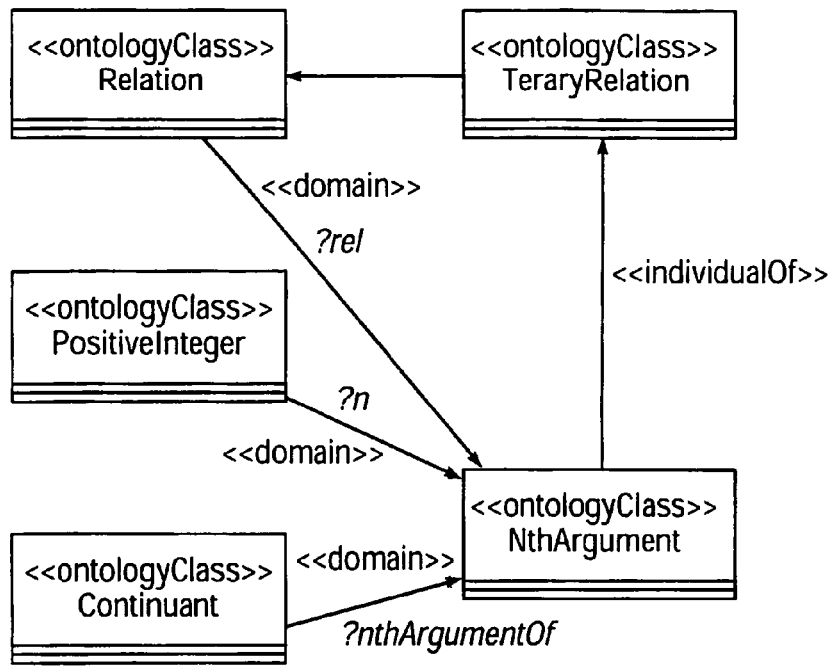
FIG. 23. Example of class diagram for ternary relations, such as nthArgumentOf
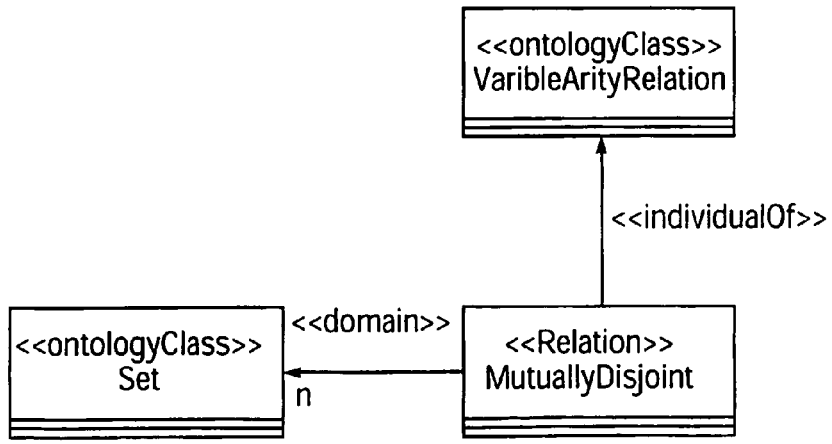
FIG. 24. Example of class diagram for varible arity relations, such as mutuallyDisjoint.

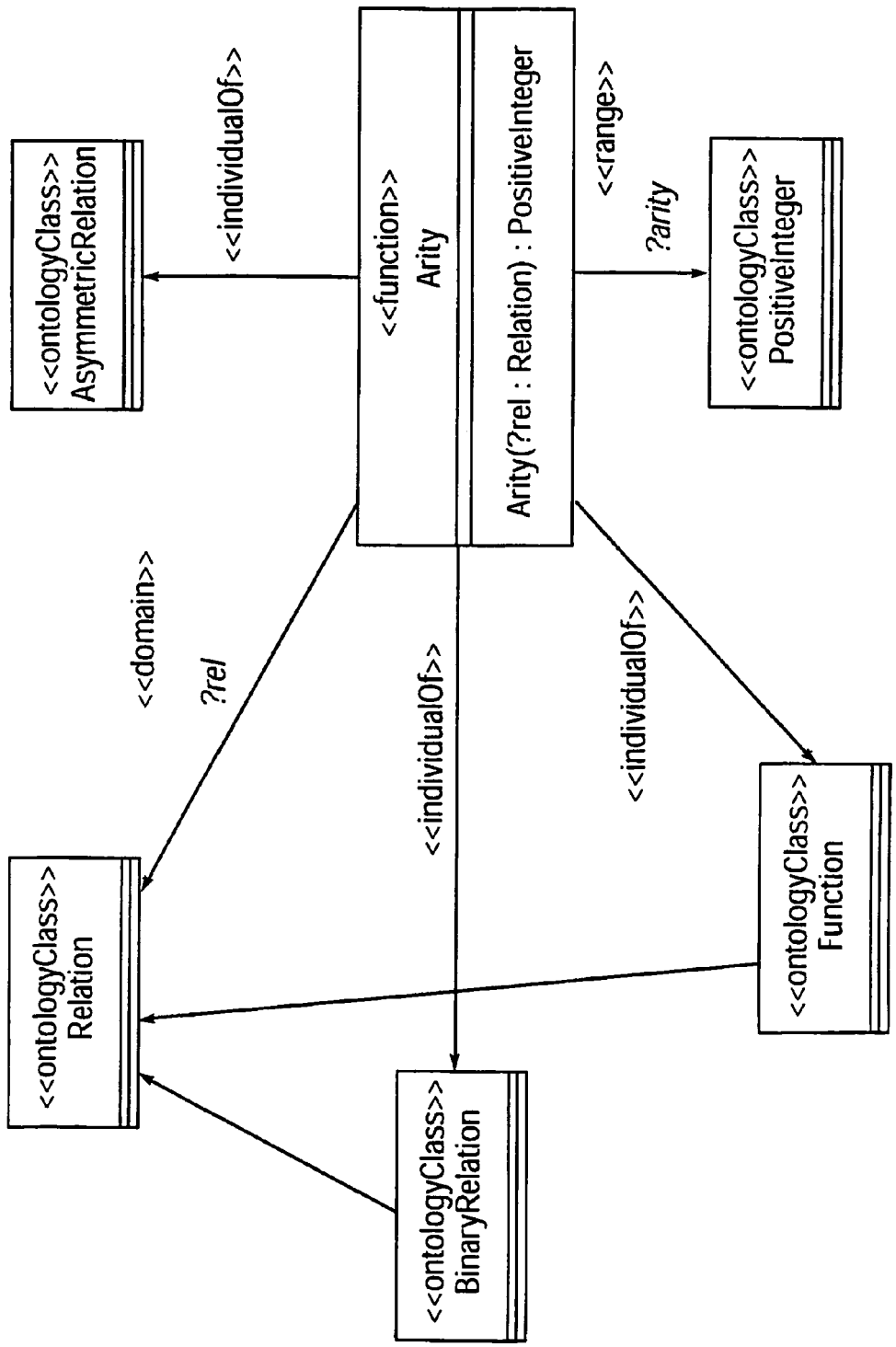
FIG. 25. Example class diagram for unary functions, such as asrity.

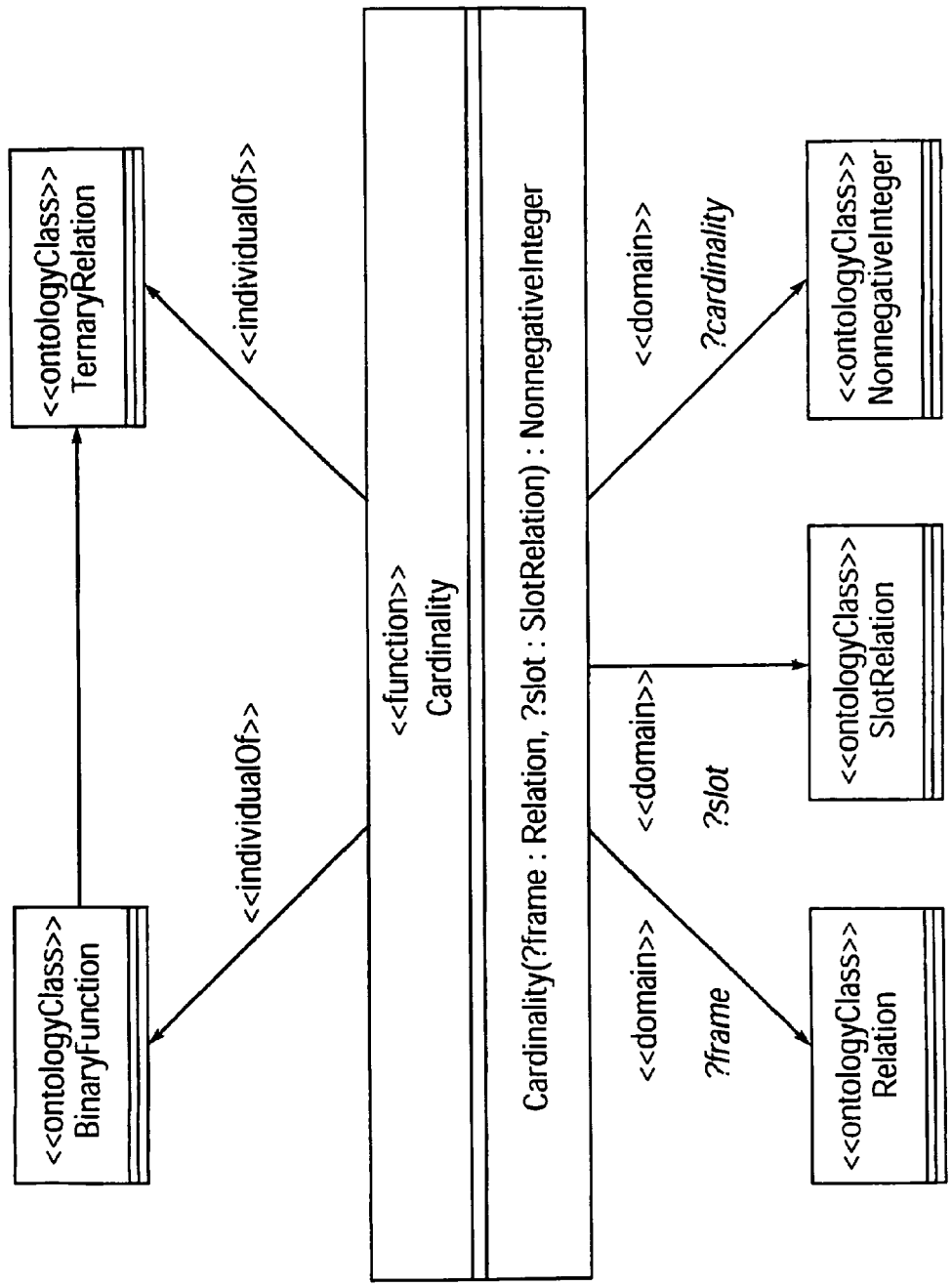
FIG. 26. Example class diagram for binary functions, such as cardinality.

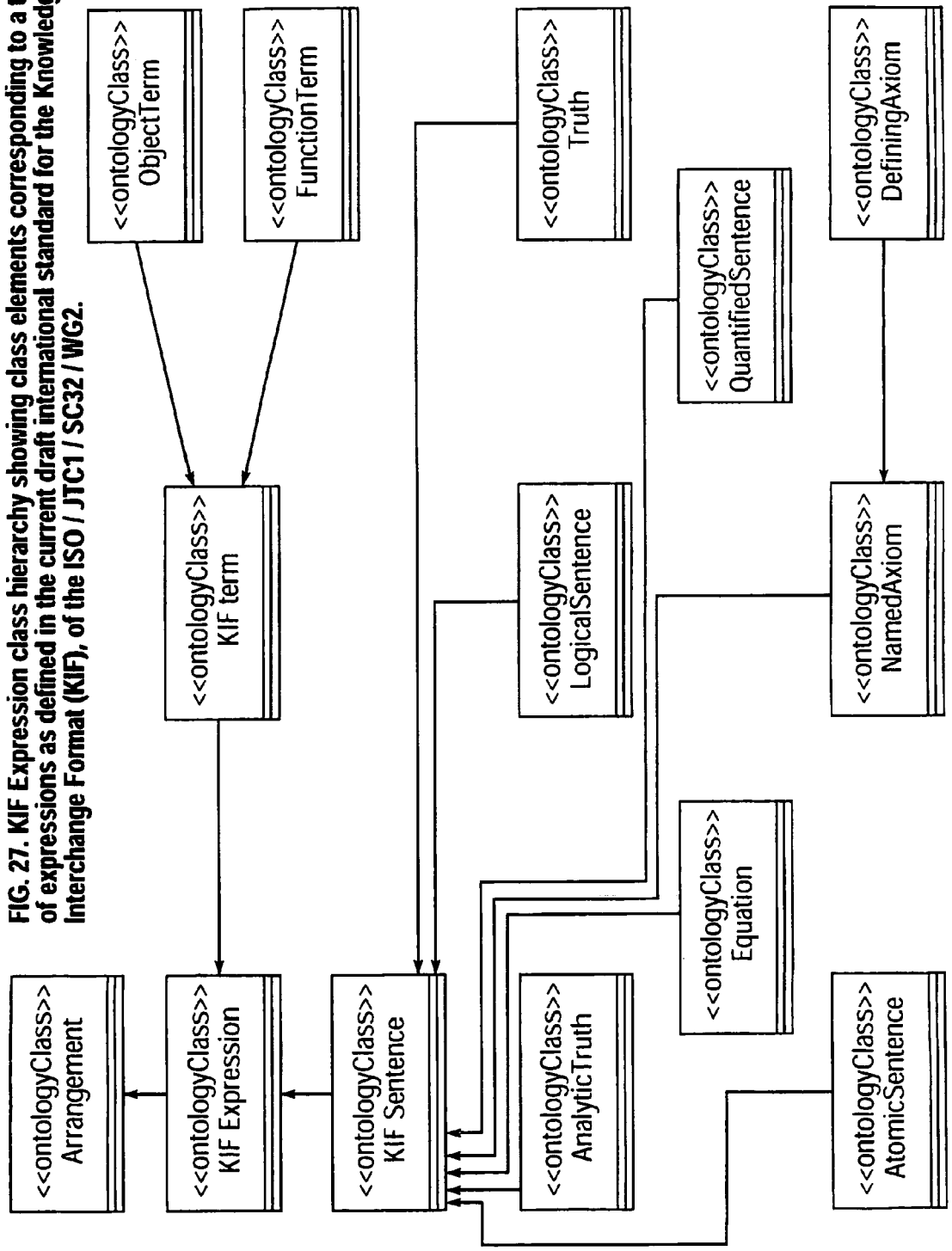
FIG. 27. KIF Expression class hierarchy showing class elements corresponding to a theory of expressions as defined in the current draft international standard for the Knowledge Interchange Format (KIF), of the ISO / JTC1 / SC32 / WG2.

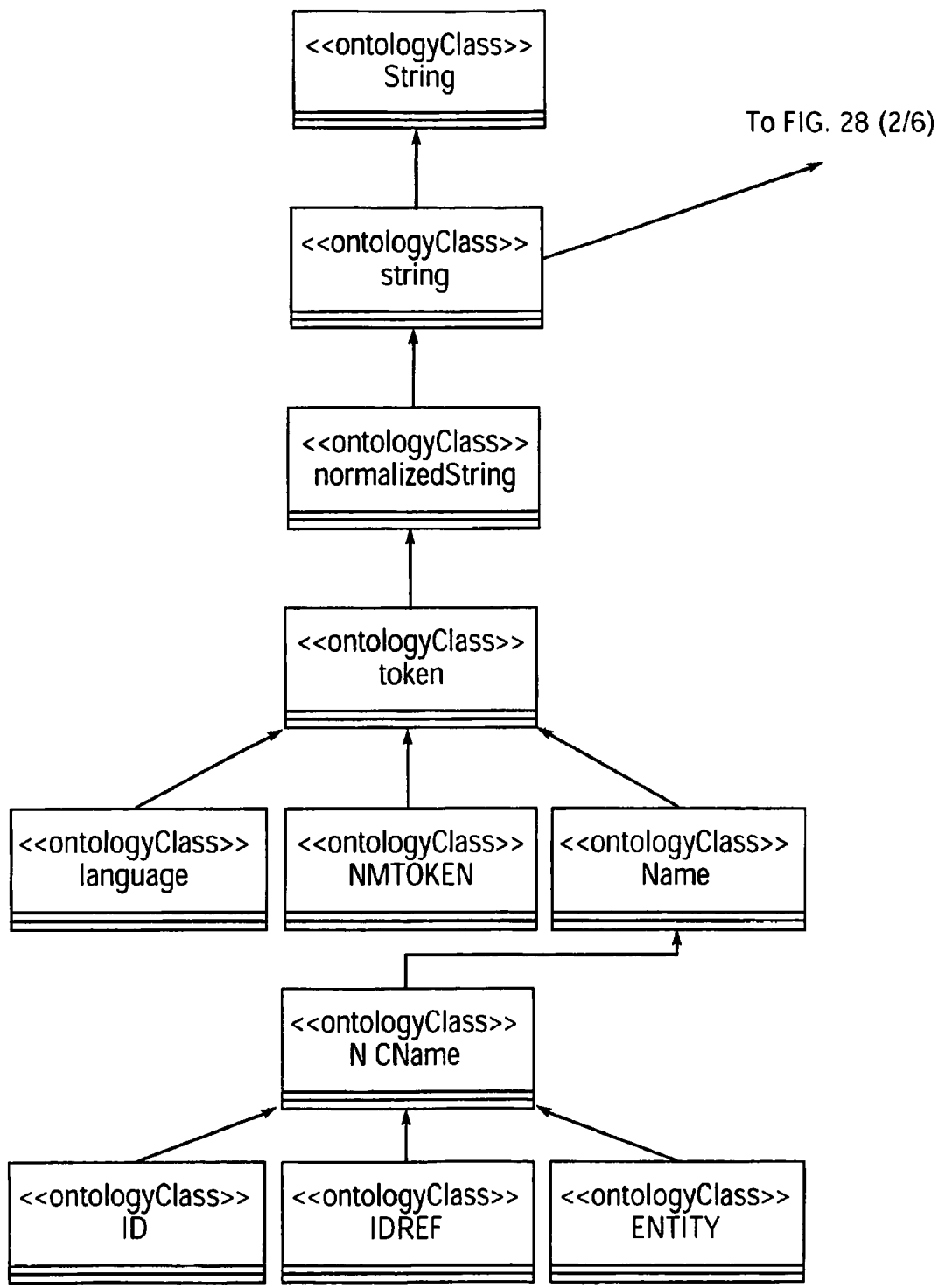
FIG. 28. (1/6) XML Schema Datatypes class hierarchy showing class elements corresponding to the W3C specification, including property definitions.

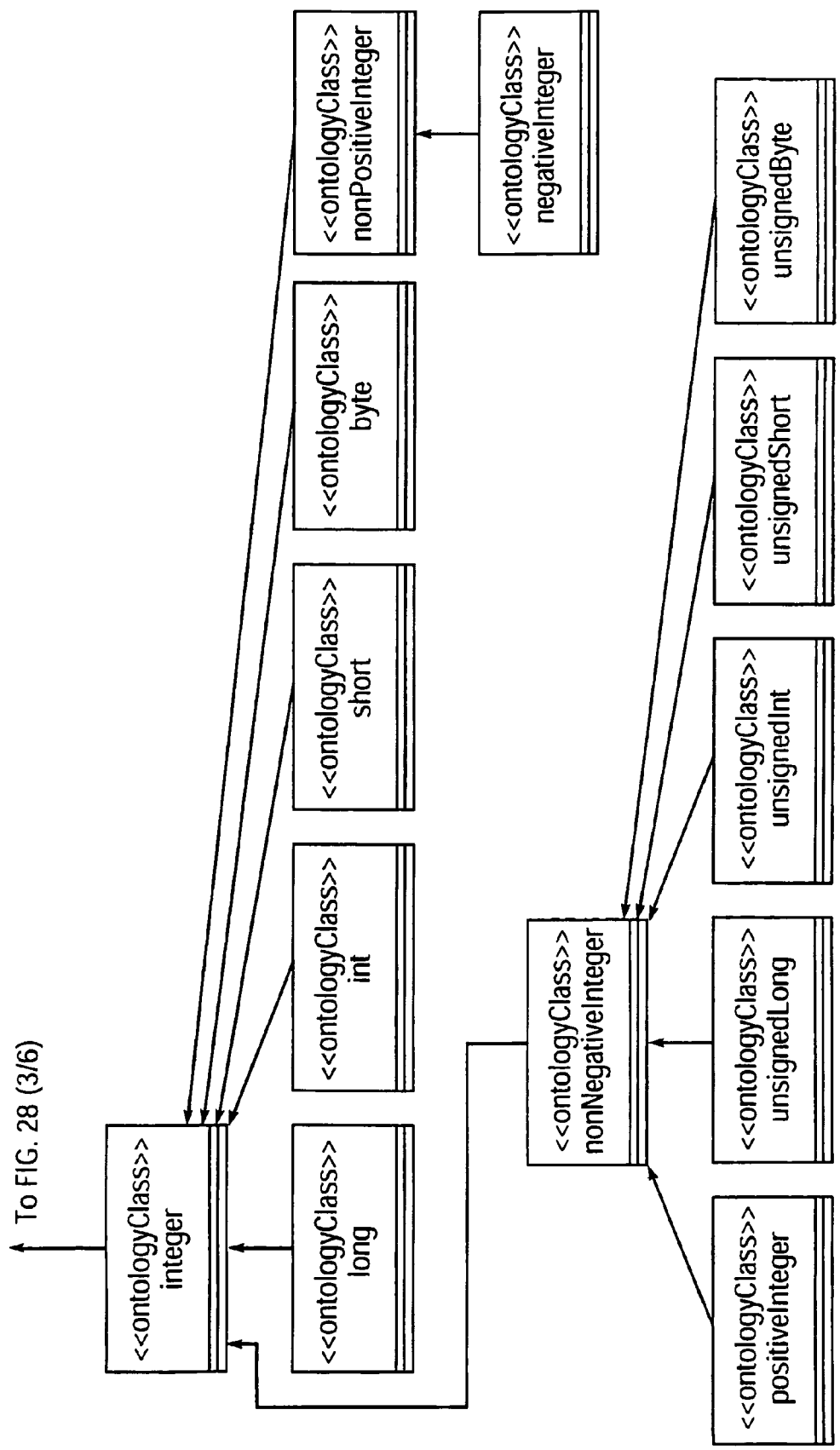
FIG. 28. (2/6) XML Schema Datatypes class hierarchy showing class elements corresponding to the W3C specification, including property definitions.

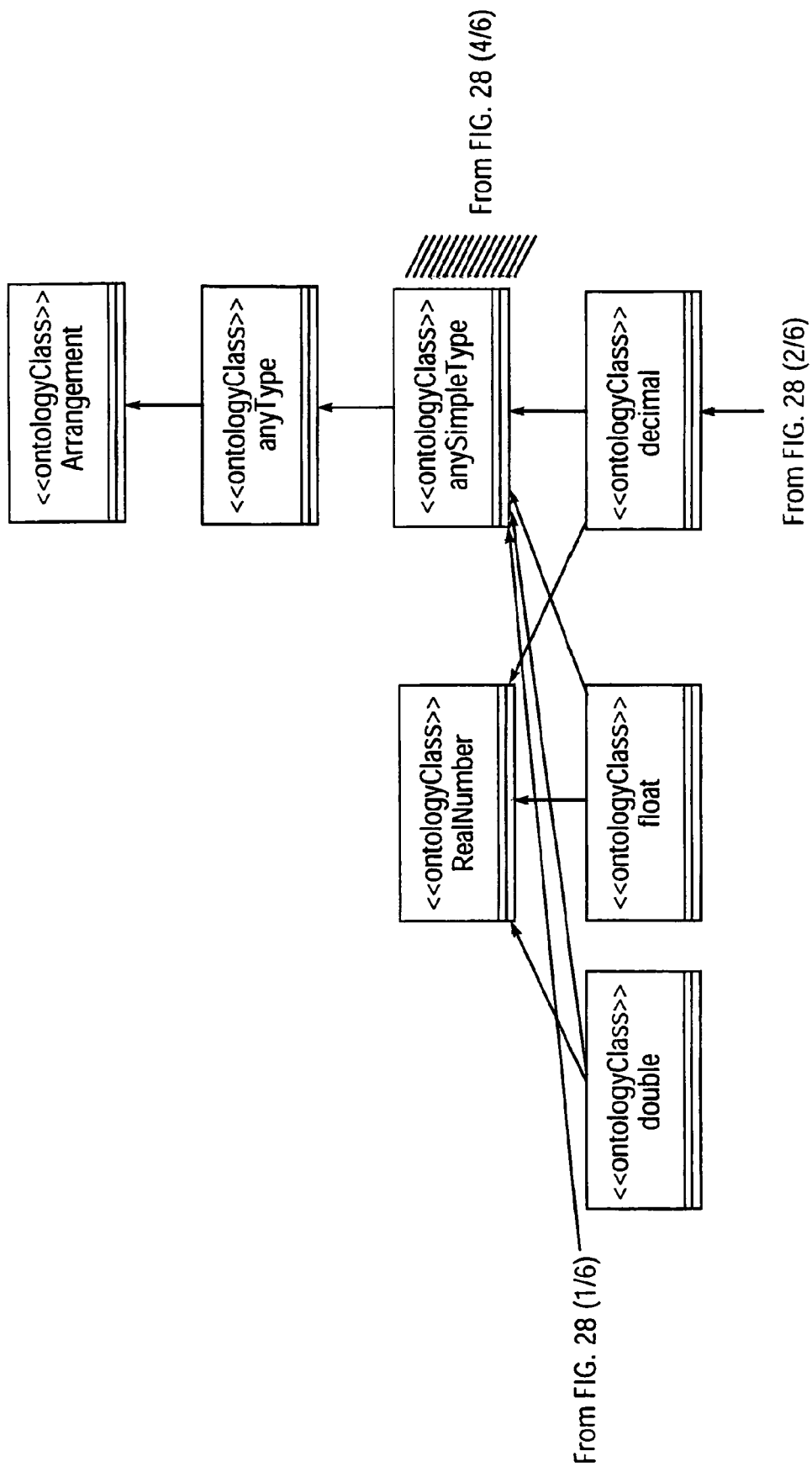
FIG. 28. (3/6) XML Schema Datatypes class hierarchy showing class elements corresponding to the W3C specification, including property definitions.

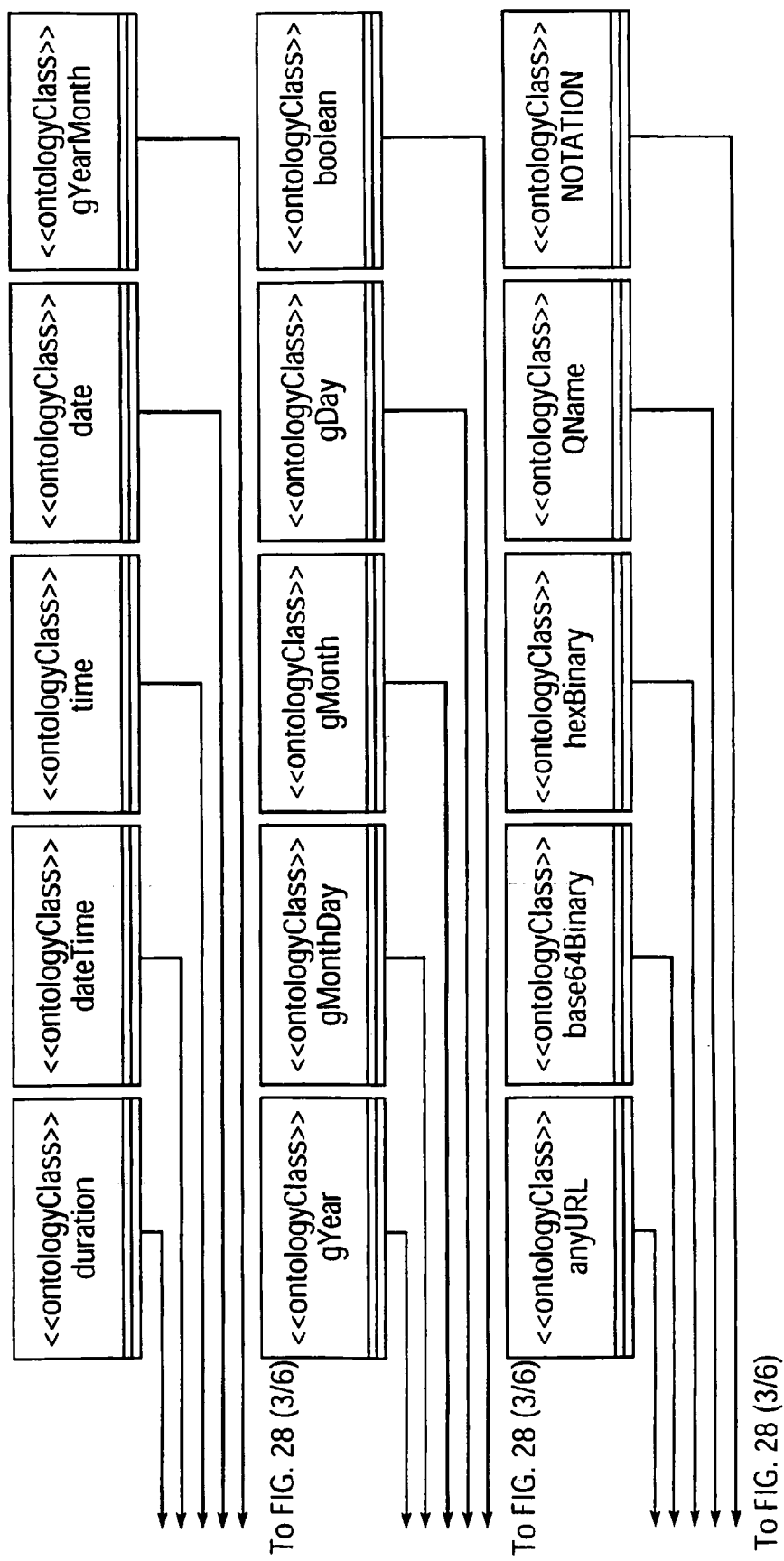
FIG. 28. (4/6) XML Schema Datatypes class hierarchy showing class elements corresponding to the W3C specification, including property definitions.

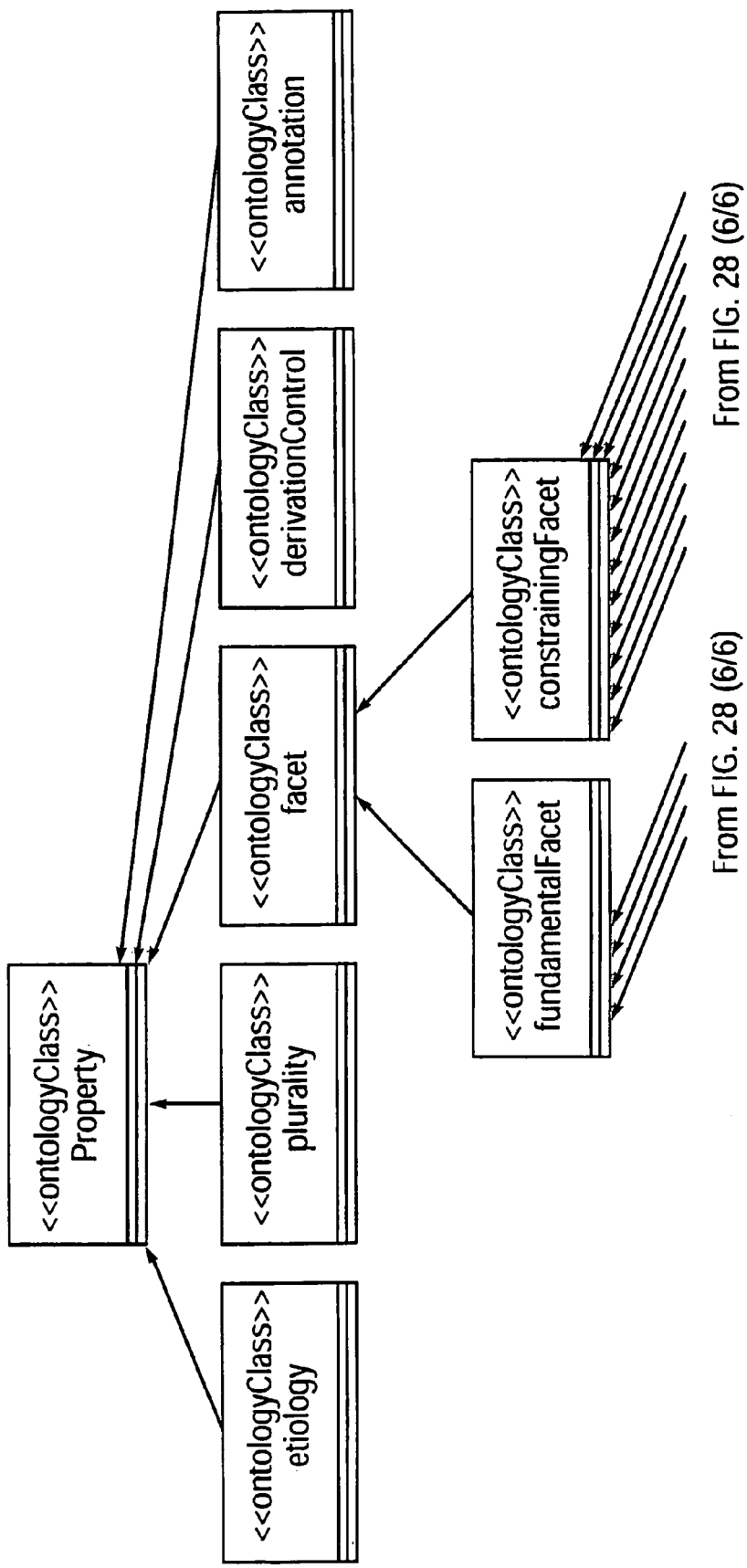
FIG. 28. (5/6) XML Schema Datatypes class hierarchy showing class elements corresponding to the W3C specification, including property definitions.

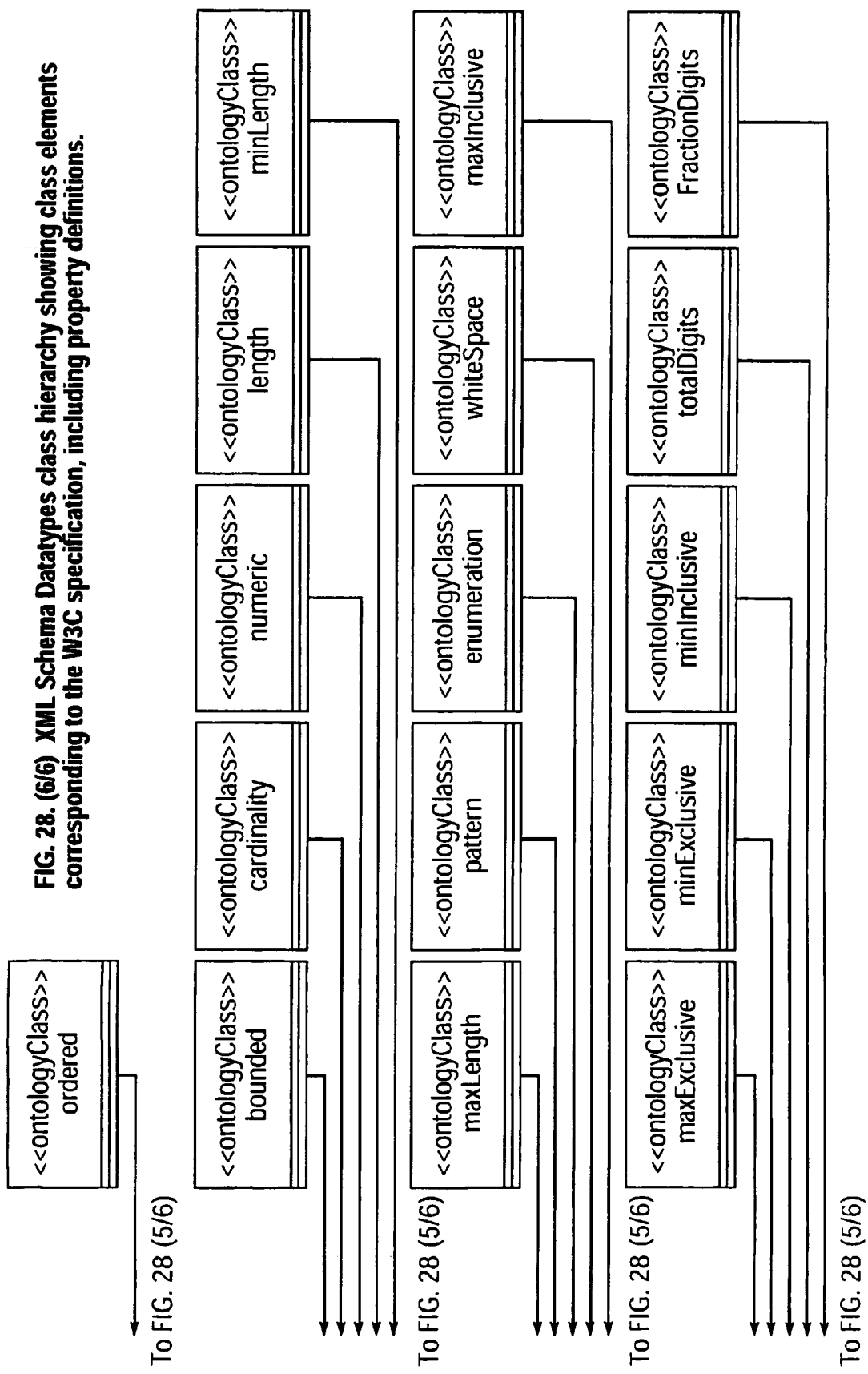
FIG. 28. (6/6) XML Schema Datatypes class hierarchy showing class elements corresponding to the W3C specification, including property definitions.

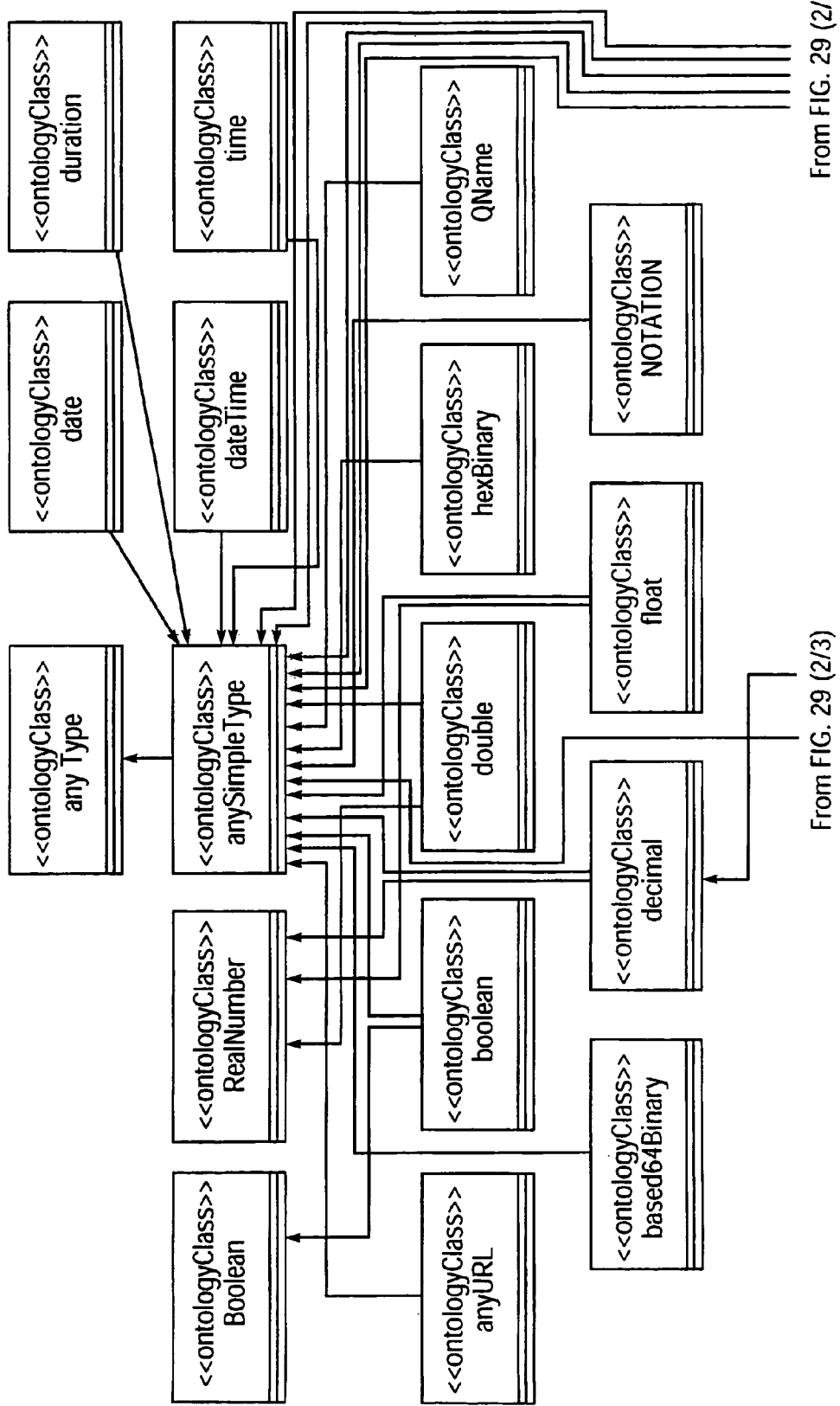
FIG. 29. (1/3) Expanded View, XML Schema Datatypes class hierarchy.

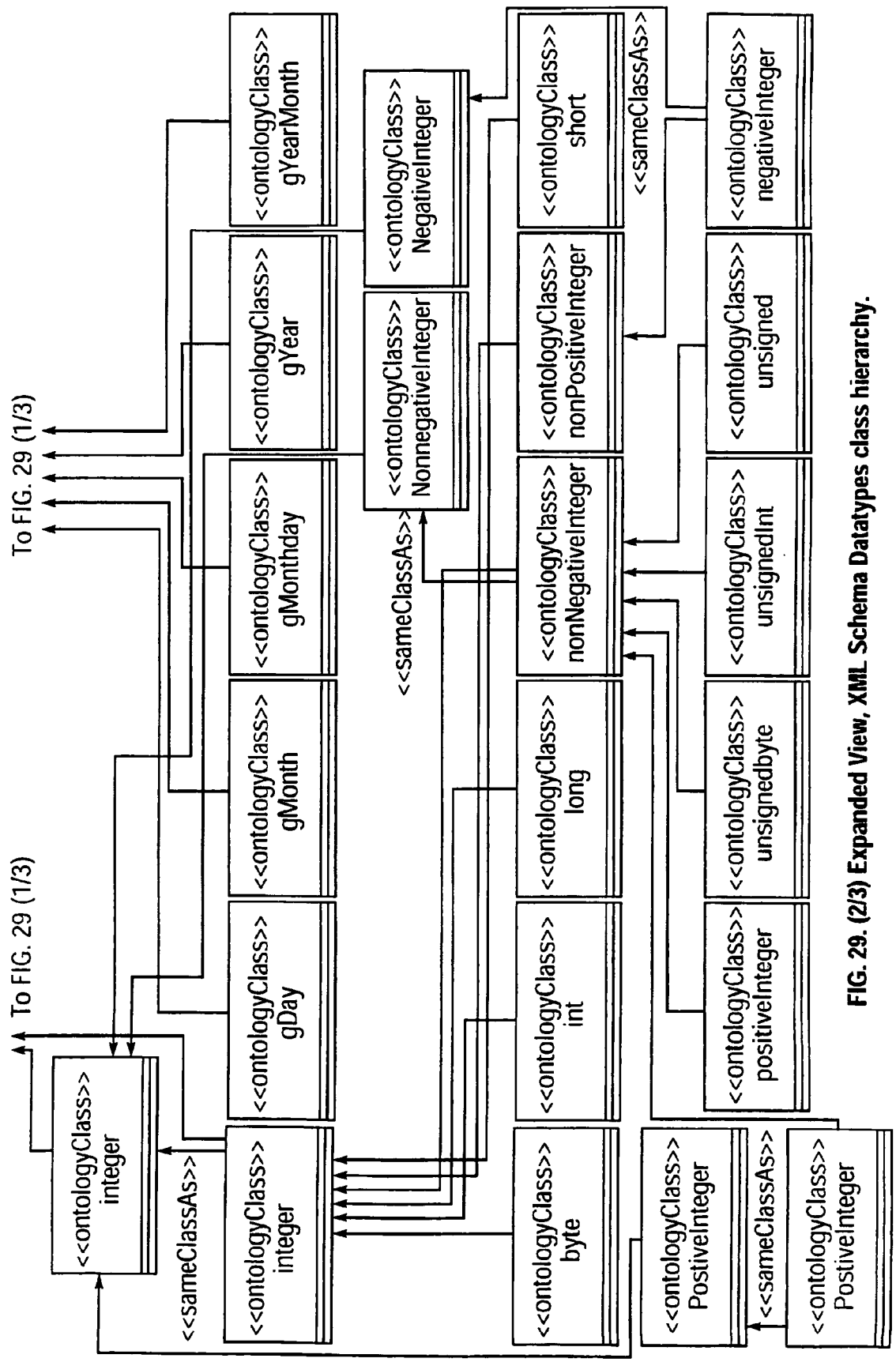
FIG. 29. (2/3) Expanded View, XML Schema Datatypes class hierarchy.

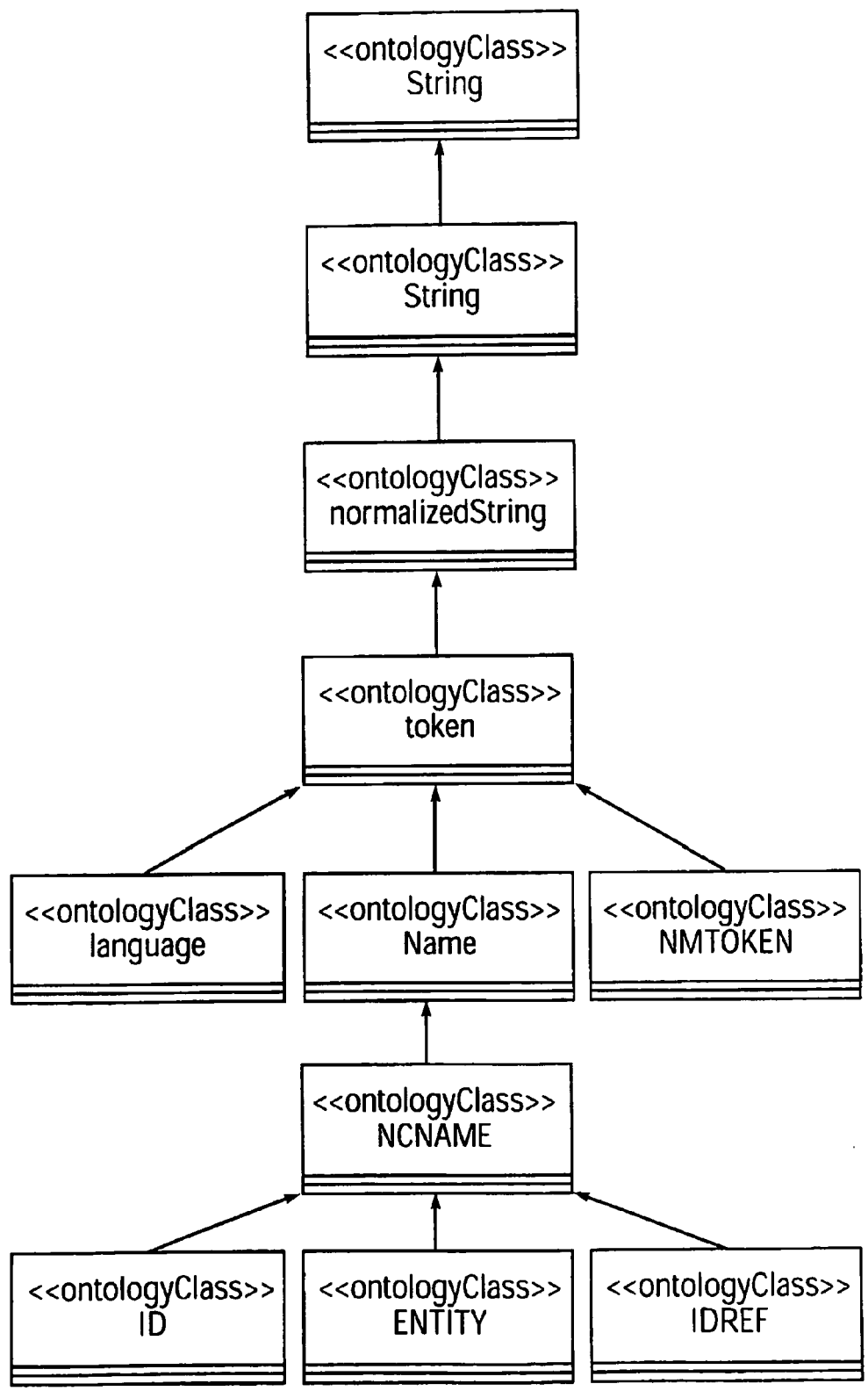
FIG. 29. (3/3) Expanded View, XML Schema Datatypes class hierarchy.

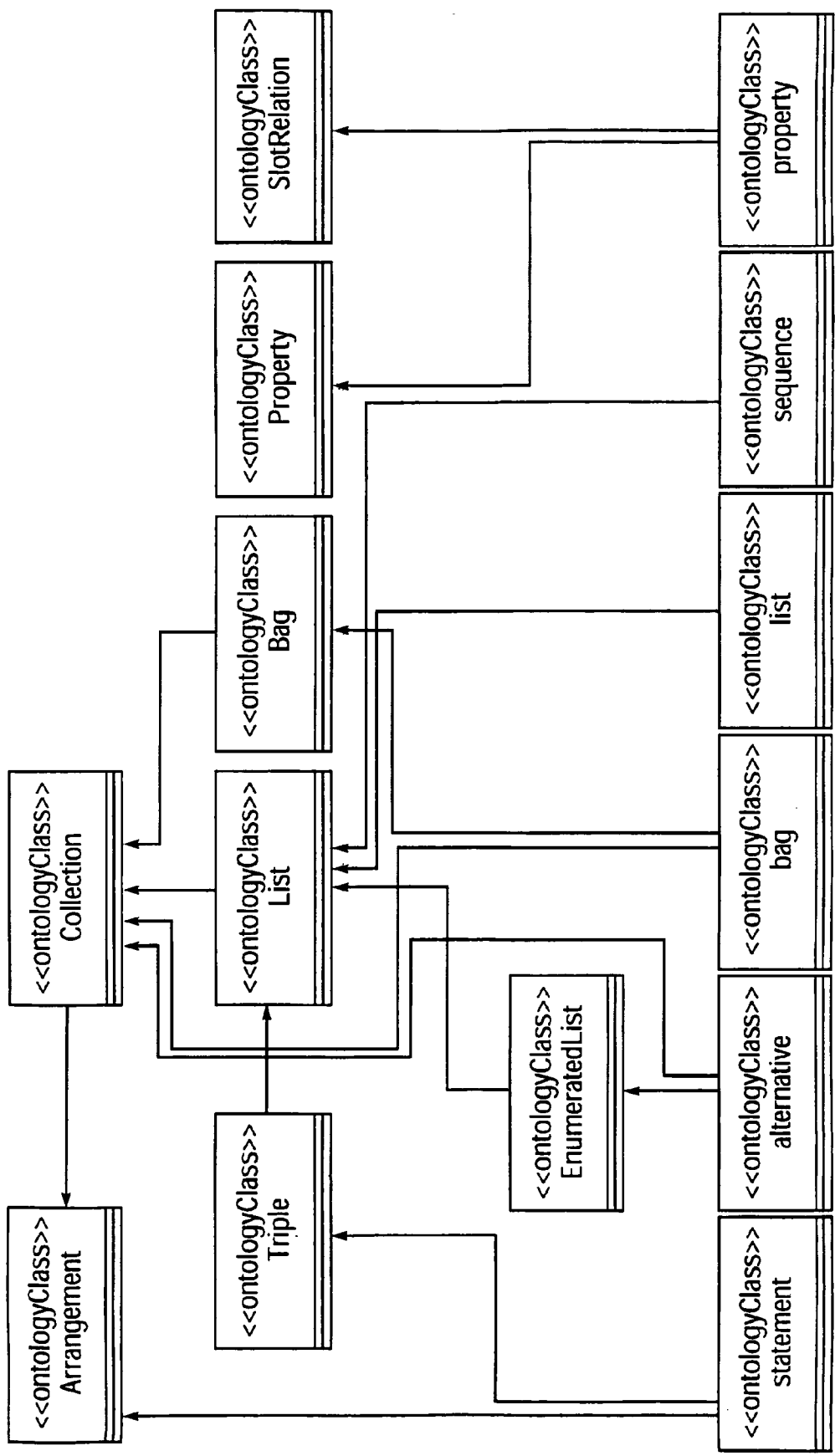
FIG. 30. RDF Model and Syntax class hierarchy, including relationships with other ontologies.

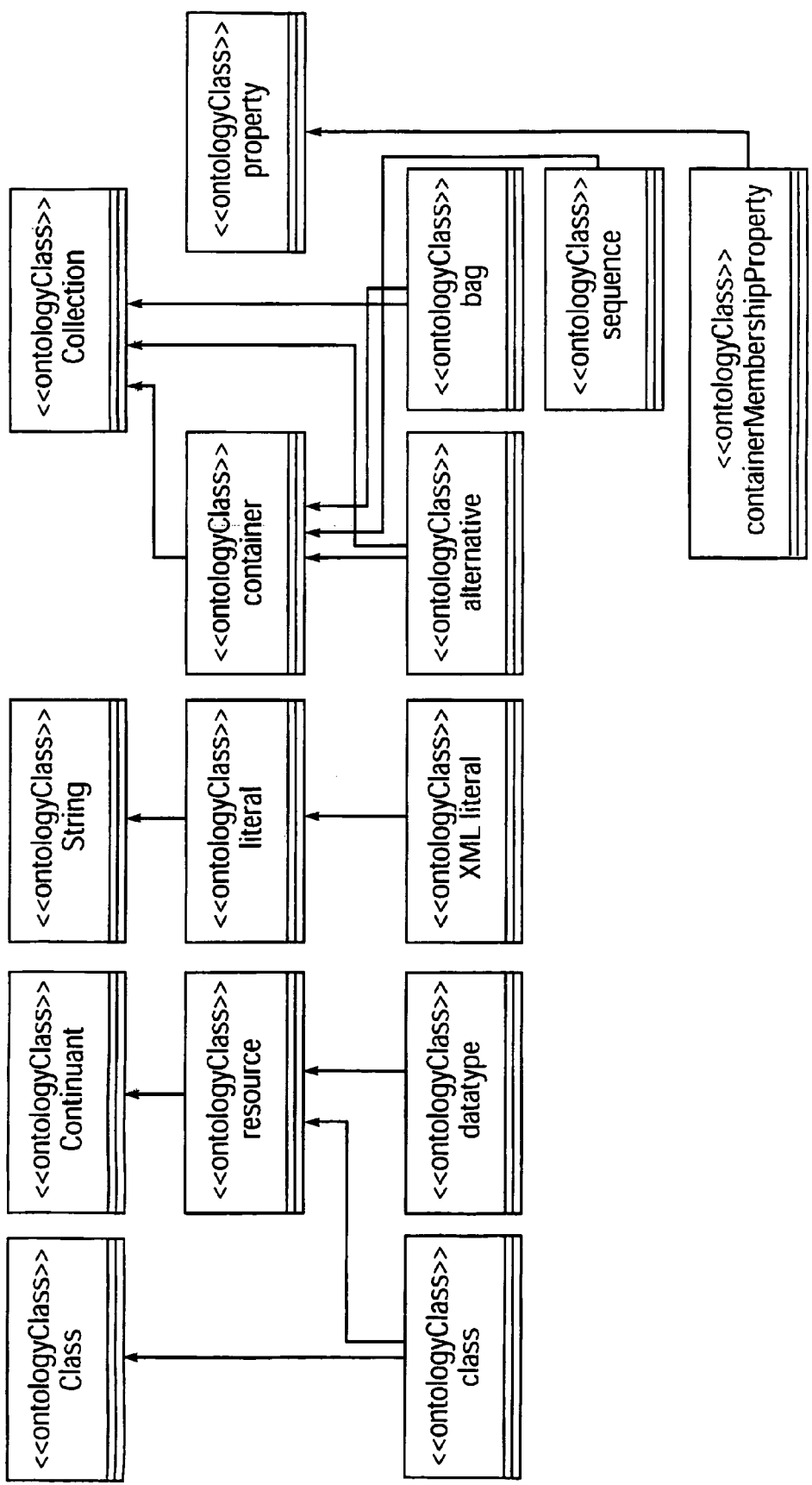
FIG. 31. RDF Schema class hierarchy, including relationships with other upper ontologies.

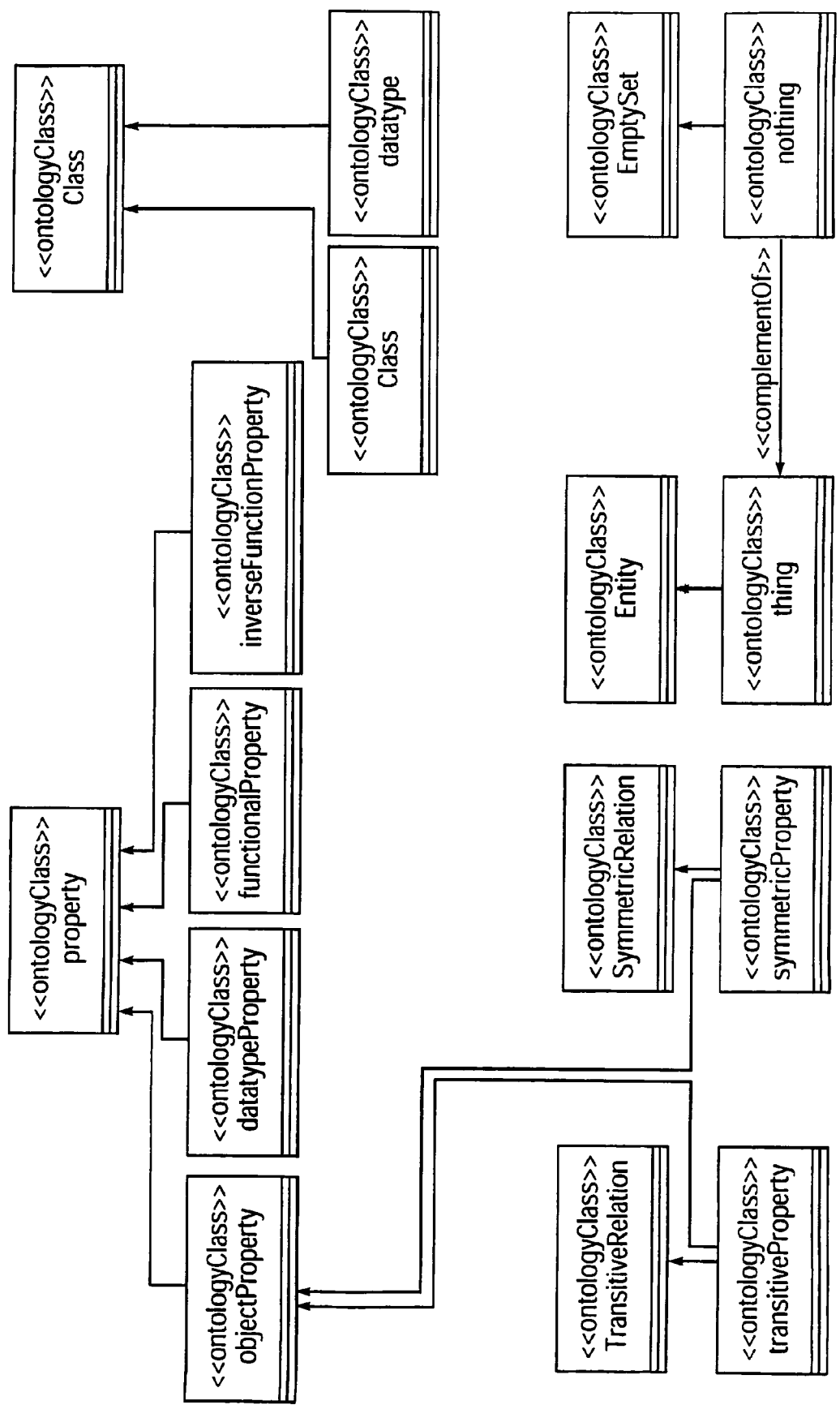
FIG. 32. OWL class hierarchy, including relationships with other upper ontologies.

METHOD AND APPARATUS FOR FRAME-BASED KNOWLEDGE REPRESENTATION IN THE UNIFIED MODELING LANGUAGE (UML)

CROSS-REFERENCES TO RELATED APPLICATIONS

The present patent application is a national phase application of International Application No. PCT/US03/04229 filed Feb. 12, 2003, which claims priority from provisional application U.S. Ser. No. 60/356,611 filed Feb. 12, 2002.

FIELD OF THE INVENTION

The present invention relates to knowledge representation systems. More specifically, the present invention relates to a method and a system for emulating frame-based knowledge representation in the unified modeling language ("UML").

BACKGROUND OF THE INVENTION

Over the last ten years there has been increasing consensus within the knowledge-based systems community on an appropriate set of conceptual components for building intelligent systems. These systems are commonly defined in terms of both domain ontologies and abstract problem solving methods that operate on the knowledge bases constructed in terms of those ontologies.

An ontology is an explicit, formal specification of the terminology and concepts, as well as the relationships among those concepts, relevant to a particular domain or area of interest. Ontologies provide insight into the nature of information particular to a given field and are essential to any attempts to arrive at a shared understanding of the relevant concepts. They may be specified at various levels of complexity and formality depending on the domain and needs of the participants in a given conversation.

Ontology development is important from a collaboration and software interoperability perspective because every database and application employs an ontology to model its data, either implicitly or explicitly. Emerging applications in collaboration, application integration, web services, and content management require large, complex ontologies that must be built and maintained by distributed teams. Despite the increased focus on the creation, management and use of complex ontologies in intelligent knowledge-based systems, there is little or no consensus regarding the requirements for tools to enable the construction of such knowledge-based systems and the ontologies they use.

While a significant body of work on frame-based knowledge representation and ontologies exists in the academic community, little has been done to foster adoption of these concepts or their usage in commercial applications. The ontology editors that exist today are based heavily on research in the Knowledge Interchange Format ("KIF") and knowledge representation languages descended from KL-ONE. Most of these tools, including Ontolingua, Chimaera, Protégé, OilEd, and LOOM are little known outside the artificial intelligence research community. Many of the tools require significant expertise in the relevant knowledge representation language and modeling methodology, and in many cases require the ontologist to have a background in computer programming languages such as LISP or Prolog. Because these tools have not had the benefit of commercial investment, most, if not all, are single-user tools. None are integrated with software engineering or configuration management tools, and the majority are only supported as funding permits. Furthermore, none of the tools scale to the degree required for the construction of large-scale bioinformatics or other equally complex and sizable ontologies.

Domain experts with little or no background in knowledge representation methods need tools that will enable them to develop knowledge bases and related intelligent systems. The tools must also provide capabilities for directly importing knowledge not only from formal knowledge bases but also from reference vocabularies, other repositories, and relevant applications. The portions of knowledge bases that are imported from disparate resources then need to be merged or aligned to one another in order to link the corresponding terms, to remove redundancies, and to resolve conflicts. Because such ontologies can be difficult even for experts to build, the need for a new generation of commercial-grade tools supporting knowledge sharing and collaborative ontology development is becoming increasingly urgent.

SUMMARY OF THE INVENTION

According to one aspect of the invention, there is provided a method and system for emulating a variety of knowledge representation systems, including frame based knowledge representation, in a Unified Modeling Language ("UML") environment. A Meta-object facility ("MOF") meta-model and UML profile are grounded in a foundation ontology. Elements of a frame-based knowledge representation are mapped to elements of the UML environment based on the MOF meta-model and UML profile, thereby emulating the frame-based knowledge representation in UML.

According to another aspect of the invention, a method and system are provided for creating an ontology in UML. A user input and validation component accept user-entered input representing an ontology name and one or more ontology elements. Each user-entered ontology element corresponds to either a concept or a relationship between concepts. The user-entered ontology elements form a detailed specification for the ontology. An ontology logic component generates a logically equivalent ontology using UML model elements based on a UML profile. The UML profile is grounded in a foundation ontology. A UML tool is also provided to present the logically equivalent ontology to a user in a UML environment.

According to yet another aspect of the invention, there is provided a method and system wherein an ontology logic component generates a UML package and class for each frame type of an ontology.

According to still another aspect of the present invention, there is provided a method and system wherein an ontology logic component generates a UML association for specific ontology elements.

According to yet another aspect of the invention, there is provided a method and system wherein an ontology logic component generates a UML operation for specific ontology elements.

According to still another aspect of the present invention, there is provided a code generator. The code generator is for generating code representing an ontology in a language specific to a particular knowledge representation format.

According to yet another aspect of the invention, there is provided a method and system wherein the code generator generates code that meets the DAML+OIL specification.

According to still another aspect of the invention, there is provided a method and system wherein the code generator generates code that meets the OWL specification.

According to yet another aspect of the present invention, there is provided a method and system wherein a code generator generates code that meets the OKBC specification According to yet another aspect of the present invention, there is provided a user input and validation component. The user input and validation component is to validate an ontology name and one or more user-entered ontology elements.

According to yet another aspect of the present invention, there is provided a user input and validation component, which is for accepting and to validating manual input from a user.

According to yet another aspect of the present invention, there is provided a user input and validation component, which is for accepting and to validating an ontology name and one or more of the ontology elements. The ontology name and elements, which are validated, are accepted from at least one of an existing knowledge base and another ontology representation.

BRIEF DESCRIPTION OF THE DRAWINGS

The present invention is illustrated by way of example and not intended to be limited by the figures of the accompanying drawings in which like references indicated similar elements and in which:

FIGS. 8-14 illustrate individual screen shots consistent with one embodiment of the present invention.

FIGS. 15-21 illustrate a subset of the inheritance hierarchy for the foundation ontology according to one embodiment of the present invention.

FIGS. 22 through 24 illustrate class diagrams for binary, ternary, and variable arity relations, according to one embodiment of the present invention.

FIGS. 25 and 26 illustrate diagrams for unary and binary functions, according to one embodiment of the present invention.

FIG. 27 illustrates a subset of the inheritance hierarchy for the foundation ontology defining classes relevant to axiom expression, according to one embodiment of the present invention.

FIGS. 28 through 31 illustrate logical class hierarchies relevant to the generation of DAML+OIL and OWL ontologies, including ontology class definitions for RDF Model and Syntax, RDF Schema, and XML Schema Datatypes, according to one embodiment of the present invention.

FIG. 32 illustrates the logical class hierarchy for a current version of the OWL specification, according to one embodiment of the present invention.

DETAILED DESCRIPTION OF THE INVENTION

Figure 1:
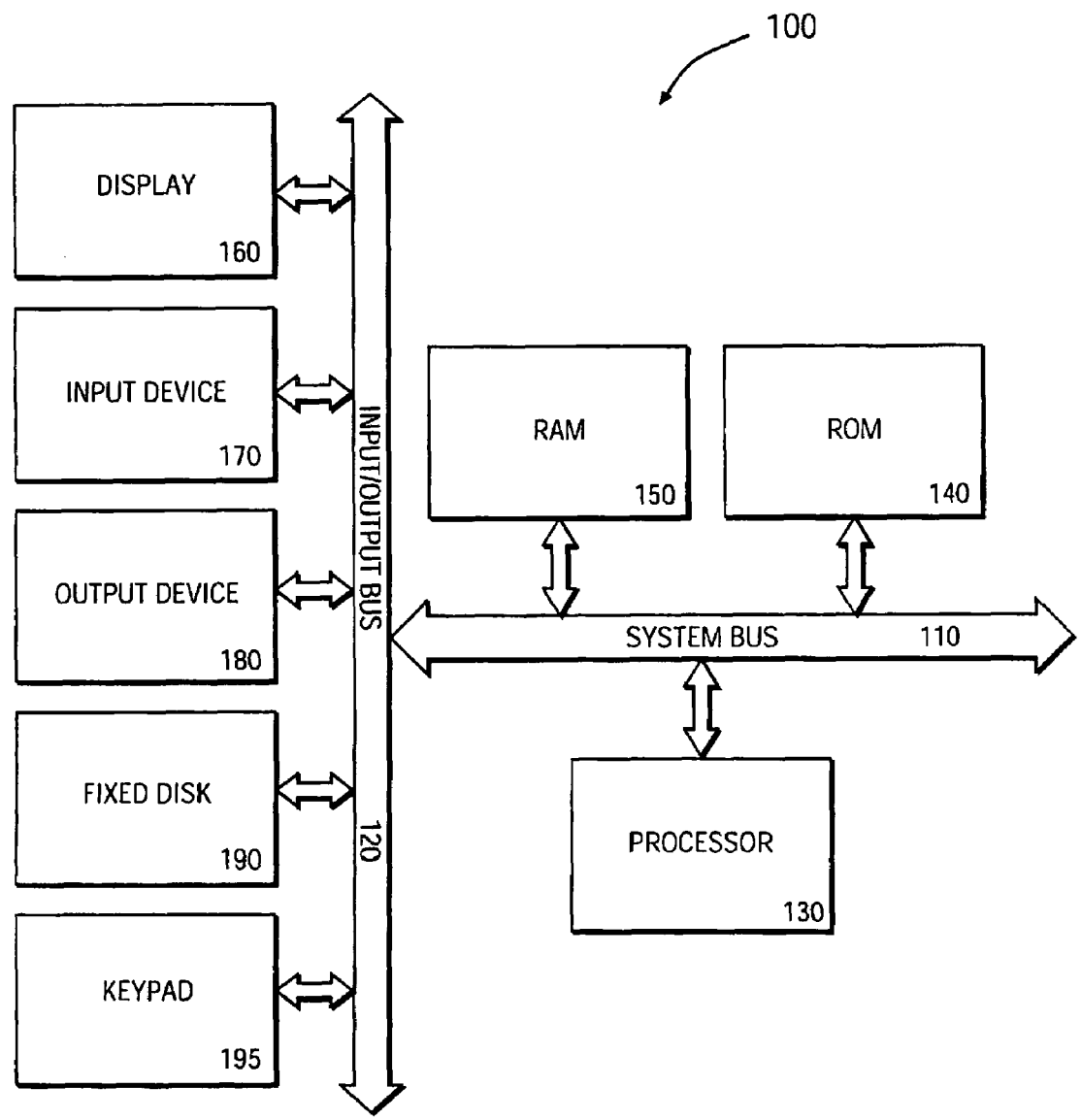
FIG. 1 illustrates a block diagram of a computer system with which the present invention may be implemented.

A method and apparatus for frame-based knowledge representation in the Unified Modeling Language ("UML") are described. In the following description, for purposes of explanation, numerous specific details are set forth in order to provide a thorough understanding of the present invention. It will be evident, however, to one skilled in the art that the present invention may be practiced without these specific details. To facilitate a full and clear understanding of the present invention, there is provided a brief description of the concept of ontologies, including a definition for purposes of the present invention and a variety of examples.

Ontology

An ontology typically specifies a description of the terminology, concepts, and the relationships among those concepts relevant to a particular domain or area of interest. Ontologies can provide insight into the nature of information particular to a given field and are essential to any attempts to arrive at a shared understanding of the relevant concepts. They may be specified at various levels of complexity and formality depending on the domain and needs of the participants in a given conversation (humans, systems and applications, or intelligent agents, for example):

A controlled vocabulary may be an ontology that simply lists a set of terms and their definitions. Glossaries and acronym lists are two examples of controlled vocabularies.

A taxonomy may be a set of terms that are arranged into a generalization-specialization (parent-child) hierarchy. A taxonomy may or may not define attributes of these terms, and may not necessarily specify relationships among the terms. XML schemas, RosettaNet and various XML dialects such as ebXML, ISO/IEC vocabularies, and STEP standards are examples of taxonomies.

A relational database schema defines a set of terms through, for example, classes (tables, where terms are represented as the rows in those tables), attributes (specified as columns in the tables), and a limited set of relations between classes (e.g., foreign keys). Some constraints (such as to define valid values) and behavioral characteristics (through triggers and stored procedures) may also be defined for a relational database, though they are not considered part of the schema, per se. Additional relations may be specified through applications that access the database, or through the queries defined on the database, but again, these are not considered part of the schema itself.

Entity relationship ("E-R") diagrams and data dictionaries are typically used to document relational database schemas. E-R diagrams can provide a graphical view of the relevant data elements and their relationships, but do not describe the constraints, behavior, or the kinds of relationships that might be expressed in query form. Data dictionaries may include text definitions for the rows and columns in a table, limits on field length or other data type definitions, but again, are not typically used to describe constraints, behavior, or other relevant relationships.

An object-oriented software model defines a set of concepts and terms through a hierarchy of classes, and attributes and a broad set of binary relationships of those classes. Some constraints and other behavioral characteristics may be specified through methods on the classes or objects, and in this case would be considered part of the ontology.

Standard software engineering methodologies and best practices relevant to object-oriented systems development include requirements and configuration management, use case modeling, architectural analysis and design, object-oriented analysis and design, implementation, test, and deployment management. Documentation developed over the course of a project implementing these best practices includes use-case models and realization diagrams, analysis models, collaboration and interaction diagrams, architecture and design models, sequence diagrams, implementation (state transition diagrams, class diagrams and models, etc.) and deployment models, etc. These models and related software engineering documentation typically include all of the information present in data dictionaries and E-R diagrams, as well as rich information about the relevant relationships (both hierarchical and lateral) and behaviors defined for a system.

A knowledge-representation system may be based on first-order logic and can express all of the preceding relationships, as well as n-ary relations, a rich set of constraints, rules relevant to usage, and other differentiators including negation and disjunction. Such a system may specify an ontology as a catalog of the terms used in a domain, the rules governing how those terms can be combined to make valid statements about situations in that domain, and in some cases, the sanctioned inferences that can be made when such statements are used in that domain. The system may also characterize the behavior of objects and associations in the domain. Thus, an ontology might be described as a data dictionary, plus a grammar, plus a model of the behavior of a domain.

The concepts or terms relevant to a particular domain ontology can be defined recursively, to increasing levels of granularity. The building blocks (classes, relations, functions, and individuals) of an ontology may be specified so that they are reusable across distinct definitions. Rich relations among these terms can be defined at all levels in what is called a semantic network. The combination of these rich definitions, the relationships among them, and the rules that specify constraints on their usage or additional relevant behavior enable unambiguous differentiation among concepts and resolution of language or terminology conflicts across multiple repositories and applications.

Ontology development is important from a collaboration and software interoperability perspective because every database and application employs an ontology, either implicitly or explicitly, to model its data. The more fine-grained the ontology, the more precisely a knowledge base will be able to model the nuances of the data that it tries to capture. A coarse-grained ontology will model only superficial aspects of the data, and therefore may not capture concepts or relations that are important for some problem-solving task. A semantically malformed ontology is one that incorrectly models the semantics of its application domain, and therefore yields a knowledge base whose structure corrupts or restricts the information that it is intended to hold.

Ontologies developed in true knowledge representation systems capture and represent finely granulated knowledge in an unambiguous way so that this information can be shared and acted on by diverse groups of people and systems linked together by a network. Concepts and resources can be described in multiple ways, depending on point of view, cultural background, or role of the individual describing them. A single concept (or description of a concept) may apply to multiple contexts or situations, but the meaning associated with that concept may be sensitive to the context or situation. Conceptual knowledge is rarely strictly hierarchical in nature. A lattice, network, or group of networks provides a richer, more complete, and more accurate representation of complex interrelated concepts and terminology.

Component-Based Ontology Development

Best practices in software engineering mandate well-designed, component-based software architectures for sharing information in a networked environment that are specified in terms of layers of functionality, such as separate Delivery, Presentation, Process and Integration, Business or Application logic, Content and Data Management, and Infrastructure layers. The capabilities provided within each layer are encapsulated to support highly distributed systems, load balancing, and so forth (as in an n-tiered architecture). In the same manner, ontologies can be described in terms of the different aspects of an architecture they address for attempting to solve different kinds of collaboration or integration problems.

A domain ontology, which may also be call a classic ontology, may define the terminology and concepts relevant to a particular topic or area of interest.

A process ontology may define the inputs, outputs, constraints, relations, terms, and sequencing information relevant to a particular business process or set of processes, for example, through concepts such as those utilized by process modeling tools built on EXPRESS, the Process Specification Language ("PSL"), or the Business Process Modeling Language ("BPML").

An interface ontology may define the structure and content restrictions (such as reserved words, units of measure requirements, other format-related restrictions) relevant for a particular interface (e.g., application programming interface ("API"), database, scripting language, content type (such as for a wireless server), user view or partial view—as implemented for a portal, for instance), using concepts such as those employed by Object Management Group's Model Driven Architecture ("MDA") and related specifications.

A service ontology may define the vocabulary, tasks, and related parametrics for a given service, or set of services, such as a Common Object Request Broker Architecture ("CORBA") service or web service (e.g., through Darpa Agent Markup Language for Services ("DAML-S"), UML Action Semantics, Web Service Description Language ("WSDL")).

A role ontology may define terminology and concepts relevant for a particular end-user (agent, person, application, or resource).

Such a systematic, component-based approach to ontology modeling is helpful to the success of large-scale ontology construction projects. Those skilled in the art of software engineering have demonstrated that building a single, monolithic enterprise data model is costly and fails to deliver the desired utility. Ontologies are, by nature, much larger and more complex than data models, and can require significant effort to build. Just as an artist might apply color to a serigraph in layers, ontologies may be developed from a variety of perspectives and layered on top of one another until a complete picture emerges. For example, by isolating an interface ontology from the terminology relevant for a domain, it may be possible to limit the changes required when an obsolete application is updated or replaced with new functionality to the interface ontology. Cross-organizational communications mismatches can be minimized, if not eliminated, by creating ontologies that reflect the terminology, jargon, nomenclature, and domain applications specific to one community, mapping the ontologies to those of another community with differing cultural heritage, and brokering over the conceptual knowledge exemplified in the ontologies and mappings. Brokering across multiple interface ontologies reflecting various metadata standards, XML dialects, and database access methodologies can enable broad accessibility while limiting breakage when any particular interface is changed. One embodiment of the present invention facilitates component-based ontology development, and incorporates mechanisms to support this methodology as described below.

In one embodiment of the invention, during an ontology creation process, an ontologist identifies which kind of ontology component they are constructing (e.g. domain, process, interface, service, or role). A sixth ontology kind, called upper, may be reserved for high-level conceptual knowledge, such as whether a particular concept is abstract or concrete, animate or inanimate, and so forth. In one embodiment, the ontology kind is preserved with the ontology as a property of the model, as discussed below. It may also be used to determine lineage and form of the ontology. The system may suggest, for example, that a process ontology should be a child of Process (or of some specialization of Process) and be based on the Process Specification Language ("PSL") ontology provided as a guideline for process ontology development, or that a service ontology should be a child of Service (or of some specialization of Service) and be based on the service ontology (DAML-S and UML Action Semantics based).

In addition to the use of this ontology kind property and optional use of an appropriate reference ontology as a basis for development, every ontology may be created as a controlled unit from a configuration management perspective. A separate container is created within a UML tool environment and in the file system for that ontology. Each first class model element (ontology, class, relation, function, or individual) is maintained as a separate controlled unit in one embodiment of the invention as well. This approach allows multiple users to work on the same ontology and maintain separate version and revision control of individual components of the ontology through integration with a software configuration management system.

EXEMPLARY EMBODIMENT OF THE INVENTION

In an exemplary embodiment, a computer system, such as that illustrated in FIG. 1, is used to implement the invention. FIG. 1 illustrates the computer system 100 as including a processor 150 operatively connected to a random access memory ("RAM") 150 and a read only memory ("ROM") 140 by a system bus 110. Processor 130 is also operatively connected to a fixed disk 190, which may be an optical disk or other storage medium, through input/output bus 120. Alternatively, processor 130 may be connected to multiple storage devices through input/output bus 120. Processor 130 communicates data using system bus 110 and input/output bus 120.

System bus 110 and input/output bus 120 may also receive inputs from keypad 195, or input device 170. System bus 110 and input/output bus 120 may provide outputs to display 160, output device 180, or fixed disk 190. Memory and storage media 140, 150 may also include a flash memory, EEPROM, or any combination of the above.

Computer system 100 may be controlled by operating system software, which includes a file management system, such as a disk operating system, which is part of the operating system software. The file management system may be stored in a non-volatile storage device, such as RAM 150, and may be configured to cause processor 140 to execute various functions required by the operating system to input and output data and to store data in RAM 150 or ROM 140.

For one embodiment, the present invention is implemented as a set of instructions stored on exemplary computer system 100 and executed by processor 130. However, one skilled in the art will realize that the present invention is independent of the components of computer system 100 or the particular operating system executing on computer system 100. In particular, the present invention may be implemented in either a UNIX or Windows based computer system.

Figure 2:
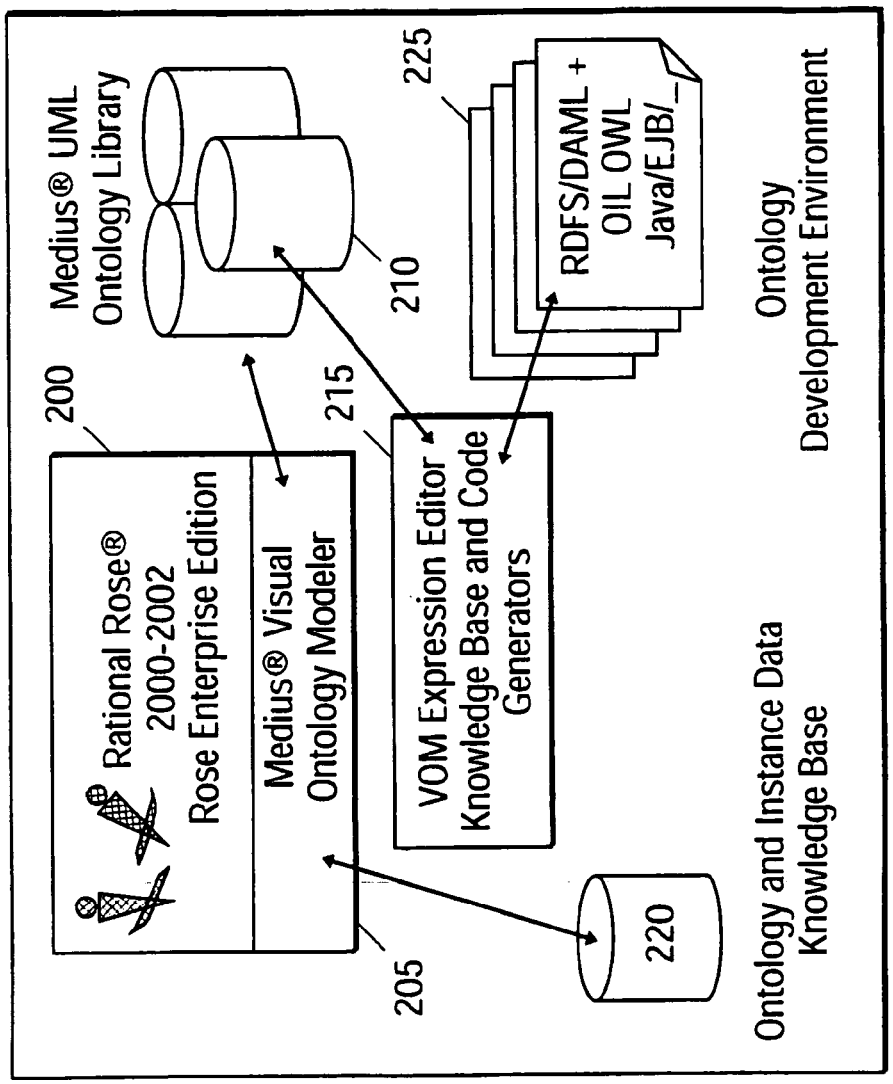
FIG. 2 illustrates a functional block diagram of the individual components which make up one exemplary embodiment of the present invention.

FIG. 2 illustrates a functional block diagram of an exemplary embodiment of the present invention as an integrated add-in component for Rational Software's® Rose Enterprise Edition®, an existing UML tool 200. The add-in component provides several advantages when implemented as an add-in to an existing UML environment or tool. The Unified Modeling Language is a graphical language for visualizing, specifying, constructing, and documenting the artifacts of distributed object systems. UML has been widely adopted by commercial software engineering organizations for use in the development of object-oriented applications. Its lineage stems from object-oriented analysis and design methods for modeling software components that converged in the mid 1990's. Further evolution led to the formation of an independent standards body within the Object Management Group that formalized and integrated UML with other standardization efforts in the late 1990's and adopted UML 1.1 as a standard in 1997.

In one embodiment, the present invention may be based on the most recently adopted specification for UML, namely UML 1.4 including the Meta-Object Facility ("MOF") version 1.4 and the XML Metadata Interchange version 1.1. While the invention has been implemented to work with and take advantage of current specifications and standards, one skilled in the art will recognize that alternative embodiments of the invention can be implemented to evolve with the UML family of standards as they themselves evolve.

Because UML enjoys a rapidly growing user community and has gained wide acceptance amongst commercial developers as a tool for object-oriented analysis, design, and implementation, implementing the component as an add-in to existing UML tools provides some advantages. Most UML development tools are multi-user and many are integrated with commercial-quality configuration management capabilities. Some also provide facilities for round-trip engineering of various information and software resources that might be of interest as sources for ontology development. Furthermore, as an add-in to existing UML tools, the component enables graphical, collaborative, component-based ontology development. In conjunction with a UML tool having the appropriate API and display capabilities, an add-in according to one embodiment of the present invention can facilitate ontology import, analysis, alignment, manipulation, merge, and export/generation. Still further advantages include support for various methods of classification, consistency and integrity checking, transitive closure, and other model verification capabilities.

It will however be appreciated that the invention is not limited to an add-in component, and could operate as a standalone application that integrates with a further application or could be completely integrated with another application, for example.

Referring once again to FIG. 2, the exemplary add-in component consists primarily of sub-components, including: a visual ontology modeler 205, a UML ontology library 210, a visual ontology modeler expression editor and code generator 215, an ontology and instance data knowledge base 220 and language specific documents 225. The add-in component will be described in further detail with respect to FIG. 7 below.

Figure 3:
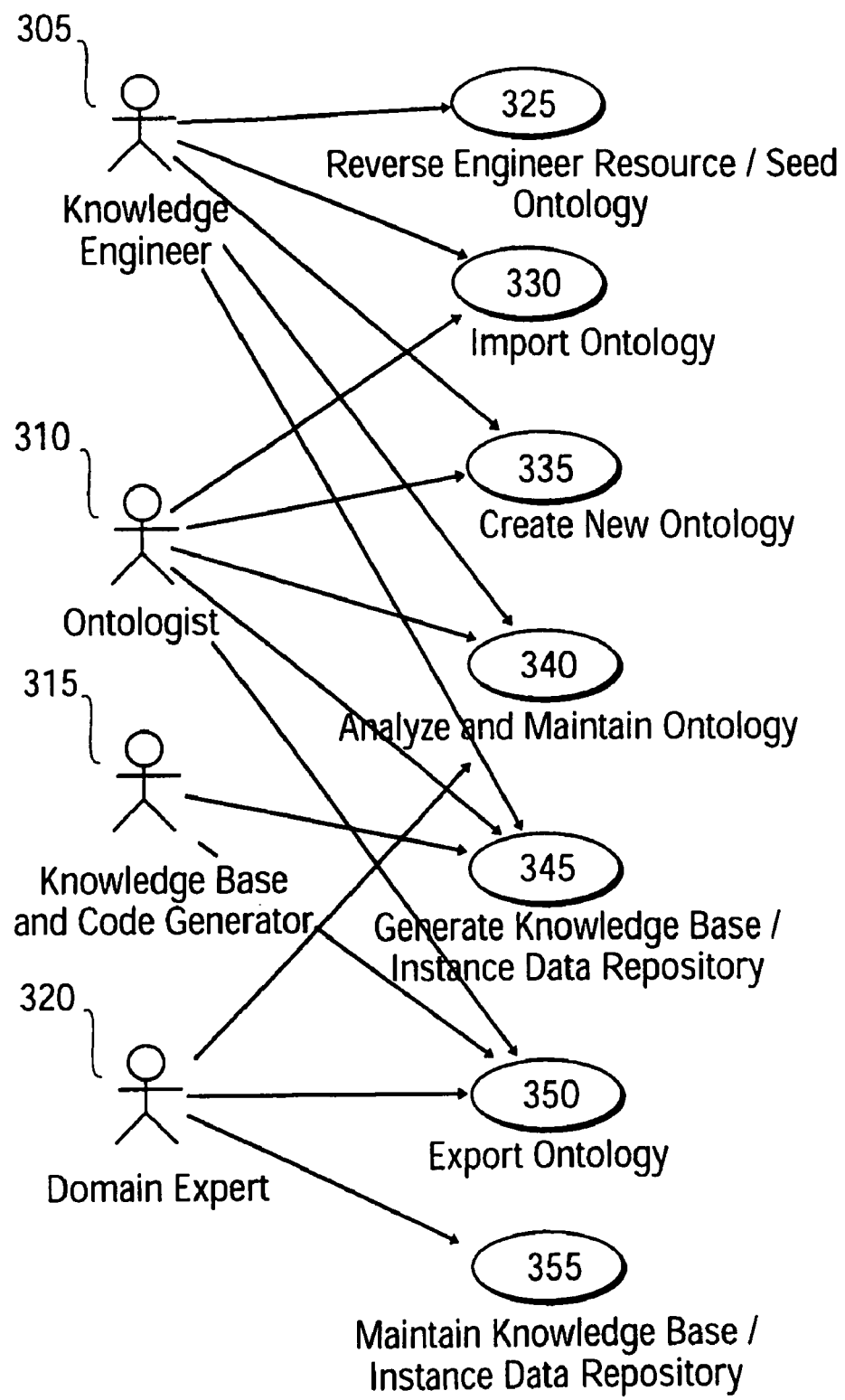
FIG. 3 illustrates a user perspective diagram showing how individual actors may interact with one embodiment of the present invention.
Figure 4:
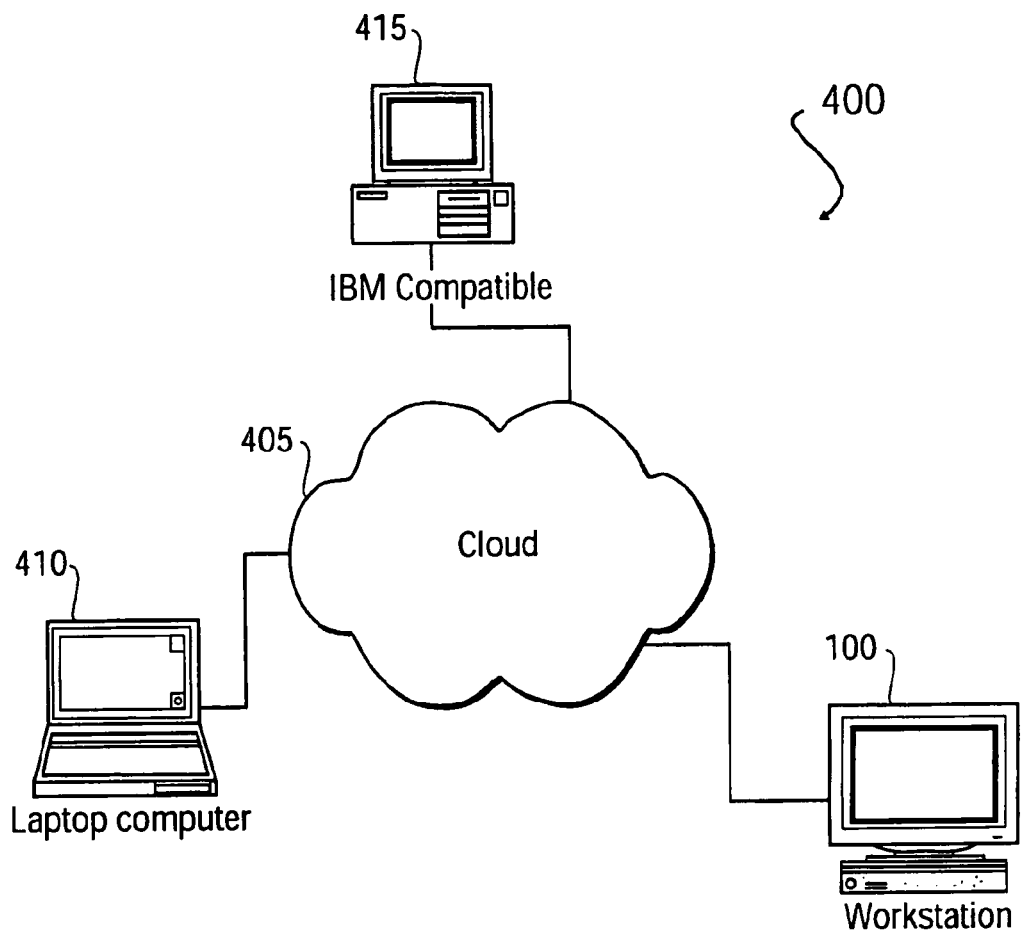
FIG. 4 illustrates a computer network with which the present invention may be implemented in one embodiment.

FIGS. 3 and 4 are diagrams illustrating some of the networking and multi-user aspects of one embodiment of the invention. FIG. 3 illustrates how various actors interact with different aspects of an embodiment of the invention. In FIG. 3, each actor 305, 310, 315, and 320 is shown to interact in a variety of different ways by performing functions specific to his role. For example, a knowledge engineer 305 interacts with one embodiment of the invention by performing several functions including: reverse engineering a resource 325, importing an ontology 330, creating an ontology 335, analyzing and maintaining an ontology 340, and generating a knowledge base or instance data repository 345. A knowledge base and code generator actor 315, has more limited interaction. Actor 315 is shown to interact by performing functions such as generating a knowledge base 345 and exporting an ontology 350. For one embodiment of the invention, the particular UML tool 200 limits each actor's functionality based on the actor's role. For example, in one embodiment, a domain expert 320 can maintain a knowledge base 355, export an ontology 350, and analyze and maintain an ontology 340, but is restricted from creating a new ontology 335.

In one embodiment, the present invention is implemented to work over a network of computers, as illustrated in FIG. 4. FIG. 4 includes personal computer 415, a laptop computer 410, and an exemplary workstation 100 interconnected via network 405. Network 405 may be a local area network, such as an office intranet, or a wide area network, such as the Internet. In one embodiment, the invention is implemented as add-in components 205, 210, 215, 220 and 225 for a UML tool 200 on workstation 100. A knowledge engineer 305, using workstation 100, can perform an import ontology operation 330, to import an existing ontology that resides on personal computer 415. Similarly, an ontologist 310, using workstation 100, can perform an export ontology operation 350 to export an ontology to laptop computer 410.

Figure 5:
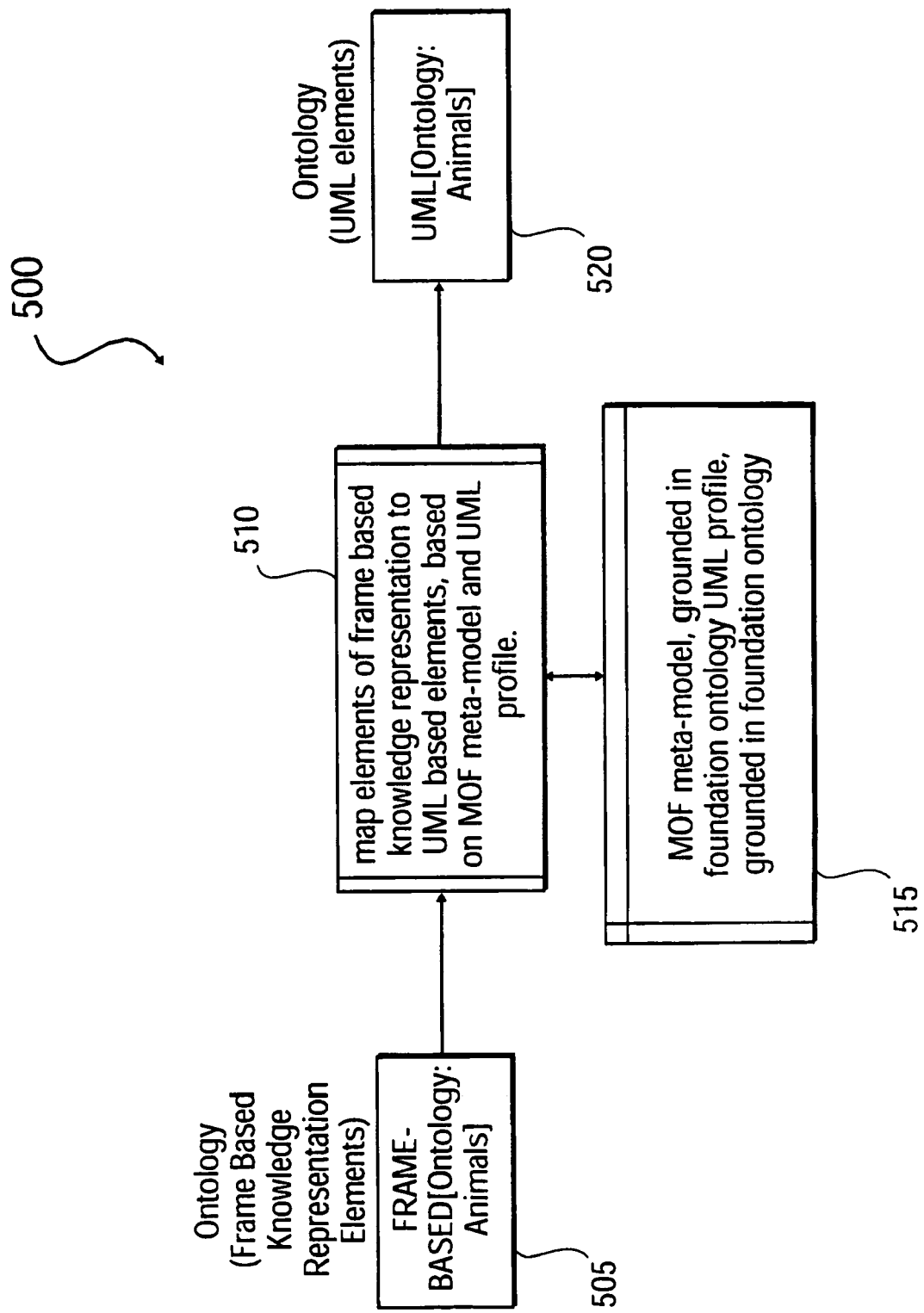
FIG. 5 illustrates a flow diagram of operations, according to an exemplary embodiment of the present invention, to emulate frame based knowledge representation using UML.

FIG. 5 illustrates a flow diagram of operations 500, according to an exemplary embodiment of the present invention, to emulate frame based knowledge representation using UML. The method begins at operation 505. At operation 505, there exists an ontology represented as a group of elements specific to a particular knowledge representation system. For example, at operation 505 an ontology might be represented with elements common to knowledge representation systems including but not limited to the Knowledge Interchange Format, Ontolingua, Open Knowledge Base Connectivity, or Protege. At operation 510, the elements, represented in one of the above knowledge representation systems, are mapped to UML elements based on the Meta-Object Facility ("MOF") meta-model and UML profile 15. The MOF meta-model and UML profile are illustrated in greater detail in Table 1 below. At operation 520 the original ontology is emulated in UML by UML elements. As such, the ontology can be manipulated and acted upon like any other UML model.

TABLE 1

Core Profile for Frame-based Knowledge Representation

| Frame-Based KR (Ontology) Element | MOF Metamodel Element(s) | UML Metamodel Element(s) | Stereotype |
|---|---|---|---|
| Ontology | Package | Package | ontology |
| Class (frame) | Package | Package | classFrame |
| | Class | Class | ontologyClass |
| Relation (frame) | Package | Package | relationFrame |
| | Class | Class | relation |
| Function (frame) | Package | Package | functionFrame |
| | Class | Class | function |
| | Association | Association | hasFunction |
| | Operation | Operation | function |
| Individual (frame) | Package | Package | individualFrame |
| | Class | Class | individual |
| | Association | Association | individualOf, typeOf |
| Slot | Package | Package | slotFrame |
| | Class | Class | slotRelation |
| | Association | Association | hasOwnSlot, hasTemplateSlot |
| Facet | Association | Association | valueType, hasValue, hasDefaultValue |
| | Attribute | Attribute | facet |
| Axiom | Class | Class | axiom |
| | Association | Association | (depends on the axiom) |
| | Operation | Operation, External File | axiom |

Figure 6:
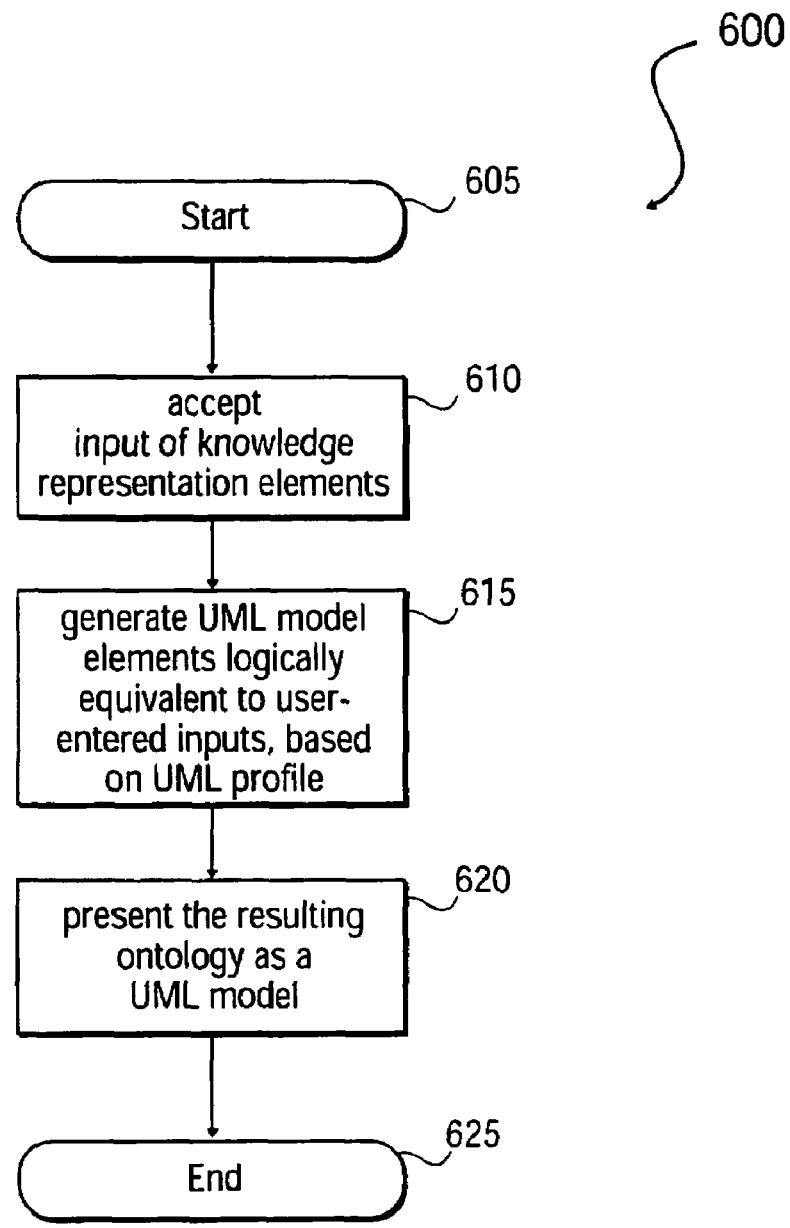
FIG. 6 illustrates a flow diagram of operations, according to an exemplary embodiment of the present invention, to emulate frame based knowledge representation using UML.

The flow diagram of FIG. 6 illustrates operations 600 to create an ontology using UML, according to one embodiment of the present invention. The method begins at operation 605. At operation 605 user-entered input representing the elements of an ontology for a knowledge representation system are accepted. At operation 615, UML elements are generated. The UML elements are generated based on a UML profile, such as that illustrated in Table 1, and are logically equivalent to the elements for an ontology represented by many other knowledge representation systems. At operation 620 the resulting UML ontology is model is presented to a user. Operation 625 is the end.

Figure 7:
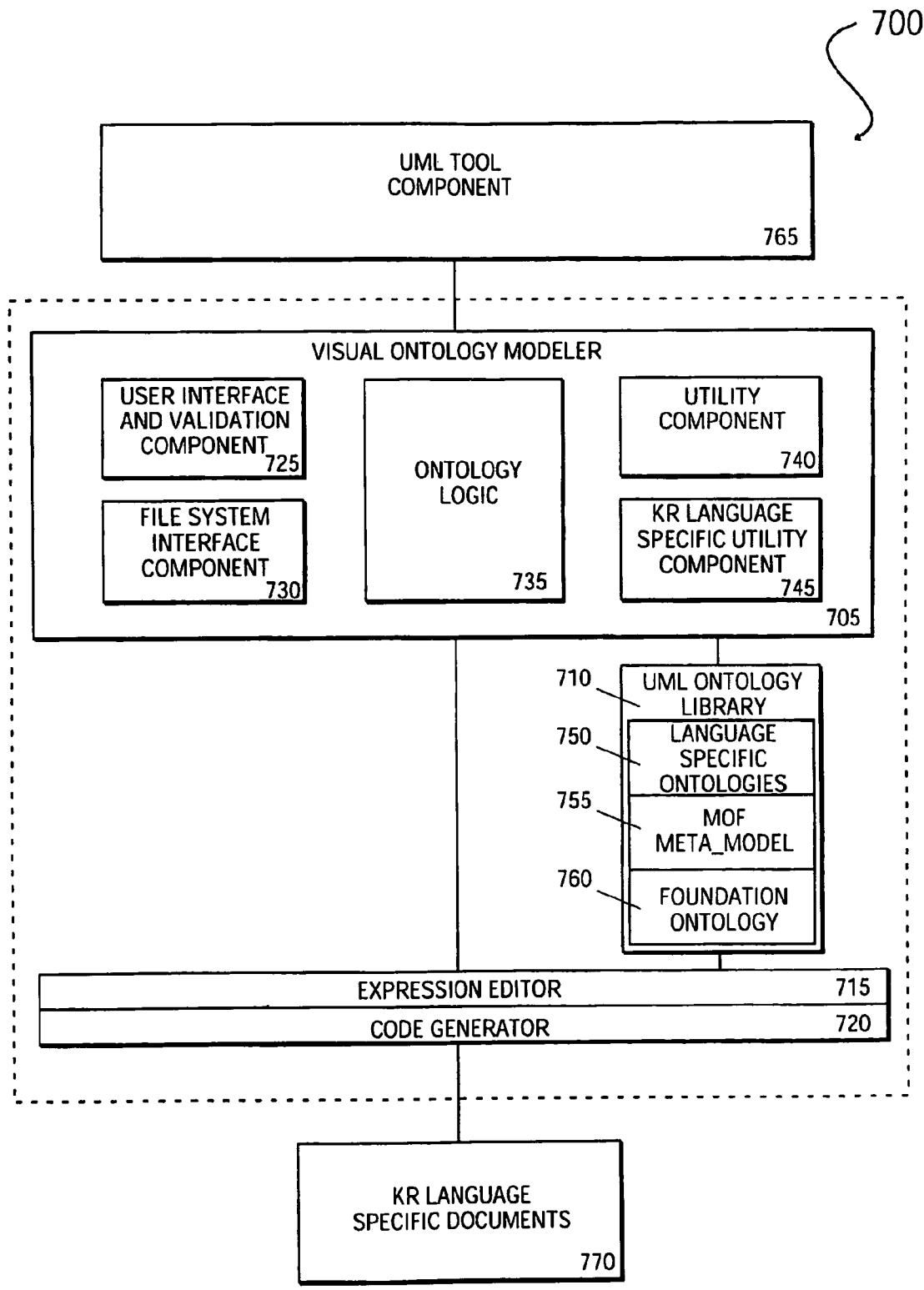
FIG. 7 illustrates a detailed functional block diagram of the individual components which make up one exemplary embodiment of the present invention.

FIG. 7 illustrates a functional block diagram of an exemplary embodiment of the invention implemented as an integrated add-in component for an existing UML tool. For example, as illustrated in FIG. 2, the invention can be implemented as an add-in component for Rational Software's® Rose Enterprise Edition®, a UML modeling environment. In other embodiments, the present invention may be implemented as an add-in for a variety of other UML tools and environments, including: Rational® Software's extended Development Experience and Borland's TogetherSoft® UML modeling tool. As discussed above, the invention may be implemented as an integrated add-in to existing UML tools because the invention can leverage the powerful features of existing UML tools when implemented as an integrated add-in component to such tools. However, in alternative embodiments, the invention can be implemented as a stand-alone tool.

Further details regarding an exemplary add-in component 700 are shown in FIG. 7. Specifically, the add-in component 700 of FIG. 7 includes a visual ontology modeler component 705, a UML ontology library 710, an expression editor 715 and a code generator 720. Visual ontology modeler 705 is a core component and tightly integrates with UML tool 765. Visual ontology modeler 705 has several sub-components, which provide much of the functionality. Visual ontology modeler 705 includes a user interface and validation component 725, a file system interface component 730, a utility component 740, a knowledge representation specific utility component 745, and an ontology logic component 735.

For one embodiment, user interface and validation component 725 provides much of the logic and support for interfacing with the user. For example, user interface component 725 in conjunction with UML tool 765 facilitates the presentation of input text boxes and wizard interface components to the end user for receiving user input. User interface component 725 receives input from the user and performs validation routines on the input to verify that the input meets certain specified criterion. For example, in one embodiment of the invention there are naming conventions for ontologies and the frames that represent ontology elements. The validation component verifies that user-entered names conform to such naming conventions.

Ontology logic 735 serves several key functions. For one embodiment of the invention, ontology logic 735 receives user-entered input from user interface component 725 and creates the UML model elements corresponding to the user-entered input. For example, when an ontology is created, user interface 725 will present the user with a text box in which the user must enter a frame name, and a code name for the ontology. Once entered, ontology logic 735 creates the UML model elements necessary to emulate the corresponding ontology. Specifically, ontology logic 735 creates a new model with a name and identification corresponding to the naming details provided by the user interface component 725 in the UML tool, and a UML package, again with identification details provided by the user interface component 725, within that model to emulate a frame representing an ontology. Ontology logic 735 may also create empty packages under the ontology package to emulate the various frames of the ontology, including packages for classes, relations, functions, and individuals. Finally, ontology logic 735 may populate UML model properties of the ontology model corresponding to the identifying, administrative, and other information solicited from the user as described in further detail, below.

Ontology logic 735 also performs many functions specific to the UML tool 765. In one embodiment, ontology logic 735 may create UML tool specific files. For example, when implemented as an add-in for Rational Rose®, ontology logic 735 may use the Rose API to interact with the Rose environment to create the requisite model elements and related files, including what are called petal files and cat files for the model. Ontology logic 735 may request the file system interface component 730 to create a folder in the Ontology Library 710 corresponding to the model created in the UML tool 765, and to create empty folders corresponding to the empty packages to contain the various frames of the ontology. The petal and .cat files for the model may be saved in the model folder in the Ontology Library. An XML file detailing model properties may also created in the ontology folder.

For one embodiment of the invention, file system interface component 730 reads and writes model elements to a file storage device, such as fixed disk 190. In an alternative embodiment, file system interface component 730 may be implemented to interface with a commercial database. For example, file system interface component 730 may read from and write to a standard commercial database containing a knowledge base or instance database.

Utility component 740 performs a variety of functions. For one embodiment, utility component 740 performs operations including: opening existing ontologies, creating overview diagrams of UML models, and browsing frame and slot elements. Utility component 740 may also be implemented to perform file system clean-up routines and model checking and verification routines.

Knowledge representation language specific utility component 745 performs routines that are specific to a particular knowledge representation language. For example, for one embodiment of the invention, language specific utility component 745 performs operations to create "relation" ontology elements that are specific to such knowledge representation systems as DAML+OIL, OWL, or KIF. A table containing examples of relations specific to DAML+OIL and OWL is provided below in Table 9

UML ontology library includes language specific ontologies 750, MOF meta-model 755 and foundation ontology 760. In one embodiment of the invention, the MOF meta-model 755 is an integral part of the foundation ontology 760, as shown in Figures? through?. For one embodiment of the invention, MOF meta-model 755 and the foundation ontology 760 may facilitate user import of other foundation, or upper ontologies of choice, such as the IEEE SUO or SUMO ontologies. The MOF meta-model 755 and the foundation ontology 760 facilitate code generation for specific knowledge representation systems and ontology languages. However, one skilled in the art will recognize that the foundation ontology 760 cannot support every knowledge representation language.

Therefore, in one embodiment of the invention, support for ontologies represented in the Knowledge Interchange Format, DAML+OIL, and OWL are embedded in the foundation ontology. In alternative embodiments, language-specific ontologies 750 provide support for ontologes represented in other knowledge representation systems, such as the Knowledge Interchange Format and ontologies representing concepts for XML Schema Datatypes, RDF Model and Syntax, and RDF Schema (Resource Description Framework), all of which are specifications of the W3C.

Add-in component 700 of FIG. 7 also includes expression editor 715, and code generator 720. In one embodiment, expression editor 715 facilitates the entering of text for axiom expressions. In another embodiment of the present invention, code generator 720 provides a mechanism for generating code for other knowledge representation systems. Code generation is described in greater detail below.

Frames

In many knowledge representation systems, the primary ontology elements utilized include ontology, class, relation, function, individual, slot, facet and axiom. In one embodiment of the present invention, as in most frame-based knowledge representation systems in general, several of the primary ontology elements listed above are represented as frames. For example, Table 1 shows the class, relation, function, and individual ontology elements associated with frames. A frame in the context of the present invention is a conceptual container for meta-knowledge defining a given entity in the domain of discourse. In one embodiment of the present invention, two UML constructs are employed as stereotypes for frame representation: UML packages, which allow clustering multiple definitions of various types in the same component, and UML classes, which support relations among frames and enable association of behavior (or methods) with frames. In addition, one embodiment of the present invention employs UML associations to represent specific relations among frames, including relating slots and facets to frames.

On creation of any frame, in one embodiment of the invention, several model elements are created, including certain naming and identifying characteristics. These include: frame name, frame identifier, frame code name, and frame documentation. For example, when an ontology element is created, UML model elements are generated to capture values for the frame name, frame identifier, frame code name, and frame documentation associated with the created ontology. UML model elements for naming and identification are generated for all first class ontology elements represented by frames, including the class, relation, function, and individual ontology elements.

Consistent with the invention, the frame name is defined as the name associated with a given frame. This name is assigned to the UML model elements that implement the frame. For example, from Table 1 it can be seen that the function ontology element is represented by a frame. The name for that frame is assigned to the operation UML model element that emulates that particular frame.

The frame name for an ontology element must be unique across all ontologies. For example, no ontology can have the same name. Furthermore, frame names for ontology elements within a given ontology must be unique. However, frame names for ontology elements other than ontology need not be unique across ontologies. For example, there may be terms relevant to distinct domains or resources that have the same name but may or may not have identical definitions. Note that frame names are called pretty names or display names in some knowledge representation systems, and are the names used in documentation, to provide visual identification for a particular element in graphical views, and so forth.

In one embodiment of the invention, the following naming convention are used with respect to frame names:

Every frame name must begin with an alpha character (A-Z, a-z).

Every unique word within the frame name should also have an initial uppercase alphanumeric character or preceding space or underscore to identify word boundaries (e.g., minimum cardinality or minimumCardinality).

Frame names are restricted to combinations of upper and lower case alphanumeric (ASCII) characters, numbers (0-9), spaces, underscores, and dashes; punctuation characters and other special characters are disallowed.

A frame identifier is a unique, machine-generated identifier assigned to a given frame. Again, in cases where applicable, unique identifiers are assigned to the UML package and/or UML class that implement the frame. These identifiers are, by definition, unique both within and across ontologies, so that distinctions among terms that have the same name but different definitions can be maintained.

A frame code name is defined as the internal name associated with a given frame for a knowledge base, XML, and other code generation purposes. Again, this name is assigned to any UML element that implements the frame, and is not required to be unique across ontologies. It must be unique within an ontology, however. In addition to the restrictions given above for frame names, code names cannot contain spaces, underscores, or dashes.

Frame documentation refers to optional text information associated with a given frame, either on creation or during the development process. Frame documentation is a free form text field that must be non-blank on release of a given version of an ontology. The default value for frame documentation provided at frame creation is Documentation not yet supplied.

FIGS. 8-14 illustrate screen displays that are presented to the user when creating an ontology for one embodiment of the invention.

Ontology Frames

An ontology frame is a frame that acts as a container for all of the entities (documentation, inclusion relationships with other ontologies, and local class, relation, function, individual, slot, facet, and axiom frames) defined for a particular ontology. In order to fully encapsulate component ontologies for reuse and collaborative development purposes, ontology frames are implemented as UML packages. Every ontology frame has a frame name, frame identifier, and frame code name associated with it as stated above. Ontology frame code names are used not only for identification purposes in the present invention, but for namespace identification as well. For example, when generating DAML+OIL or OWL code for a particular ontology the frame code name is used as namespace identification.

Additionally, terms specifying details used for ontology alignment, brokering, maintenance, configuration management, code generation or simply to provide additional descriptive information are requested from the ontologist. They are maintained as UML properties on the model implementing the ontology, and, include:

Abstract
Ontology Kind
Creation Date
Revision Date
Version
Revision
Originator
Point of Contact
References
Keywords
Deployment URI An abstract is a brief narrative description providing sufficient information about the ontology to identify its general nature, the original purpose for its development, and other summary documentation that might be relevant for collaborative or reuse purposes (required). This information is implemented as the frame documentation in one embodiment of the invention.

The ontology kind term is used to assist the user in selecting a parent class for the ontology (e.g., Process, for a process ontology, or Entity (Thing) for a domain ontology), and in certain cases, to select an existing ontology as a metamodel or to provide a meta-vocabulary to ground the ontology under development (such as the Process Specification Language ontology) for code generation purposes. This term is required.

A creation date is automatically generated when an ontology is first created. This term is required and cannot be manually modified. Similarly, the revision date is automatically updated each time the ontology frame or any of the entities that compose a given ontology are changed, and cannot be manually modified.

The version and revision terms are optional. The terms version and revision are used for configuration management purposes, where a given version of an ontology may have multiple minor revisions associated with it. Consistent with the present invention, ontology development can be a collaborative and iterative process potentially involving teams of people. Consequently, there exists a need to manage multiple versions of component ontologies throughout the development lifecycle. The present invention may be implemented by formally integrating an add-in component with configuration management functionality, such as Rational Software's® ClearCase®, for example. In such an embodiment fields specific to the configuration management tool would replace the above fields with equivalent information generated and managed by the control system.

The originator term refers to the organization that created and maintains the ontology. In a large organization, originator should include the departmental reference and primary address, telephone, facsimile and email information as well as information concerning how that department fits in to the larger organization (such as an organizational chart). For one embodiment, this term is considered optional, however in a preferred embodiment it is used for all collaborative ontology development projects.

The point of contact term refers to the individual or individuals who are responsible for ongoing maintenance of the ontology, and should include their organization, address, telephone, facsimile and email information at a minimum. Again, in one embodiment this term is considered optional, but in a preferred embodiment it is used for all collaborative ontology development projects.

The references term is a brief narrative description providing information regarding the reference materials used in the development of a given ontology, including any controlled vocabularies, taxonomies, international or national standards, systems specifications and data dictionaries (in the case of an ontology describing a particular resource), cross references, methodology documents or other relevant supplemental information. In addition to the narrative, for each individual reference, the title, author, date of publication, publisher information and a current link to the document (if available) should be provided. Additional documentation terms may be added to suit corporate or other standards as needed.

The keywords and deployment URI terms provide descriptive information regarding the utility or domain of interest and ultimate Internet deployment location of the ontology (if applicable), respectively, and are used primarily for code generation in one embodiment of the invention.

Own Slots and Own Facets

Slots represent the characteristics (attributes or properties in other modeling paradigms) associated with a particular frame (ontology class, relation, function, or individual), while facets represent the characteristics associated with particular slots on a given frame. Slots can be used to specify or constrain the values or behavior associated with a frame. Similarly, facets may be used to specify or constrain the values or behavior associated with a particular slot on a frame.

In one embodiment of the present invention, slots are related to frames through the slotRelation stereotype, where the slots themselves must be defined as classes, relations, or functions, either in the same or another ontology. Facets represent constraints on particular slots, and may be implemented in various ways depending on the facet definition. Facet implementation exploits native UML constructs where appropriate, such as in the case of cardinality. Facets may be related to slots through UML attribute definitions, or where required, as ternary relations between individual slots on particular frames and previously defined entities.

According to one embodiment, first class ontology frames (e.g., class, relation, function and individual frames) have own slots associated with them, which describe characteristics of the frames themselves or constrain them in some fashion. Each own slot has a set of slot values associated with it. Conceptually, a slot is a binary relation, and each value V of an own slot S of a frame F represents the assertion that the relation S holds for the entity represented by F and the entity represented by V (i.e., (S F V)). For example, the assertion that Benson's hobbies are swing dancing and assembling personal computers could be represented by the slot hasHobbies of the frame Benson having as values the frame swingDancing and the string 'assembling PCs'.

Each own slot has a set of own facets associated with it, and each own facet has a set of facet values associated with it. Conceptually, a facet is a ternary relation, and each value V of own facet Fa of slot S of frame Fr represents the assertion that the relation Fa holds for the relation S, the entity represented by Fr, and the entity represented by V (i.e., (Fa S Fr V)). For example, the assertion that Benson must have at least one hobby could be represented by the facet minimumCardinality of the slot hasHobbies of the frame Benson having the value 1.

A number of relations and functions are made available by default for use by ontologists in various knowledge representation systems. A subset of these are considered necessary for compliance with the Open Knowledge Base Connectivity, for example. In one embodiment of the invention, a baseline set of default slots and facets representing a number of common constraints or other relations relevant to ontology modeling in UML have been implemented. This set is not exhaustive, but is sufficient to enable code generation out of the modeling environment for consumption by applications that are OKBC compliant, or for DAML+OIL or OWL ontologies, for example.

Table 2 provides a list of own slots that comprise the default own slots implemented in one embodiment of the invention for all frame types (classes, functions, relations, and individuals) with their mapping to MOF and UML and related type.

TABLE 2

Default Own Slots for All Frame Types.

| Slot Name | MOF & UML Metamodel Element | Stereotype | Slot Value Type | Multiplicity | Initial Value |
|---|---|---|---|---|---|
| Alias | Association | alias | same as the frame type | * | |
| Arity | Association | | integer | 1 | 1 for classes and individuals, relation arity for relations and functions |
| Complement | Association | complement | same as the frame type | * | |

TABLE 2-continued

Default Own Slots for All Frame Types.

| Slot Name | MOF & UML Metamodel Element | Stereotype | Slot Value Type | Multiplicity | Initial Value |
|---|---|---|---|---|---|
| Documentation | Association | documentation | string | 1 | Documentation property |
| Frame Code Name | Property | | string | 1 | Code Name property |
| Frame Identifier | Property | | string | 1 | Rose UID |
| Frame Name | Property | | string | 1 | Name property |
| Has Own Slot | Association | hasOwnSlot | slotRelation | * | |
| Has Template Slot | Association | hasTemplateSlot | slotRelation | * | |

Classes and Individuals

In one embodiment of the present invention, a class defines a set of entities. Each of the entities defined by the class are called instances of the class, or individuals. A class frame is a frame that acts as a container for the entities that specify a particular ontology class. In order to encapsulate the range of entities associated with a particular ontology class, including its slots and facets, ontology classes are implemented as a combination of a UML package and a corresponding UML class, which are identified by the same frame and code name in one embodiment. Class frames may also include documentation and the set of slot relations associated with the class.

An individual is an instance of a class, which is called its type. The specification for an individual includes the frame name, identifier, code name and documentation, as well as the inherited slots and related values specified for that instance. Individuals are represented as UML classes (with a stereotype of individual) so that they may be referenced as slot values, facet values, or as entities in relations or functions, and in order to encapsulate any relevant axioms with the individual. Constants are represented by individuals, for example.

A class can be an instance of a class. A class that has instances that are themselves classes is called a meta-class. Following object-oriented software engineering standards, meta-classes may not have instances that are individuals. A relation can be an instance of another relation (i.e., of a meta-relation, such as a generic binary relation) and a function can be an instance of a relation or another function. Individuals, on the other hand, must be instances of classes (i.e., they cannot be instances of relations, functions, other individuals, or axioms in the present invention, unlike some other knowledge representation systems).

The unary relation class is true if and only if its argument is a class. The class membership relation (called individualOf) that holds between an individual and a class is a binary relation that maps entities to classes. A class is considered to be a unary relation that is true for every instance of the class. That is, (<=> (holds ?C ?I) (individualOf ?I ?C))

The relation typeOf is defined as the inverse of the relation individualOf. That is, (<=>(typeOf ?C ?I) (individualOf ?I ?C))

The subclassOf relation can also be defined in terms of the individualOf relation, as follows. A class Csub is a subclass of a class Csuper if and only if all instances of Csub are also instances of Csuper. That is, (<=>(subclassOf ?Csub ?Csuper)
(forAll ?I (=>(individualOf ?I ?Csub)
(individualOf ?I ?Csuper))))

The relation superclassOf is defined as the inverse of subclassOf. That is, (<=>(superclassOf ?Csuper ?Csub) (subclassOf ?Csub ?Csuper))

These and a number of other key relations are implemented as relations (or functions, where appropriate) in the fundamental ontology that underlies the present invention (see Fundamental Ontology for additional detail).

Table 3 provides a list of the additional default own slots implemented in one embodiment of the invention for all class frames with their mapping to MOF and UML and related type.

TABLE 3

Default Own Slots for Classes.

| Slot Name | MOF & UML Metamodel Element | Stereotype | Slot Value Type | Multiplicity | Initial Value |
|---|---|---|---|---|---|
| All Instances | Association | | boolean | 1 | false |
| Disjoint Decomposition | Association | | set of classes | * | |
| Domain Of | Association | domainOf | class | * | |
| Exhaustive Decomposition | Association | | set of classes | * | |
| Range Of | Association | rangeOf | function | * | |
| Subclass Of | Specialization | | class | * | |
| Superclass Of | Generalization | | class | * | |
| Type Of | Association | typeOf | individual | * | |

Ontology Class Frames, Template Slots, and Template Facets

An ontology class frame may have a collection of template slots associated with it that define slots considered to hold for each instance of the class represented by the frame. The values of template slots are said to inherit to the subclasses and to the instances of a class (individuals). Each value V of a template slot S of a class frame C represents the assertion that the relation hasValue holds for the relation S, the class represented by C, and the entity represented by V (i.e., (has-Value S C V)). This assertion implies that the relation S holds between each instance I of class C and value V (i.e., (S I V)). It also implies that the relation hasValue holds for the relation S, each subclass Csub of class C, and the entity represented by V (i.e., (hasValue S Csub V)). That is, the following slot value inheritance axiom holds for the relation hasValue:

(=> (hasValue ?S ?C ?V)
 (and (=> (individualOf ?I ?C) (holds (?S ?I ?V))
  (=> (subclassOf ?Csub ?C)(hasValue ?S ?Csub ?V))))

In other words, according to one embodiment of the invention, the values of a template slot are inherited to the subclasses as values of the same template slot and to instances as values of the corresponding own slot.

A template slot of an ontology class frame may have a collection of template facets associated with it that describe own facet values considered to hold for the corresponding own slot of each instance of the class represented by the class frame. As with the values of template slots, the values of template facets inherit to the subclasses and instances of a class. Template facet implementation varies, depending on the nature of the facet; again, some facets are implemented as UML attributes, others as relations. In cases where facets are implemented as relations, each value V of a template facet F of a template slot S of a class frame C represents the assertion that the relation hasValue holds for the relations F and S, the class represented by C and the entity represented by V (i.e., (hasValue F S C V)). This assertion implies that the relation F holds for the relation S, each instance I of class C, and value V (i.e., (F S I V)). It also implies that the relation hasValue holds for the relations S and F, each subclass Csub of class C, and the entity represented by V (i.e., (hasValue F S Csub V)).

In general, the following facet value inheritance axiom holds for the relation hasValue:

(=> (hasValue ?F ?S ?C ?V)
 (and (=> (individualOf ?I ?C) (holds ?F ?S ?I ?V))
  (=> (subclassOf ?Csub ?C)(has ?F ?S ?Csub ?V))))

In other words, the values of a template facet are inherited to the subclasses as values of the same template facet and to instances as values of the corresponding own facet. Note that template slot values and template facet values necessarily inherit from a class to its subclasses and instances.

Table 4 provides a list of default facets implemented in one embodiment of the invention for applicable slot relations with their mapping to MOF and UML and related type. Note that this list is not considered exhaustive and is subject to change, as are the lists of slots provided in Table 2, Table 3, and Table 5.

TABLE 4

Default Facets.

| Facet Name | MOF & UML Metamodel Element | Stereotype | Facet Value Type | Initial Value |
|---|---|---|---|---|
| All Values* | Association | allValues | set | |
| Cardinality | Attribute | | nonnegative integer | |
| Collection Type | Attribute | | enumerated list: {none, bag, list, set} | |
| Defining Characteristic | Attribute | | boolean | false |
| Documentation | Association | documentation | string | |
| Essential Characteristic | Attribute | | boolean | false |
| Has Default Value | Association | hasDefaultValue | individual | |
| Has Value | Association | hasValue | individual | |
| Maximum Cardinality | Attribute | | nonnegative integer | |
| Minimum Cardinality | Attribute | | nonnegative integer | |

TABLE 4-continued

Default Facets.

| Facet Name | MOF & UML Metamodel Element | Stereotype | Facet Value Type | Initial Value |
|---|---|---|---|---|
| Nonessential Characteristic | Attribute | | boolean | false |
| Numeric Maximum | Attribute | | integer | |
| Numeric Maximum | Attribute | | integer | |

*All Values provides a means to specify a list of possible values, such as an enumerated list, for the facet, which also restricts the slot to only those values.

Relation and Function Frames

According to one embodiment of the invention, a relation defines the relationship among a collection of entities. A relation frame is a frame that acts as a container for the entities that specify the relationship. For one embodiment, relations are implemented as a combination of a UML package and a corresponding UML class, which are identified by the same frame and code name and include the frame identifier and documentation as well as own slots and axioms specified for that relation. The implementation also makes use of UML associations to reference the arguments (domain) of the relation. Relations can be considered arbitrary sets of finite lists of entities (of possibly varying lengths). Each list is a selection of entities that jointly satisfy the relation. For example, the <relation on numbers contains the list <2,3>, indicating that 2 is less than 3.

Functions are implemented as special kinds of relations in one embodiment of the invention. A function frame is a frame that acts as a container for the entities that specify the function. Functions are also implemented as a combination of a UML package and a corresponding UML class, identified by the same frame and code name, and include the frame identifier and documentation, as well as own slots and axioms specified for the function. Its implementation also makes use of UML associations to reference the arguments (domain(s) and range) and the UML operation representing the function. For every finite sequence of entities (or arguments), a function associates a unique object (the value, result, or return type) to the function. Functions can be considered sets of finite lists of entities, one for each combination of possible arguments. In each list, the initial entities are the arguments, and the final entity is the value. For example, the 1+function contains the list <2,3>, indicating that integer successor of 2 is 3.

Note that both functions and relations are defined as sets of lists. In fact, every function is a relation. However, not every relation is a function. In a contrast, in a relation, there can be any number of lists that agree on all but the final element. For example, the list <2,3> is a member of the 1+function, and there is no other list of length 2 with 2 as its first argument (i.e., there is only one successor for 2). Alternatively, the < relation may contain the lists <2,3>, <2,4>, <2,5>, etc., indicating that 2 is less than 3, 4, 5, and so forth.

Unlike KIF, UML allows the arguments of relations and functions to be named. In the case of variable arity functions, we recommend that all known, fixed arguments are named. This approach supports the assignment of roles to arguments of certain predicates, for example, such as "runner (x) ran to location (y)", as opposed to ran (x, y). Multiple roles may be assigned to the same argument a given relation, where required, but in many such cases, once the role of one argument is provided, it may limit the roles of other arguments and, therefore, determine the semantics for that relation.

Table 5 provides a list of the additional default own slots implemented in one embodiment of the invention for all relation and function frames with their mapping to MOF and UML and related type.

TABLE 5

Default Own Slots for Relations and Functions.

| Slot Name | MOF & UML Metamodel Element | Stereotype | Slot Value Type | Multiplicity | Initial Value |
|---|---|---|---|---|---|
| Domain | Association | domain | class | * | |
| Individual Of | Association | individualOf | class | * | |
| Domain Of | Association | domainOf | class | * | |
| Inverse Of | Association | inverseOf | class | 1 | |
| Range | Association | range | class | 1 | |
| Relation Universe Of | Association | relationUniverseOf | class | 1 | |

Associating Slots and Facets with Frames

For one embodiment, each first class ontology frame (ontology class, relation, function, or individual) has a collection of slots associated with it. Similarly, each frame-slot pair has a collection of facets associated with it. A facet is considered to be associated with a frame-slot pair if the facet has a value for the slot for that frame. A slot is considered to be associated with a frame if the slot has a value for the frame or if there is a value associated with a facet on the slot for that frame.

In one embodiment of the invention, slots are only made visible on diagrams when the user explicitly requests them, such as when creating an ontology or class overview diagram, or when specifically creating a diagram depicting the own slots for a class. This limits the amount of "clutter" on the diagrams for the sake of readability.

In one embodiment, a number of utilities may be provided for users familiar with DAML+OIL/OWL and who are specifically interested in generating DAML+OIL or OWL from the invention. These may be related to the DAML+OIL/OWL specific profile layered on top of the core profile described in section 2.0 and are given in section 5, below. In one embodiment of the invention, however, a Create Ontology Slot Wizard is provided for such users who may prefer that to using a more general Create Relation Wizard.

Foundation Ontology

Most ontology representation languages and related editors provide some kind of foundational ontology for use as a basis for development. At a minimum, many such languages require class definitions for concepts commonly called entity (also, thing or top) and absurdity (also, nothing or bottom or null), for language compliance in the ontologies developed therein.

In one embodiment of the present invention, there is provided such a foundation ontology, which defines the concepts, relations, individuals, and methods that ground the meta-model and profile. For one embodiment, the foundation ontology is implemented to support existing ontologies and knowledge representation systems. For one embodiment, the foundation ontology identifies and defines a set of concepts and relations useful as a basis for all ontology development by users. In one embodiment of the present invention, a mechanism permits users to import one or more upper ontologies of choice. In another embodiment, a user is required to select at least one parent class for every concept they define. That parent class may be as general as entity, but regardless of the concept selected, at least one may be required. This is a departure from some knowledge representation systems, but is necessary for downstream code generation, ontology analysis, merging, and alignment, and other functions a commercial user might want to perform. Another goal is to eliminate circular dependencies, which are rampant in numerous published ontologies, such as the fundamental ontologies of Ontolingua, the IEEE Standard Upper Merged Ontology (SUMO), and many of the published DAML+OIL ontologies available from the DARPA/DAML program web site. Circular dependencies prohibit code generation, which is one of the primary features of the present invention.

FIG. 15 provides a partial, top-level view of the current implementation of the foundational ontology, following top-level categories of firstness, secondness, and thirdness, for one embodiment. FIGS. 16 through 21 show the inheritance hierarchy as derived from the top level for basic concepts such as relations, classes, functions, individuals, and slots. While these ontological components provide an underlying foundation for one embodiment, an alternative embodiment may align the present invention more closely with the IEEE Standard Upper Ontology, primarily to enable interoperability with other formal systems based on that effort and related work in category theory.

In accordance with one embodiment, in addition to class definitions, the foundation ontology includes numerous definitions for relations and functions, many of which are necessary to support OKBC compliance. Table 6 provides a list of foundation relations included in one embodiment of the invention. This list is not intended to be exhaustive, and may be modified as required to add new relations to support the Web Ontology Language as it evolves, to support ISO KIF as that specification matures, or for other code generation purposes.

TABLE 6

Foundation Ontology Definitions for Relations.

| Relation | MOF & UML Metamodel Element(s) | Stereotype | Domain(s) | Arity |
|---|---|---|---|---|
| Alias | Package, Class, Association | alias | class | 2 |
| CompositionOf | Package, Class | | binary relation, list | 2 |
| Disjoint | Package, Class, Association | disjoint, disjunct | set | 2 |
| Disjoint Decomposition | Package, Class | | class, class partition | 2 |

TABLE 6-continued

Foundation Ontology Definitions for Relations.

| Relation | MOF & UML Metamodel Element(s) | Stereotype | Domain(s) | Arity |
|---|---|---|---|---|
| Documentation | Package, Class | | relation, string | 2 |
| Domain | Package, Class, Association | domain | relation, class | 2 |
| Domain Of | Package, Class | | class, relation | 2 |
| Exhaustive Decomposition | Package, Class | | class, class partition | 2 |
| Facet | Package, Class | facet | continuant (?frame), slotRelation, class (?facetValueType) | 3 |
| Frame Code Name | Package, Class | | relation (?frame), string | 2 |
| Frame Identifier | Package, Class | | continuant (?frame), string | 2 |
| Frame Name | Package, Class | | continuant (?frame), string | 2 |
| Has Default Value | Package, Class, Association | hasDefaultValue | relation (?frame), slotRelation, continuant (?defaultValue) | 3 |
| Has Member | Package, Class, Association | hasMember | set, continuant (?member) | 2 |
| Has Own Slot | Package, Class, Association | hasOwnSlot | continuant (?frame), slotRelation | 2 |
| Has Template Slot | Package, Class, Association | hasTemplateSlot | continuant (?frame), slotRelation | 2 |
| Has Value | Package, Class, Association | hasValue | relation (?frame), slotRelation, continuant (?value) | 3 |
| Individual Of | Package, Class, Association | individualOf | class, continuant (?frame) | 2 |
| Inverse Of | Package, Class, Association | inverseOf | relation | 2 |
| Item | Package, Class | | list, continuant (?frame) | 2 |
| Member Of | Package, Class | | set, continuant (?frame) | 2 |
| Mutually Disjoint | Package, Class | | set | * |
| Not Same Values | Package, Class | | relation (?frame), slotRelation, collection | 3 |
| Nth Argument Of | Package, Class | | relation, continuant (?argument), positive integer | 3 |
| Nth Domain Of | Package, Class | | relation, class (?domain), positive integer | 3 |
| Onto | Package, Class | | relation, class | 2 |
| Pairwise Disjoint | Package, Class | | set | * |
| Partition | Package, Class | | class, class partition | 2 |
| Proper Subset | Package, Class | | set | 2 |
| Range | Package, Class, Association | range | function, class | 2 |
| Range Of | Package, Class | | function, class | 2 |
| Range Subclass Of | Package, Class | | function, class | 2 |
| Same Values | Package, Class | | relation, slotRelation | 3 |
| Set Of All Inverse Values | Package, Class | | continuant (?frame), slotRelation, set | 3 |
| Set Of All Values | Package, Class | | continuant (?frame), slotRelation, set | 3 |
| Set Partition | Package, Class | | set | 2 |
| Some Values | Package, Class | | continuant (?frame), slotRelation, set | 3 |
| Subclass Of | Specialization | | class | 2 |
| Sublist Of | Specialization | | list | 2 |
| Subrelation Of | Specialization | | relation | 2 |
| Subset Of | Specialization | | set | 2 |
| Subset Of Values | Package, Class | | continuant (?frame), slotRelation, set | 3 |
| Superclass Of | Generalization | | class | 2 |
| Total On | Package, Class | | class, relation | 2 |
| Type Of | Package, Class, Association | typeOf | class, continuant | 2 |

TABLE 6-continued

Foundation Ontology Definitions for Relations.

| Relation | MOF & UML Metamodel Element(s) | Stereotype | Domain(s) | Arity |
|---|---|---|---|---|
| Value Type | Package, Class, Association | valueType | continuant (?frame), slotRelation, class | 3 |

FIGS. 22 through 24 provide example class diagrams for binary, ternary, and variable arity relations, respectively.

Table 7 provides a list of foundation functions included in one embodiment of the invention. Again, this list is not intended to be exhaustive, and may be modified as required to add new functions to support the Web Ontology Language as it evolves, to support ISO KIF as that specification matures, or for other code generation purposes.

TABLE 7

Foundation Ontology Definitions for Functions.

| Function | MOF & UML Metamodel Element(s) | Stereotype | Domain(s) | Range | Arity |
|---|---|---|---|---|---|
| All Instances | Package, Class | | class | set | 2 |
| All Values | Package, Class | | continuant (?frame), slotRelation | set | 3 |
| Arity | Package, Class, Association | arity | relation | positive integer | 2 |
| Cardinality | Attribute | cardinality | continuant (?frame), slotRelation | nonnegative integer | 3 |
| Collection Type | Attribute | collectionType | continuant (?frame), slotRelation | enumerated list | 3 |
| Complement Of | Package, Class | | set | set | 2 |
| Compose | Package, Class | | list of relations | binary relation | 2 |
| Composition | Package, Class | | binary relation | binary relation | 3 |
| Defining Characteristic | Attribute | definingCharacteristic | continuant (?frame), slotRelation | boolean | 3 |
| Essential Characteristic | Attribute | essentialCharacteristic | continuant (?frame), slotRelation | boolean | 3 |
| Exact Domain | Package, Class | | relation | | 2 |
| Exact Range | Package, Class | | class, relation | | 2 |
| Generalized Intersection Of | Package, Class | | set of sets | set | 2 |
| Generalized Union Of | Package, Class | | set of sets | set | 2 |
| Intersection Of | Package, Class, Association | intersectionOf | set | set | 3 |
| Maximum Cardinality | Attribute | maximumCardinality | continuant (?frame), slotRelation | nonnegative integer | 3 |
| Minimum Cardinality | Attribute | minimumCardinality | continuant (?frame), slotRelation | nonnegative integer | 3 |
| Non-essential Characteristic | Attribute | nonessentialCharacteristic | continuant (?frame), slotRelation | boolean | 3 |
| Numeric Minimum | Attribute | numericMinimum | continuant (?frame), slotRelation | integer | 3 |

TABLE 7-continued

Foundation Ontology Definitions for Functions.

| Function | MOF & UML Metamodel Element(s) | Stereotype | Domain(s) | Range | Arity |
|---|---|---|---|---|---|
| Numeric Maximum | Attribute | numericMaximum | continuant (?frame), slotRelation | integer | 3 |
| Projection | Package, Class | | relation, positive integer | class | 3 |
| Relation Universe Of | Package, Class, Association | relationUniverseOf | relation | class | 2 |
| Union Of | Package, Class, Association | unionOf | list of sets | set | 2 |

FIGS. 25 and 26 provide example class diagrams for unary and binary functions, respectively.

Axiom Support

For one embodiment of the invention, axioms are expressed in terms of KIF notation. In terms of conformance dimensions as defined in the draft ISO standard, the subset of KIF that one embodiment of the present invention will support can be characterized as follows:

Logicalform: rule-like, non-Horn non-recursive expressions are supported

Term complexity: complex expressions are supported

Order: first-order expressions are supported; variables are not permitted in the first argument of any explicit functional term or explicit relational sentence Quantification: quantified expressions are supported Metaknowledge: base level expressions are supported In addition, in order to create axiom frames and integrate expressions in ways that are consistent with the UML profile defined above, axioms may be named. An axiom frame is a frame that acts as a container for the axiom and relates the elements of that axiom to other elements in the model. Axiom frames are implemented through external files in one embodiment of the invention, and in some cases are also associated with UML operations. The external files include the frame name, frame identifier, frame code name and frame documentation, as well as the KIF expression that specifies the axiom itself. Persistent storage for these expressions is provided by an external text file in XML format preserved as a part of the package (folder in the file system) representing the primary ontology element (ontology, class, relation, function, or individual) that the expression is associated with for use by downstream applications or reasoning systems.

For one embodiment of the present invention, the set of valid KIF term and sentence operators that may be used in expressions are given in Table 8.

TABLE 8

KIF to UML Term and Sentence Operator Mapping

| KIF Operator | UML Operator |
|---|---|
| = | equals |
| implies | implies |
| iff | iff |
| and | and |

TABLE 8-continued

KIF to UML Term and Sentence Operator Mapping

| KIF Operator | UML Operator |
|---|---|
| or | or |
| not | not |
| exists | exists |
| forall | forall |

FIG. 27 depicts the class hierarchy portion of the foundational ontology supporting KIF expressions.

Knowledge Base Integration and Code Generation

While the ability to model semantic or conceptual knowledge in UML, in and of itself, provides significant value, particularly in light of current trends in web services, collaborative applications, and so forth, the real utility of the invention is realized when the ontologies developed can be used in other applications outside of the modeling environment. The use of MOF/UML facilitates the exchange of these ontologies with other tools and tool environments that understand MOF and UML. One advantage of the present invention is that much of the functionality to support this level of interchange is already provided in the UML tools.

In addition to UML-based interoperability, embodiments of the present invention support interoperability with existing knowledge based applications and environments through generation of (1) an XML file, with terms and structure compliant with the Open Knowledge Base Connectivity (OKBC), and (2) RDFS, DAML+OIL, and OWL compliant ontologies. Such facilities can save ontologists and other knowledge engineers substantial time in developing RDFS, DAML+ OIL, and OWL ontologies in particular, not only in terms of the initial code development, but in terms of ensuring correctness by construction and for ontology maintenance purposes.

Other embodiments of the invention will support more dynamic, API-based, CORBA, and web services interfaces for the exchange of either OKBC or RDFS, DAML+OIL, and OWL semantic knowledge as well as more sophisticated KIF-based knowledge sharing.

OKBC-Compliant XML Generation

For one embodiment of the invention, a user initiates a process for generating an OKBC-compliant XML-based ontology. Because the generated file may then be imported into a knowledge base for ontology and instance data management, into other tools that support evaluation, comparison, alignment, and merging of ontologies, or may be used by various reasoning systems requiring complete definition of all terms, the KB and code generator component of FIG. 2 must generate all definitions not only for the ontology of interest, but for imported ontologies as well.

For one embodiment of the invention, a user generates the XML form of an ontology for an existing UML model by extracting all UML classes defined in the model (regardless of stereotype) to an output file using a UML tool. In one embodiment, to generate the XML form of an ontology, a user initiates a sequence of steps that perform the following operations:

1. Load all controlled, or logical units, not only from the ontology of interest, but for all included ontologies (i.e., to ensure transitive closure across all referenced model elements).
2. Write XML ontology header information extracted from the UML model properties and related meta information to the output file.
3. Loop through all class, relation and function frames, and for each frame, write the XML equivalent expression to the file, including all meta information as defined in frame properties and attributes, own slots, and own facets.
4. Step through all template slots for each frame, writing slot details followed by facet details for each slot.
5. Step through all individuals defined for each frame, writing own slot and own facet details for the individuals
6. Step through all axioms defined for each frame, writing own slot and own facet details for the axioms.
7. Continue the process for each class, relation and function frame in the current ontology, then for each ontology on which the current ontology depends
8. Finally, step through any axioms written at the ontology level, and write own slot and own facet details for those axioms RDFS, DAML+OIL, or OWL Ontology Generation For one embodiment, the process for exporting an RDFS, DAML+OIL, or OWL, ontology is slightly different from the process described above with respect to XML, for a number of reasons. First, more rigorous attention to format is required, as such ontologies are publishable to the web for consumption by many tools that can read these formats. The process will not likely change dramatically as the invention evolves, except to accommodate modifications to the OWL specification, particularly with regard to axiom support.

Table 9 provides additional DAML+OIL and OWL-specific profile information required both for modeling and generation of ontologies that are compliant with these specifications.

TABLE 9

DAML + OIL/OWL Profile Elements

| Frame-Based KR (Ontology) Element | MOF Metamodel Element(s) | UML Metamodel Element(s) | Stereotype |
|---|---|---|---|
| complementOf | Package | Package | relationFrame (complementOf) |
|  | Class | Class | relation (complementOf) |
|  | Association | Association | complementOf |
| disjointWith | Package | Package | relationFrame (disjointWith) |
|  | Class | Class | disjointWith |
|  | Association | Association | disjunct |
| domain | Package | Package | relationFrame (domain) |
|  | Class | Class | relation (domain) |
|  | Association | Association | domain |
| hasValue | Package | Package | relationFrame (hasValue) |
|  | Class | Class | relation (hasValue) |
|  | Association | Association | hasValue |
| import (ontology) |  | Dependency | <none used> |
| intersectionOf | Package | Package | intersectionOfFrame |
|  | Class | Class | intersectionOf |
| inverseOf | Package | Package | relationFrame (inverseOf) |
|  | Class | Class | relation (inverseOf) |
|  | Association | Association | inverseOf |
| Ontology |  | Property | <none used> |
| range | Package | Package | relationFrame (range) |
|  | Class | Class | relation (range) |
|  | Association | Association | range |
| sameClassAs | Package | Package | relationFrame (sameClassAs) |
|  | Class | Class | relation (sameClassAs) |
|  | Association | Association | sameClassAs |
| sameIndividualAs | Package | Package | relationFrame (sameIndividualAs) |
|  | Class | Class | relation (sameIndividualAs) |
|  | Association | Association | sameIndividualAs |
| samePropertyAs | Package | Package | relationFrame (samePropertyAs) |
|  | Class | Class | relation (samePropertyAs) |
|  | Association | Association | samePropertyAs |
| subClassOf (rdfs) | Specialization | Specialization | <none used> |
| subPropertyOf (rdfs) | Specialization | Specialization | <none used> |
| unionOf | Package | Package | unionOfFrame |
|  | Class | Class | unionOf |
| versionInfo |  | Property | <none used> |

FIGS. 28 through 31 show logical class hierarchies relevant to the generation of DAML+OIL and OWL ontologies, including ontology class definitions for RDF Model and Syntax, RDF Schema, and XML Schema Datatypes. These underlying ontologies form the layers on which DAML+OIL and OWL ontologies can be developed, as per the specifications. FIG. 32 shows the logical class hierarchy for the current version of the OWL specification. The DAML+OIL logical class hierarchy, which the OWL specification supercedes, is similar.

The steps employed by the present embodiment of the invention to generate the RDFS, DAML+OIL, or OWL form of a UML ontology include the following:

1. Create the output file
2. Connect to a UML tool, such as Rational® Rose, and extract all classes defined in the model (regardless of stereotype)—in this case, only for the current ontology.
3. Load all controlled, or logical units, for the current ontology.
4. Write XML header information required by the DAML+OIL/OWL specifications, extracted from the UML model properties and related meta information to the output file.
5. Loop through included ontology model properties to extract namespace declarations for imported ontologies.
6. Loop through all class frames, and for each frame, write the XML/RDFS/DAML+OIL/OWL equivalent expression to the file, including appropriate meta information as defined in frame properties and attributes, own slots, and own facets, per the specified format.
7. For each class frame, then write all relevant class elements defined per the RDFS/DAML+OIL/OWL specification, following the basic class definition, including all rdfs:subclassOf elements, owl:disjointWith, owl:sameClassAs, owl:sameAs, boolean combinations of class elements such as owl:intersectionOf, owl:unionOf, and owl:complementOf, as well as other associations, if any, reflected in domain associations that aren't reflected in the set of class elements.
8. For each class frame, then write all relevant enumerations and individuals, such as those that participate in owl:oneOf expressions.
9. Finally, for each class frame, write all relevant restrictions based on slot and facet details, such as owl:allValuesFrom, owl:someValuesFrom, or other user-defined restrictions pertinent to the class.
10. Loop through all standalone property frames (relations and functions), and for each such frame, write all rdf:Property elements, including determination of whether they are primitive types (datatype properties), as determined by the slot valueType relation in conjunction with the XML Schema Datatypes ontology definitions or object properties.
11. For each such frame, write all relevant property elements defined per the RDFS/DAML+OIL/OWL specification, following the basic property definition, including all rdfs:subPropertyOf elements, rdfs:domain, rdfs:range, owl:samePropertyAs, owl:sameAs, and owl:inverseOf statements.
12. For each such frame, then write all relevant property definitions such as owl:TransitiveProperty, owl:SymmetricProperty, owl:FunctionalProperty, and owl:InverseFunctionalProperty details.
13. Finally, for each such frame, write any remaining restrictions based on slot and facet details, or other user-defined restrictions pertinent to the property.
14. Stepping through the entire file, insert generated URIs, such as for datatype properties derived from the XML Schema Datatypes definition, or other externally imported ontologies, as needed.

What is claimed is:

1. A method for emulating frame-based knowledge representation in Unified Modeling Language (UML), the method comprising:
   grounding a Meta-Object Facility (MOF) meta-model and a UML profile in a foundation ontology,
      wherein the foundation ontology defines concepts, relations, individuals, and methods that ground the MOF meta-model and the UML profile,
      wherein the MOF meta-model is used to represent an abstract syntax of a particular knowledge representation paradigm or ontology language to facilitate model interchange purposes, and
      wherein the UML profile is used to extend a UML language itself to enable UML tool users to use familiar notation for ontology modeling purposes; and
   mapping elements of the frame-based knowledge representation to elements of UML based on the MOF meta-model and the UML profile,
      wherein the frame-based knowledge representation describes knowledge using conceptual definitions and logic sufficient to support automated reasoning.

2. A system for emulating frame-based knowledge representation in Unified Modeling Language (UML), the system comprising:
   a Meta-Object Facility (MOF) meta-model grounded in a foundation ontology,
      wherein the foundation ontology defines concepts, relations, individuals, and methods that ground the MOF meta-model and the UML profile,
      wherein the MOF meta-model specifies a structure for storing objects on a storage device, and
      wherein the MOF meta-model is used to represent an abstract syntax of a particular knowledge representation paradigm or ontology language to facilitate model interchange purposes;
   a UML profile grounded in the same foundation ontology,
      wherein the UML profile is used to extend a UML language itself to enable UML tool users to use familiar notation for ontology modeling purposes; and
   a logic component, executable on a processor, to map elements of the frame-based knowledge representation to elements of UML based on the MOF meta-model and the UML profile to thereby generate a resulting ontology, and to act on the resulting UML ontology,
      wherein the elements of the frame-based knowledge representation include different frame types sufficiently specified to enable inference and reasoning.

3. A method for creating an ontology in Unified Modeling Language (UML), the method comprising:
   accepting as input an ontology name and one or more ontology elements, each ontology element corresponding to at least one of a term, concept, and relationship between concepts, the ontology elements forming a detailed specification of the ontology;
   generating a logically equivalent ontology with UML model elements based on a UML profile grounded in a foundation ontology,
      wherein the foundation ontology defines concepts, relations, individuals, and methods that ground a Meta-Object Facility (MOF meta-model and the UML profile, wherein the MOF meta-model is used to represent an abstract syntax of a particular knowledge representation paradigm or ontology language to facilitate model interchange purposes, and wherein the UML profile extends a UML language to enable UML tool users to use familiar notation for ontology modeling purposes; and presenting the logically equivalent ontology to a user in a UML environment.

4. The method of claim 3, wherein said generating the logically equivalent ontology with Unified Modeling Language (UML) model elements includes generating a UML package and class for each frame type of an ontology.

5. The method of claim 3, wherein said generating the logically equivalent ontology with Unified Modeling Language (UML) model elements includes generating a UML association for specific ontology elements.

6. The method of claim 3, wherein said generating the logically equivalent ontology with Unified Modeling Language (UML) model elements includes generating a UML operation for specific ontology elements.

7. The method of claim 3, further comprising:
generating code representing the ontology in a language specific to a particular knowledge representation format.

8. The method of claim 7, wherein said generating code includes generating code that meets DAML+OIL specification.

9. The method of claim 7, wherein said generating code includes generating code that meets W3C Web Ontology Language (OWL) specification.

10. The method of claim 7, wherein said generating code includes generating code that meets Open Knowledge Base Connectivity (OKBC) specification.

11. The method of claim 3, wherein said accepting as input the ontology name and the one or more ontology elements includes validating the ontology name and the one or more ontology elements.

12. The method of claim 3, wherein said accepting as input the ontology name and the one or more ontology elements includes accepting manual input from a user.

13. The method of claim 3, wherein said accepting as input the ontology name and the one or more ontology elements includes importing the ontology name and the one or more of the ontology elements from at least one of an existing knowledge base and another ontology representation.

14. A system for creating an ontology in Unified Modeling Language (UML), the system comprising:
a processor;
a user input and validation component, executable on the processor, to accept as input an ontology name and one or more ontology elements, each ontology element corresponding to at least one of a term, concept, and relationship between concepts, the ontology elements forming a detailed specification of the ontology;

an ontology logic component to generate a logically equivalent ontology with UML model elements based on a UML profile grounded in a foundation ontology, wherein the foundation ontology defines concepts, relations, individuals, and methods that ground a Meta-Object Facility (MOF) meta-model and the UML profile, wherein the MOF meta-model is used to represent an abstract syntax of a particular knowledge representation paradigm or ontology language to facilitate model interchange purposes, and wherein the UML profile is used to extend a UML language to enable UML tool users to use familiar notation for ontology modeling purposes; and a UML tool to present the logically equivalent ontology to a user in a UML environment.

15. The system of claim 14, wherein the ontology logic component is to generate a Unified Modeling language (UML) package and class for each frame type of the ontology.

16. The system of claim 14, wherein the ontology logic component is to generate a Unified Modeling Language (UML) association for specific ontology elements.

17. The system of claim 14, wherein the ontology logic component is to generate a Unified Modeling Language (UML) operation for specific ontology elements.

18. The system of claim 14, further comprising:
a code generator, executable on the processor, to generate code representing the ontology using a language specific to a particular knowledge representation format.

19. The system of claim 18, wherein the code generator is to generate code that meets DAML+OIL specification.

20. The method of claim 18, wherein the code generator is to generate code that meets Web Ontology Language (OWL) specification.

21. The method of claim 18, wherein the code generator is to generate code that meets Open Knowledge Base Connectivity (OKBC) specification.

22. The system of claim 14, wherein the user input and validation component is to validate the ontology name and the one or more ontology elements.

23. The system of claim 14, wherein the user input and validation component is to accept and to validate manual input from the user.

24. The system of claim 14, wherein the user input and validation component is to accept and to validate the ontology name and the one or more ontology elements from at least one of an existing knowledge base and another ontology representation.

* * * * *

UNITED STATES PATENT AND TRADEMARK OFFICE
CERTIFICATE OF CORRECTION

PATENT NO. : 7,424,701 B2 Page 1 of 1
APPLICATION NO. : 10/499961
DATED : September 9, 2008
INVENTOR(S) : Kendall et al.

It is certified that error appears in the above-identified patent and that said Letters Patent is hereby corrected as shown below:

In column 32, line 66, in Claim 3, delete "(MOF" and insert -- (MOF) --, therefor.

In column 33, line 23, in Claim 7, delete "the" and insert -- an --, therefor.

In column 34, line 20, in Claim 15, delete "language" and insert -- Language --, therefor.

Signed and Sealed this

Tenth Day of February, 2009

JOHN DOLL
*Acting Director of the United States Patent and Trademark Office*